(12) United States Patent
Bowers et al.

(10) Patent No.: US 11,928,656 B1
(45) Date of Patent: Mar. 12, 2024

(54) SYSTEMS AND METHODS FOR ELECTRONIC DATABASE COMMUNICATIONS

(71) Applicant: The PNC Financial Services Group, Inc., Pittsburgh, PA (US)

(72) Inventors: Urich T. Bowers, Brideville, PA (US); Mecal McDade, New Alexandria, PA (US); Todd Tkach, Wexford, PA (US); Mike Kirch, Venetia, PA (US); Eric Romantino, Pittsburgh, PA (US); Scott Braun, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 17/202,054

(22) Filed: Mar. 15, 2021

Related U.S. Application Data

(63) Continuation of application No. 17/027,250, filed on Sep. 21, 2020.
(Continued)

(51) Int. Cl.
*G06Q 20/10* (2012.01)
*G06N 20/00* (2019.01)
(Continued)

(52) U.S. Cl.
CPC ........... *G06Q 20/108* (2013.01); *G06N 20/00* (2019.01); *G06Q 20/3221* (2013.01);
(Continued)

(58) Field of Classification Search
CPC ........... G06Q 20/3221; G06Q 20/3223; G06Q 20/405; G06Q 40/02
See application file for complete search history.

(56) References Cited

U.S. PATENT DOCUMENTS 3,626,381 A 12/1971 Dubinsky et al.
3,702,006 A 10/1972 Page
(Continued)

FOREIGN PATENT DOCUMENTS

WO WO 2011/112752 A1 9/2011
WO WO 2014/071261 A1 5/2014
(Continued)

OTHER PUBLICATIONS

"Text and Email Alerts", PNC Bank, 2013. Available at: https://content.pncmc.com/live/pnc/SCT/pdfs/Text_Email_Alerts.pdf (Year: 2013).
(Continued)

*Primary Examiner* — David P Sharvin
*Assistant Examiner* — Gregory Harper
(74) *Attorney, Agent, or Firm* — Finnegan, Henderson, Farabow, Garrett & Dunner LLP

(57) ABSTRACT

A system for managing a financial account in a low cash mode. The system may include a memory storing instructions, and a processor configured to execute the instructions to perform operations. The operations may include providing an interface; providing a notification to a user when a balance in the first account is deemed to be in low cash mode; presenting, when the first account balance is deemed to be in low cash mode, an option for a transfer request; receiving, a selection of the option for the transfer request to connect the first account with a second account; transferring funds from the second account to the first account; notifying the user that funds have been transferred from the second account to the first account; and further notifying the user that the balance in the first account is greater than the threshold value.

20 Claims, 47 Drawing Sheets

Related U.S. Application Data

(60) Provisional application No. 62/983,572, filed on Feb. 28, 2020.

(51) Int. Cl.

| | |
|---|---|
| *G06Q 20/02* | (2012.01) |
| *G06Q 20/32* | (2012.01) |
| *G06Q 20/40* | (2012.01) |
| *G06Q 30/018* | (2023.01) |
| *G06Q 30/0283* | (2023.01) |
| *G06Q 40/02* | (2023.01) |
| *G06Q 50/00* | (2012.01) |

(52) U.S. Cl.
CPC ..... *G06Q 20/3223* (2013.01); *G06Q 20/4037* (2013.01); *G06Q 20/405* (2013.01); *G06Q 30/0283* (2013.01); *G06Q 40/02* (2013.01); *G06Q 20/023* (2013.01); *G06Q 30/0185* (2013.01); *G06Q 50/01* (2013.01)

(56) References Cited

U.S. PATENT DOCUMENTS

| | | | |
|---|---|---|---|
| 4,340,879 A | 7/1982 | Laflamme | |
| 5,491,795 A | 2/1996 | Beaudet et al. | |
| 5,644,727 A | 7/1997 | Atkins | |
| 5,699,528 A | 12/1997 | Hogan | |
| 5,734,915 A | 3/1998 | Roewer | |
| 5,819,236 A | 10/1998 | Josephson | |
| 6,373,930 B1 | 4/2002 | McConnell et al. | |
| 6,535,855 B1 | 3/2003 | Cahill et al. | |
| 7,140,036 B2 | 11/2006 | Bhagavatula et al. | |
| 7,213,266 B1 | 5/2007 | Maher et al. | |
| 7,624,052 B1 | 11/2009 | Seaman et al. | |
| 7,681,228 B2 | 3/2010 | Mizrah | |
| 7,765,580 B2 | 7/2010 | Vandergeest et al. | |
| 7,937,305 B1 | 5/2011 | Lego et al. | |
| 8,061,592 B1 | 11/2011 | Clem et al. | |
| 8,065,230 B1 | 11/2011 | Little | |
| 8,073,472 B1 | 12/2011 | Thakur et al. | |
| 8,311,935 B2 | 11/2012 | Balachandran et al. | |
| 8,374,963 B1 | 2/2013 | Billman | |
| 8,380,618 B1 | 2/2013 | Kazenas et al. | |
| 8,380,623 B1 | 2/2013 | Ley et al. | |
| 8,423,440 B1 | 4/2013 | Mackrell et al. | |
| 8,423,452 B1 | 4/2013 | Ley et al. | |
| 8,458,089 B1* | 6/2013 | Gareis ................ G06Q 40/02 |
| | | | 705/40 |
| 8,495,384 B1 | 7/2013 | DeLuccia | |
| 8,504,455 B1 | 8/2013 | Balestreire et al. | |
| 8,602,296 B1 | 12/2013 | Velline et al. | |
| 8,606,714 B1 | 12/2013 | Cameo et al. | |
| 8,676,642 B1 | 3/2014 | Sheley | |
| 8,719,132 B1 | 5/2014 | Diggdon et al. | |
| 8,856,807 B1 | 10/2014 | Khapre et al. | |
| 9,047,639 B1 | 6/2015 | Quintiliani et al. | |
| 9,552,272 B1 | 1/2017 | Liang et al. | |
| 9,881,296 B1 | 1/2018 | Paulin et al. | |
| 9,965,808 B1 | 5/2018 | Kunz et al. | |
| 10,169,812 B1 | 1/2019 | Bajgier et al. | |
| 10,169,946 B1 | 1/2019 | Benkreira et al. | |
| 10,242,402 B1 | 3/2019 | Soccorsy et al. | |
| 10,270,808 B1 | 4/2019 | Sherif et al. | |
| 10,373,131 B2 | 8/2019 | Hsieh et al. | |
| 10,373,248 B1 | 8/2019 | Casey et al. | |
| 10,380,659 B1* | 8/2019 | Benkreira ............ G06Q 20/102 |
| 10,395,287 B1 | 8/2019 | Lowell et al. | |
| 10,462,619 B2 | 10/2019 | Diaconu et al. | |
| 10,474,736 B1 | 11/2019 | Stoica et al. | |
| 10,521,796 B1 | 12/2019 | Newman et al. | |
| 10,599,490 B1 | 3/2020 | Caraccioli | |
| 10,636,087 B1 | 4/2020 | Bardouille et al. | |
| 10,665,238 B1 | 5/2020 | Bermudez-Cisneros | |
| 10,755,281 B1 | 8/2020 | Yip et al. | |
| 10,768,952 B1 | 9/2020 | Watson et al. | |
| 10,805,465 B1 | 10/2020 | Krebs et al. | |
| 10,878,408 B1 | 12/2020 | Kurani et al. | |
| 10,909,618 B1 | 2/2021 | Mortensen et al. | |
| 10,963,589 B1 | 3/2021 | Fakhraie et al. | |
| 10,970,778 B1 | 4/2021 | Starbuck et al. | |
| 10,977,725 B1 | 4/2021 | Flowers et al. | |
| 10,984,434 B1 | 4/2021 | Arya et al. | |
| 10,990,980 B1 | 4/2021 | Reses et al. | |
| 10,992,679 B1 | 4/2021 | Fakhraie et al. | |
| 10,997,592 B1 | 5/2021 | Kurani | |
| 11,037,167 B1 | 6/2021 | Duke et al. | |
| 11,079,919 B1* | 8/2021 | Soccorsy ............... G06Q 20/14 |
| 11,144,989 B1 | 10/2021 | Bardouille et al. | |
| 11,270,279 B1 | 3/2022 | Rozovski et al. | |
| 11,386,223 B1 | 7/2022 | Fakhraie et al. | |
| 11,463,576 B1 | 10/2022 | Gordon et al. | |
| 11,556,936 B1* | 1/2023 | Fisher ................ G06Q 20/3226 |
| 11,574,359 B1 | 2/2023 | Ball et al. | |
| 2001/0037451 A1 | 11/2001 | Bhagavatula et al. | |
| 2002/0029189 A1* | 3/2002 | Titus ..................... H04M 15/51 |
| | | | 455/445 |
| 2002/0082892 A1 | 6/2002 | Raffel et al. | |
| 2003/0043978 A1 | 3/2003 | Gallagher | |
| 2003/0105692 A1 | 6/2003 | Gilbert et al. | |
| 2003/0105707 A1 | 6/2003 | Audebert et al. | |
| 2004/0039694 A1 | 2/2004 | Dunn et al. | |
| 2004/0098338 A1 | 5/2004 | Uehara et al. | |
| 2004/0148517 A1 | 7/2004 | Banks-Binici et al. | |
| 2004/0158521 A1 | 8/2004 | Newton et al. | |
| 2005/0171811 A1 | 8/2005 | Campbell et al. | |
| 2005/0211765 A1* | 9/2005 | Brown .................. G06Q 40/00 |
| | | | 235/379 |
| 2005/0263588 A1* | 12/2005 | Babi ..................... G06Q 20/40 |
| | | | 235/379 |
| 2006/0047588 A1 | 3/2006 | Lal et al. | |
| 2006/0218006 A1 | 9/2006 | Malik et al. | |
| 2006/0235795 A1 | 10/2006 | Johnson et al. | |
| 2007/0033103 A1 | 2/2007 | Collins et al. | |
| 2007/0124358 A1 | 5/2007 | Levi et al. | |
| 2007/0130065 A1 | 6/2007 | Staab et al. | |
| 2007/0260562 A1 | 11/2007 | Hutson et al. | |
| 2007/0283416 A1 | 12/2007 | Renaud | |
| 2008/0010192 A1 | 1/2008 | Rackley III et al. | |
| 2008/0040265 A1 | 2/2008 | Rackley III et al. | |
| 2008/0103970 A1 | 5/2008 | Books et al. | |
| 2008/0168393 A1 | 7/2008 | Rosskopt | |
| 2008/0298569 A1 | 12/2008 | Monk | |
| 2008/0307220 A1 | 12/2008 | Campbell | |
| 2009/0043604 A1 | 2/2009 | Jung et al. | |
| 2009/0043699 A1 | 2/2009 | Elterich | |
| 2009/0081989 A1 | 3/2009 | Wuhrer | |
| 2009/0089205 A1 | 4/2009 | Bayne | |
| 2009/0106365 A1 | 4/2009 | Drory et al. | |
| 2009/0204538 A1 | 8/2009 | Ley et al. | |
| 2009/0271287 A1* | 10/2009 | Halpern ................ G06Q 40/00 |
| | | | 705/26.1 |
| 2009/0271315 A1 | 10/2009 | Hammad | |
| 2009/0276839 A1 | 11/2009 | Peneder | |
| 2009/0288012 A1 | 11/2009 | Hertel et al. | |
| 2009/0313304 A1 | 12/2009 | Goodger et al. | |
| 2010/0019030 A1 | 1/2010 | Monk | |
| 2010/0023390 A1 | 1/2010 | Kim | |
| 2010/0086112 A1 | 4/2010 | Jiang et al. | |
| 2010/0100469 A1 | 4/2010 | Buchanan et al. | |
| 2010/0153247 A1 | 6/2010 | DiPaolo et al. | |
| 2010/0153260 A1 | 6/2010 | Moebs et al. | |
| 2010/0199338 A1 | 8/2010 | Craddock et al. | |
| 2010/0312700 A1 | 12/2010 | Coulter et al. | |
| 2011/0076989 A1 | 3/2011 | Lynch | |
| 2011/0125643 A1 | 5/2011 | Cameo et al. | |
| 2011/0153447 A1 | 6/2011 | Thomas et al. | |
| 2011/0161182 A1 | 6/2011 | Racco | |
| 2011/0183745 A1 | 7/2011 | Gagner et al. | |
| 2011/0194676 A1 | 8/2011 | Hogan et al. | |
| 2011/0201408 A1* | 8/2011 | Gagner ................. G06Q 20/04 |
| | | | 463/43 |
| 2011/0208629 A1 | 8/2011 | Benefield et al. | |
| 2011/0295731 A1 | 12/2011 | Waldron, III et al. | |

(56) References Cited

U.S. PATENT DOCUMENTS

| | | |
|---|---|---|
| 2012/0046011 A1* | 2/2012 | Thakur .............. G06Q 20/386 |
| | | 455/406 |
| 2012/0054093 A1 | 3/2012 | Schamer et al. |
| 2012/0130786 A1 | 5/2012 | Marshall |
| 2012/0130894 A1 | 5/2012 | Pendleton |
| 2012/0179604 A1 | 7/2012 | Blain et al. |
| 2012/0185843 A1 | 7/2012 | Burke et al. |
| 2012/0197743 A1 | 8/2012 | Grigg et al. |
| 2013/0013506 A1 | 1/2013 | Wiggins et al. |
| 2013/0036058 A1 | 2/2013 | Kelly et al. |
| 2013/0067328 A1 | 3/2013 | Salyards et al. |
| 2013/0080471 A1 | 3/2013 | Forte et al. |
| 2013/0103577 A1 | 4/2013 | Lawson et al. |
| 2013/0145148 A1 | 6/2013 | Shablygin et al. |
| 2013/0204862 A1 | 8/2013 | Marchiori |
| 2013/0212021 A1 | 8/2013 | Kingston et al. |
| 2013/0269014 A1 | 10/2013 | Gerber |
| 2013/0339188 A1 | 12/2013 | Mohamed et al. |
| 2013/0346177 A1 | 12/2013 | Jung et al. |
| 2013/0346302 A1* | 12/2013 | Purves .............. G06Q 20/102 |
| | | 705/40 |
| 2014/0012746 A1 | 1/2014 | Hanson et al. |
| 2014/0032406 A1 | 1/2014 | Roach et al. |
| 2014/0038546 A1 | 2/2014 | Neal et al. |
| 2014/0067654 A1 | 3/2014 | Hanson et al. |
| 2014/0081853 A1 | 3/2014 | Sanchez et al. |
| 2014/0082097 A1 | 3/2014 | Athale et al. |
| 2014/0089191 A1* | 3/2014 | Brown .............. G06Q 20/382 |
| | | 705/44 |
| 2014/0095392 A1 | 4/2014 | Rose et al. |
| 2014/0129303 A1 | 5/2014 | Aiglstorfer |
| 2014/0156785 A1 | 6/2014 | Kammula et al. |
| 2014/0164062 A1 | 6/2014 | Wen et al. |
| 2014/0164199 A1 | 6/2014 | Wilkes |
| 2014/0172695 A1 | 6/2014 | Kanjlia et al. |
| 2014/0195422 A1 | 7/2014 | Zheng et al. |
| 2014/0214499 A1 | 7/2014 | Hudson et al. |
| 2014/0214668 A1 | 7/2014 | Lotter et al. |
| 2014/0258088 A1* | 9/2014 | Belarj .............. G06Q 20/405 |
| | | 705/38 |
| 2014/0278884 A1 | 9/2014 | Schuler et al. |
| 2014/0279332 A1 | 9/2014 | Poole |
| 2014/0279438 A1 | 9/2014 | Reiff et al. |
| 2014/0279460 A1 | 9/2014 | Weiss et al. |
| 2014/0279513 A1 | 9/2014 | Dodds-Brown et al. |
| 2014/0310153 A1 | 10/2014 | Patel |
| 2014/0330714 A1 | 11/2014 | Felse et al. |
| 2014/0358799 A1 | 12/2014 | Kingston et al. |
| 2015/0006340 A1 | 1/2015 | Lloyd et al. |
| 2015/0026025 A1 | 1/2015 | Calman et al. |
| 2015/0026026 A1 | 1/2015 | Calman et al. |
| 2015/0058219 A1 | 2/2015 | Grossman et al. |
| 2015/0067822 A1 | 3/2015 | Randall |
| 2015/0073952 A1 | 3/2015 | Ventura et al. |
| 2015/0073959 A1 | 3/2015 | Connors et al. |
| 2015/0081491 A1 | 3/2015 | Brereton et al. |
| 2015/0081495 A1 | 3/2015 | Randall |
| 2015/0095216 A1 | 4/2015 | Van Heerden et al. |
| 2015/0100442 A1 | 4/2015 | Van Heerden et al. |
| 2015/0100443 A1 | 4/2015 | Van Heerden et al. |
| 2015/0106267 A1 | 4/2015 | Lee |
| 2015/0112870 A1 | 4/2015 | Nagasundaram et al. |
| 2015/0127530 A1 | 5/2015 | Wick et al. |
| 2015/0143256 A1 | 5/2015 | Panchawagh-Jain et al. |
| 2015/0161576 A1 | 6/2015 | Keen |
| 2015/0178693 A1 | 6/2015 | Solis |
| 2015/0178725 A1 | 6/2015 | Poetsch |
| 2015/0193774 A1 | 7/2015 | Wetzel |
| 2015/0193866 A1 | 7/2015 | Van Heerden et al. |
| 2015/0193867 A1 | 7/2015 | Del Vecchio et al. |
| 2015/0193868 A1 | 7/2015 | Del Vecchio et al. |
| 2015/0193869 A1 | 7/2015 | Del Vecchio et al. |
| 2015/0206252 A1 | 7/2015 | Rephlo et al. |
| 2015/0220923 A1 | 8/2015 | Vasant Akole et al. |
| 2015/0227869 A1 | 8/2015 | Saraf et al. |
| 2015/0262182 A1* | 9/2015 | Gervais .............. G06Q 20/405 |
| | | 705/44 |
| 2015/0262183 A1 | 9/2015 | Gervais et al. |
| 2015/0278796 A1 | 10/2015 | Jiang et al. |
| 2015/0302444 A1 | 10/2015 | Sundaresan |
| 2015/0339641 A1 | 11/2015 | Krietzman et al. |
| 2015/0379072 A1 | 12/2015 | Dirac et al. |
| 2015/0379644 A1 | 12/2015 | Danielak et al. |
| 2016/0019536 A1 | 1/2016 | Ortiz et al. |
| 2016/0042405 A1 | 2/2016 | Zeng et al. |
| 2016/0048842 A1 | 2/2016 | Trivedi et al. |
| 2016/0063478 A1 | 3/2016 | Koeppel et al. |
| 2016/0078503 A1 | 3/2016 | Wang |
| 2016/0104237 A1 | 4/2016 | Kanjlia et al. |
| 2016/0104238 A1 | 4/2016 | Loganathan et al. |
| 2016/0162923 A1 | 6/2016 | Meier |
| 2016/0180315 A1 | 6/2016 | Kanamori |
| 2016/0180316 A1 | 6/2016 | Wang et al. |
| 2016/0189123 A1 | 6/2016 | Lucia Specogna et al. |
| 2016/0203483 A1 | 7/2016 | Bridgewater et al. |
| 2016/0225278 A1 | 8/2016 | Leddy |
| 2016/0247233 A1 | 8/2016 | Page |
| 2016/0300204 A1 | 10/2016 | Guido et al. |
| 2016/0328692 A1 | 11/2016 | Camps et al. |
| 2016/0328698 A1 | 11/2016 | Kumaraguruparan et al. |
| 2016/0343075 A1 | 11/2016 | Chandler |
| 2017/0004506 A1 | 1/2017 | Steinman et al. |
| 2017/0011398 A1 | 1/2017 | Narisimhan |
| 2017/0011399 A1 | 1/2017 | Steinlicht et al. |
| 2017/0046651 A1 | 2/2017 | Lin et al. |
| 2017/0046688 A1 | 2/2017 | Pande |
| 2017/0061535 A1* | 3/2017 | Williams .............. G06Q 20/102 |
| 2017/0063735 A1 | 3/2017 | Gillespie et al. |
| 2017/0063840 A1 | 3/2017 | Krishnaia |
| 2017/0076377 A1 | 3/2017 | Myers |
| 2017/0083930 A1 | 3/2017 | Nagaraj et al. |
| 2017/0091765 A1 | 3/2017 | Lloyd et al. |
| 2017/0132719 A1* | 5/2017 | Rogers .............. G06Q 40/12 |
| 2017/0154351 A1 | 6/2017 | Venugopalan et al. |
| 2017/0163471 A1 | 6/2017 | Zheng |
| 2017/0178110 A1 | 6/2017 | Swanson et al. |
| 2017/0178131 A1* | 6/2017 | Fernandez .............. G06Q 20/10 |
| 2017/0178135 A1 | 6/2017 | Bull et al. |
| 2017/0193501 A1 | 7/2017 | Cole et al. |
| 2017/0195993 A1* | 7/2017 | Cole .............. G06Q 20/40 |
| 2017/0243028 A1 | 8/2017 | LaFever et al. |
| 2017/0293972 A1 | 10/2017 | van Bemmelen |
| 2017/0300895 A1 | 10/2017 | Sanmugan |
| 2017/0300906 A1 | 10/2017 | Sanmugam |
| 2017/0315700 A1* | 11/2017 | Rolih .............. G06F 3/04817 |
| 2017/0316506 A1 | 11/2017 | Lesner et al. |
| 2017/0323345 A1 | 11/2017 | Flowers et al. |
| 2017/0344985 A1 | 11/2017 | Weisser |
| 2017/0364919 A1 | 12/2017 | Ranganath et al. |
| 2018/0005229 A1 | 1/2018 | Grassadonia |
| 2018/0005323 A1 | 1/2018 | Grassadonia |
| 2018/0025421 A1 | 1/2018 | Schamer et al. |
| 2018/0026960 A1 | 1/2018 | Votaw et al. |
| 2018/0060843 A1 | 3/2018 | Maheshwari |
| 2018/0068294 A1 | 3/2018 | Melgar et al. |
| 2018/0082321 A1 | 3/2018 | Boccardi et al. |
| 2018/0114212 A1 | 4/2018 | Beck et al. |
| 2018/0165977 A1 | 6/2018 | Johansen et al. |
| 2018/0181966 A1 | 6/2018 | Rao et al. |
| 2018/0189829 A1 | 7/2018 | Patwardhan et al. |
| 2018/0197171 A1* | 7/2018 | Steinman .............. G06Q 20/385 |
| 2018/0218366 A1 | 8/2018 | Storiale |
| 2018/0240108 A1 | 8/2018 | Boss et al. |
| 2018/0253727 A1* | 9/2018 | Ortiz .............. G06Q 20/108 |
| 2018/0276287 A1 | 9/2018 | Kurian et al. |
| 2018/0336543 A1 | 11/2018 | Van Os et al. |
| 2018/0336557 A1 | 11/2018 | Khurana et al. |
| 2018/0367526 A1 | 12/2018 | Huang et al. |
| 2019/0020651 A1 | 1/2019 | Soon-Shiong et al. |
| 2019/0037642 A1 | 1/2019 | Price et al. |
| 2019/0110188 A1 | 4/2019 | Dunjic et al. |
| 2019/0114702 A1 | 4/2019 | Nicholson et al. |
| 2019/0122307 A1 | 4/2019 | Sayed |
| 2019/0180524 A1 | 6/2019 | Palmer et al. |

(56) References Cited

U.S. PATENT DOCUMENTS

| | | |
|---|---|---|
| 2019/0197617 A1 | 6/2019 | Chopra |
| 2019/0205872 A1 | 7/2019 | Tourne et al. |
| 2019/0207754 A1 | 7/2019 | Iyer et al. |
| 2019/0251249 A1 | 8/2019 | Sprague et al. |
| 2019/0259095 A1 | 8/2019 | Templeton |
| 2019/0295158 A1 | 9/2019 | Wu |
| 2019/0303924 A1 | 10/2019 | Knorr |
| 2019/0311566 A1 | 10/2019 | Benkreira et al. |
| 2019/0325448 A1 | 10/2019 | Barakat et al. |
| 2019/0354979 A1 | 11/2019 | Crawford |
| 2019/0355063 A1* | 11/2019 | Probetts ............... G06Q 40/06 |
| 2019/0355464 A1 | 11/2019 | Brownfield |
| 2019/0377864 A1 | 12/2019 | Mossoba et al. |
| 2019/0385223 A1 | 12/2019 | Sharma |
| 2019/0392441 A1 | 12/2019 | Lee et al. |
| 2020/0065809 A1 | 2/2020 | Elfeky |
| 2020/0074565 A1 | 3/2020 | Dotter |
| 2020/0090261 A1 | 3/2020 | Tumulty, II et al. |
| 2020/0104845 A1 | 4/2020 | Riechers et al. |
| 2020/0105254 A1 | 4/2020 | Sarir et al. |
| 2020/0111494 A1 | 4/2020 | Lau et al. |
| 2020/0120049 A1 | 4/2020 | Galloway |
| 2020/0126087 A1 | 4/2020 | Benkreira et al. |
| 2020/0126135 A1* | 4/2020 | Venuraju ............. G06Q 50/188 |
| 2020/0175566 A1 | 6/2020 | Bender et al. |
| 2020/0211013 A1 | 7/2020 | Fraceschi et al. |
| 2020/0265457 A1 | 8/2020 | Miller et al. |
| 2020/0286093 A1 | 9/2020 | Agrawal et al. |
| 2020/0302425 A1 | 9/2020 | Artemiw et al. |
| 2020/0342379 A1 | 10/2020 | Phillips et al. |
| 2020/0349642 A1* | 11/2020 | Kumar ................. G06Q 40/025 |
| 2020/0380528 A1 | 12/2020 | Ganapathy et al. |
| 2020/0394638 A1* | 12/2020 | Mcleod ............... G06Q 20/351 |
| 2020/0402155 A1 | 12/2020 | Kurian et al. |
| 2021/0019718 A1 | 1/2021 | Moskowitz et al. |
| 2021/0019755 A1 | 1/2021 | Omojola et al. |
| 2021/0019822 A1* | 1/2021 | Edwards ............... G06Q 40/02 |
| 2021/0042723 A1 | 2/2021 | Walters |
| 2021/0042724 A1 | 2/2021 | Rathod |
| 2021/0073906 A1* | 3/2021 | Bailey ................. G06Q 50/188 |
| 2021/0082043 A1 | 3/2021 | Kanjlia et al. |
| 2021/0110373 A1 | 4/2021 | Bhusri et al. |
| 2021/0110470 A1 | 4/2021 | Schamer et al. |
| 2021/0133869 A1* | 5/2021 | Brock ................ G06Q 20/4037 |
| 2021/0182850 A1 | 6/2021 | Morse et al. |
| 2021/0217104 A1 | 7/2021 | Phillips et al. |
| 2021/0241333 A1 | 8/2021 | Lindsey et al. |
| 2022/0005036 A1 | 1/2022 | Reses et al. |
| 2022/0084134 A1 | 3/2022 | Brock et al. |
| 2022/0114602 A1 | 4/2022 | Horn, III et al. |
| 2023/0049204 A1 | 2/2023 | Reses et al. |

FOREIGN PATENT DOCUMENTS

| | | |
|---|---|---|
| WO | WO 2015192208 A1 | 12/2015 |
| WO | WO 2017/072647 A1 | 5/2017 |

OTHER PUBLICATIONS

"Consumers and Mobile Financial Services", Federal Reserve, 2016. Available at: https://www.federalreserve.gov/ecomersdata/consumers-and-mobile-financial-services-report-201603.pdf (Year: 2016).

"U.S. Bank ReliaCard", 2019. Available at: https: ware vorks.com/Content/USB- ReliaCard%20FAQ.pdf (Year: 2019).

"Impacts of Overdraft Programs on Consumers", Jun. 2012, Available At: https://www.federalregister.gov/documents/2012/02/28/2012-4576/impacts-of-overdraft-programs-on-consumers (Year: 2012), 4 pages.

"Protecting Consumers from Abusive Overdraft Fees", Feb. 2009, Available At: https://www.govinfo.gov/content/pkg/CHRG-111shrg56975/pdf/CHRG-111shrg56975.pdf (Year: 2009), 70 pages.

12 CFR 230—Truth In Savings (Regulation DD), Jan. 1, 2012. Available at: https://www.govinfo.gov/content/pkg/CFR-2012-title12-vol4/xml/CFR-2012-title12-vol4-part230.xml (Year: 2012), 38 pages.

Ameris Bank, "Advanced Login Authentication", 2016, Available at: https://www.amerisbank.com/AmerisBank/media/Documents/Advanced-Login-Authentication.pdf (Year: 2016), 3 pages.

Digital Identity Guidelines, NIST 800-63-3, 2017, Available at: https://nvlpubs.nist.gov/nistpubs/SpecialPublications/NIST.SP.800-63-3.pdf (Year: 2017), 75 pages.

FAQs on FFIEC Guidance on Authentication in an Internet Banking Environment, Aug. 2015. Available at: https://www.ffiec.gov/pdf/authentication_faq.pdf. (Year: 2015), 7 pages.

FDIC, "Overdraft Payment Programs and Consumer Protection", 2010. Available at: https://www.fdic.gov/news/financial-institution-letters/2010/fil10081.pdf (Year: 2010), 5 pages.

Online Banking Enhanced Authentication, 2014, Available at: https://www.eecu.org/EECU/media/pdfs/ EECU-enhanced-authentication-FAQ.pdf (Year: 2014), 4 pages.

Personal knowledge questions for fallback authentication: Security questions in the era of Facebook, 2008, Available at: http:// cups.cs.cmu.edu/soups/2008/proceedings/p13Rabkin.pdf (Year: 2008).

PNC Bank, "Online Bill Pay", 2013. Available at: https://content.pncmc.com/live/pnc/SCT/pdfs/Online_Bill_Pay.pdf (Year: 2013), 1 page.

UNFCU Digital Banking, 2018, Available at: https://digital.unfcu.org/Apps/Content/Assets/Custom/UNFCU_Digital_Banking_Guide.pdf (Year 2018), 12 pages.

United One Credit Union, 2016, Available at: https://www.unitedone.org/files/unitedone/1/file/How%20to%20Reset%20IB% 20Security% 20Questions.pdf (Year: 2016), 2 pages.

"Overdraft Protection: Opt-In Requirements and Related Marketing Issues", OCC Bulletin 2010-15, Apr. 12, 2010 Available at: https://www.occ.treas.gov/news-issuances/bulletins/2010/bulletin-2010-15.html (Year: 2010).

"PNC Financial (PNC) Removes NSF Fees for Consumer Accounts", Zacks Equity Research, Yahoo Finance, Aug. 15, 2022, 3 pages.

"PNC Launches Low Cash Mode(SM) to Address $17 Billion in Industry Overdraft Fees", The PNC Financial Services Group, Inc., Apr. 13, 2021, 5 pages.

"StackViews." Jun. 17, 2019. Developer.Apple.com https://developer.apple.com/library/archive/documentation/UserExperience/Conceptual/AutolayoutPG/LayoutUsingStackViews.html (Year: 2019).

"UIStackView", Jul. 25, 2019. https://developer.apple.com/documentation/uikit/uistackview (Year: 2019).

Chowdhury, Kunal. "Using StackPanel to define a stacked layout." O坦 Reilly Learning Platform. Mastering Visual Studio. 2017 (Year: 2017).

Cocheo, Steve, "How PNC Adapted Its Virtual Wallet to Solve Overdraft Complaints", The Financial Brand, Aug. 25, 2021, 8 pages.

FDIC Law, Regulations, Related Acts, 6000—Consumer Protection, Jun. 30, 2016, 23 pages. Available at https://www.ecfr.gov/current/title-12/chapter-X/part-1005/subpart-A?toc=1 (Year: 2016, updated for 2023).

Hrushka, Anna, "PNC's 'low cash mode' gives users 24-hour overdraft buffer", BANKINGDIVE, Apr. 13, 2021, 3 pages.

Prior, Jon, "How PNC responded to customers' complaints about overdraft fees", American Banker, Apr. 13, 2021, 5 pages.

Sabatini, Patricia, "Sick of overdraft fees? Pittsburgh's largest bank has a unique answer", Pittsburgh Post-Gazette, Apr. 14, 2021, 2 pages.

Tompor, Susan, "Banks, credit unions making changes on how sky-high overdraft fees are handled", Detroit Free Press, Jun. 11, 2021, 9 pages.

"PCI DSS Quick Reference Guide: Understanding the Payment Card Industry Data Security Standard version 3.2.1", Jul. 2018, 39 pages. Available at: https://listings.pcisecuritystandards.org/documents/PCI_DSS-QRG-v3_2_ 1.pdf (Year: 2018).

Congressional Research Service, "Data Protection Law: An Overview", Mar. 2019, 79 pages. Available at: https://crsreports.congress.gov/product/pdf/R/R45631 (Year: 2019).

\* cited by examiner

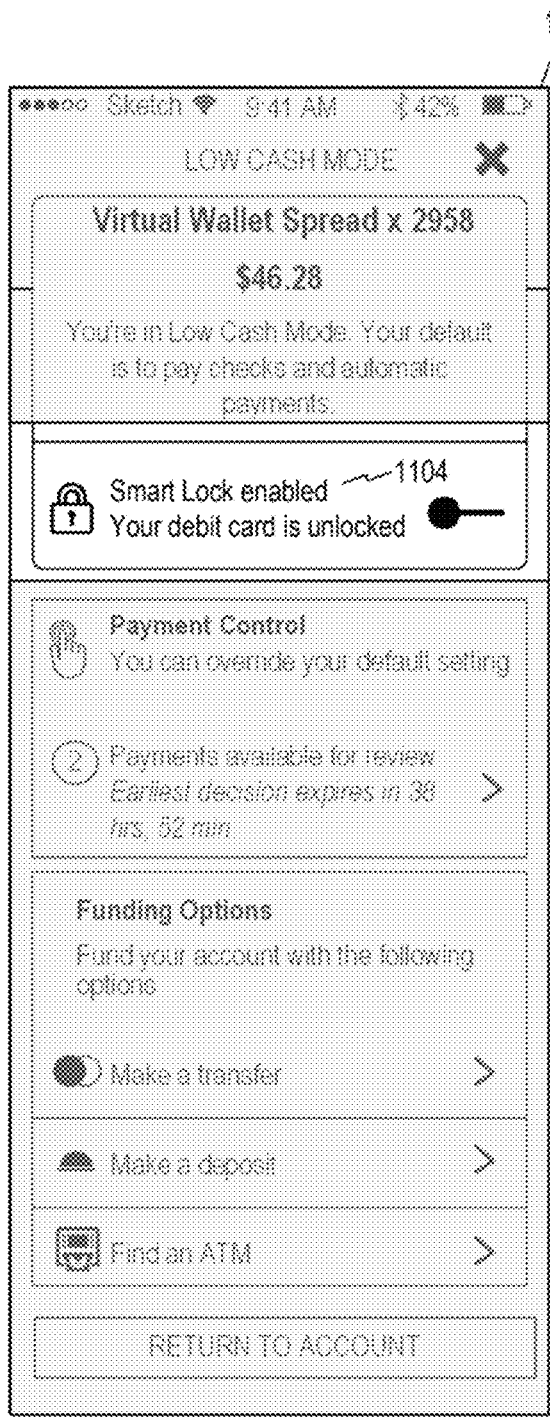
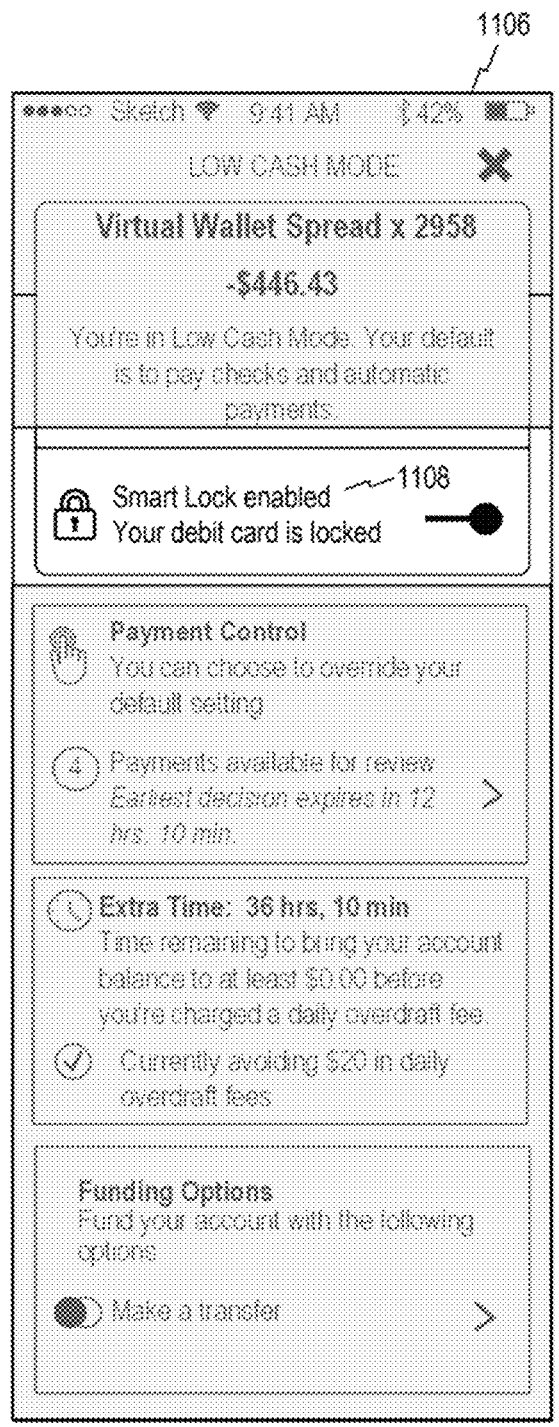
FIG. 11A  FIG. 11B

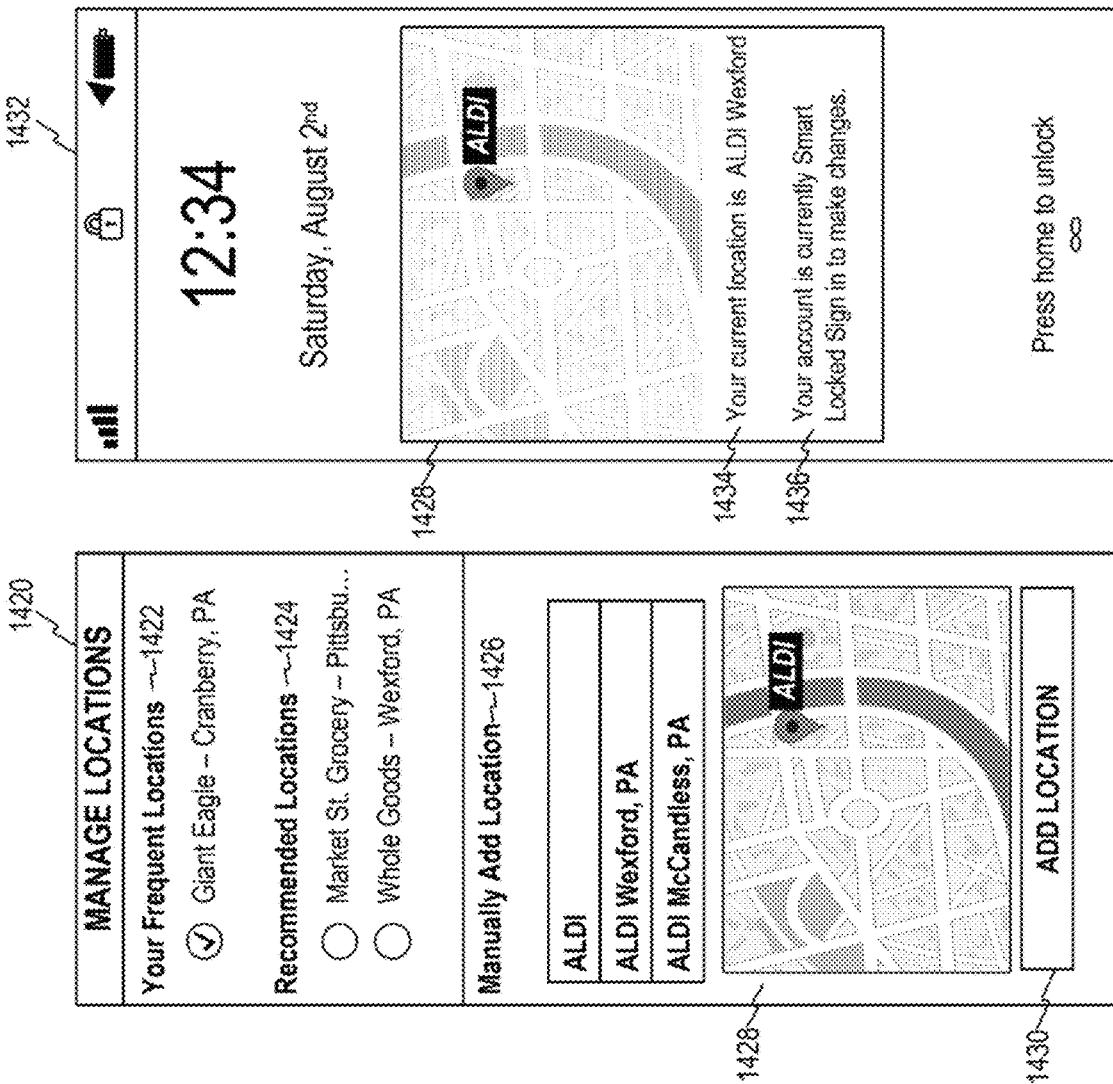

SYSTEMS AND METHODS FOR ELECTRONIC DATABASE COMMUNICATIONS

CROSS-REFERENCE TO RELATED APPLICATIONS

This application is a continuation of U.S. application Ser. No. 17/027,250, filed Sep. 21, 2020, which claims priority to Provisional U.S. Patent Application Ser. No. 62/983,572, filed Feb. 28, 2020, the disclosures of which are incorporated herein by reference.

TECHNICAL FIELD

The disclosed embodiments relate to systems and methods for providing financial services, more particularly, providing customers the options to manage their financial accounts when their account balance is low, and additionally, to an application that provides comprehensive transactional services for customers managing their financial accounts in a low cash mode.

BACKGROUND

Financial service providers are rapidly expanding the use of mobile services and mobile applications. Currently, most financial service providers provide mobile banking services which allow customers to perform basic functions and transactions remotely, for example, by using an application on a mobile device such as a cell phone or a tablet having an online web interface. Mobile banking allows customers to manage their money without visiting a physical brick and mortar branch bank location. Customers may check account balances, pay bills, transfer funds, send money to others, deposit checks, receive customer support, apply for loans, receive alerts, apply for credit cards, manage benefits, manage credit/debit cards, review transactions, open new accounts, and perform many other banking services on a mobile application on a mobile device without travelling to a physical location. The financial services providers provide these functions to customers electronically via an application without the need for in-person teller services.

While these banking functions are useful for enabling funds to be electronically transferred without the need for paper checks or teller support, they are limited to certain transactions. Moreover, these exemplary banking functions are further limited when a user or customer's account balance is low or falls beneath a predetermined threshold dollar value (e.g. $25). As a result, what is needed is an online banking application that provides customers the ability to manage their financial accounts and perform banking operations when their account balance is low. In particular, what is needed is a mobile banking application that provides options for a user operating in a low cash mode, provides alerts to customers when they enter low cash mode, and prevents overdraft once a low cash mode is reached. Additionally, what is needed are preventive options, such as providing personal loans, transferring funds, facilitating automatic and manual transfers, cancelling transactions including cancellation of pending Automated Clearing House ("ACH") (or pending checks that will generate the overdraft(s)), and accelerating pending ACH/payroll deposits.

Furthermore, what is needed is a mobile application that provides tiered overdraft fees based on the extent to which an account is negative, incorporates synthetic data and machine learning into an ACH and analytics, provides mobile network transfers (for added data protection), incorporates machine learning algorithms for learning customer transaction tendencies, provides fraud protection features in a mobile application specifically relating to the issues of a low cash mode and/or overdraft scenario, and integrates a low cash mode into a separate virtual wallet application. What is needed is a link between a customer's virtual wallet and a customer's social media (such as, a Facebook account), providing a notification channel to customers in order to provide an alert that a purchase will overdraft an account before a purchase is made while a customer's account is in low cash mode. What is needed is an overall increase in efficiency in providing financial services through automation, including, for example, through automated balance confirmation.

Moreover, what is needed is a mobile application that provides an automatic card lock feature that activates automatically when an account enters low cash mode with an option that allows a user to turn off within the application. What is further needed is an automatic card lock feature that activates automatically when an account enters a low cash mode based on a predicted balance (e.g., a payment or direct deposit scheduled for tomorrow) as well as based on a customer's current balance. What is needed is the ability for a customer to select and switch between overdraft protection features (e.g., pay, cancel, protection through loans or transfers and accelerated ACH/payroll deposits) on a mobile application without the need for bank intervention. What is needed is a mobile application that provides customers the option to pay some, but not all, transactions that would overdraft an account (such an application would also facilitate the customer's ability to prioritize transactions and potentially delay the payment of some transactions and would differentiate point of sale transactions from ACH transactions, checks, and scheduled payments).

Additionally, what is needed is a mobile application that enables a customer to approve or deny spending for an entire day while an account is in low cash mode or while a card lock feature is activated, a mobile application that provides an alert notifying a customer of the ability to approve or deny spending for a day, and that provides an alert for a customer to configure how an account can spend for the day. Further, what is needed is a mobile application that provides a debit card smart lock feature, with a threshold that may be different from a low cash mode threshold and that can be disabled in a mobile application, that automatically prevents a customer from using the locked card when a customer's balance falls below a set threshold value, and allows a customer to manually or automatically draw funds from a second account when a first account has insufficient funds.

Furthermore, what is needed is a feature that allows a user to block certain mobile application functionality from a web application when a customer's phone is lost or stolen. Further, what is needed is a mobile application that displays the amount of (specified) time a customer has to cure an overdraft (such as a grace period), which may help customers who otherwise don't handle money or time well to remember to cure an overdraft, that notifies a customer at predetermined times during an overdraft grace period using push notifications to a user's phone or messages to the user, which may also help customers remember to cure an overdraft, and that personalizes a grace period based on customer characteristics.

What is needed are personalizing characteristics that may include offering a customer more or less time for larger or smaller overdraft amounts, offering a customer a longer grace period if their balance is ordinarily high, offering a customer a longer grace period if a customer is in good standing with a bank, as indicated, for example, by more debit card use, higher average balance, or higher direct deposits. Personalizing characteristics that are needed may also include extending a grace period if a customer makes a payment for less than an overdraft fee, offering a customer a fixed amount of overdraft time per month that may be spread over the month, or offering a customer a longer or shorter grace period over time. If, for example, a customer overdrafts once with a grace period of 48 hours, the next overdraft may have a grace period of 24 hours. If, for example, a customer does not overdraft for several months, a customer may earn additional grace period time. Personalizing characteristics that are needed may further include carrying a customer's extra grace period time over from month to month, with a cap on the total overdraft time available, giving customers a bucket of accrued grace period time that they can add to their current grace period to cash out the accrued time, offering a customer a grace period as a reward/relationship benefit as a part of a package, and/or selling a customer additional grace period time by which to cure a negative balance.

Furthermore, what is needed is a mobile application that allows a customer to dynamically set reminders to make a scheduled payment later or to set a reminder to make the payment later, that updates other applications, focusing on the ability to automatically reschedule payments on behalf/invocation of a virtual wallet calendar, that charges a customer a negative balance fee instead of a transactional/per item fee for insufficient funds, that recommends cancelling particular scheduled payments but proceeding with others in a way that minimizes/prevents overdraft or prevents other fees, and that prevents a given customer's balance to drop below a given tolerance value by allowing a customer to choose certain scheduled payments to process and rendering the remaining payments no longer actionable.

Moreover, what is needed is a mobile application that provides a predictive cash flow feature, which uses machine learning to predict a customer's expenses and alerts a customer to potential periods during which a customer will have a low or negative balance, and a predictive cash mode feature that allows a customer to manually add payments flagged by a predictive cash mode to help prevent a low or negative balance. What is also needed is a mobile application that links a customer's account to social media to facilitate communication with a customer by, for example, sending a message to a customer through Facebook Messenger, that uses geolocation technology to alert a customer who is entering a store that the customer's account is in low cash mode, that provides a feature to include spouses or joint users, so that a joint user on a customer's account is also notified when another joint user arrives at a geographic location, such as a store while the associated account is in low cash mode, that turns on this feature at a predicted danger day or at particular high-risk stores for the customers, and that obtains the customer's consent for the use of this feature.

Finally, what is needed is a mobile application that allows a user to designate particular transactions or locations to process even while in a low cash mode (for example, a customer may want the ability to buy groceries, even while in low cash mode), and that provides a user-friendly graphical user interface of a low cash mode feature.

SUMMARY

One aspect of the present disclosure is directed to a system for managing a financial account in a low cash mode. The system may include at least one processor; and at least one memory configured to execute the instructions to perform operations. The operations may include providing an interface accessible via a user device registered with a first account; providing, via the interface, a notification to a user when a balance in the first account is less than a threshold value; presenting, when the first account balance is less than a threshold value, an option for a transfer request; receiving, via the interface, a selection of the option for the transfer request to connect the first account with a second account; transferring cash, based on the request, from the second account to the first account; notifying, via the interface, the user that cash has been transferred from the second account to the first account; and further notifying, via the interface, the user that the balance in the first account is greater than the threshold value.

Another aspect of the present disclosure is directed to a method for managing a financial account in a low cash mode. The method may perform operations including providing an interface accessible via a user device registered with a first account; providing, via the interface, a notification to a user when a balance in the first account is less than a threshold value; presenting, when the first account balance is less than a threshold value, an option for a transfer request; receiving, via the interface, a selection of the option for the transfer request to connect the first account with a second account; transferring cash, based on the request, from the second account to the first account; notifying, via the interface, the user that cash has been transferred from the second account to the first account; and further notifying, via the interface, the user that the balance in the first account is greater than the threshold value.

Yet another aspect of the present disclosure is directed to a non-transitory computer-readable medium. The non-transitory computer readable medium may perform a method for managing a financial account in a low cash mode. The method may perform operations including providing an interface accessible via a user device registered with a first account; providing, via the interface, a notification to a user when a balance in the first account is less than a threshold value; presenting, when the first account balance is less than a threshold value, an option for a transfer request; receiving, via the interface, a selection of the option for the transfer request to connect the first account with a second account; transferring cash, based on the request, from the second account to the first account; notifying, via the interface, the user that cash has been transferred from the second account to the first account; and further notifying, via the interface, the user that the balance in the first account is greater than the threshold value.

Aspects of the present disclosure may include systems, methods, and computer readable media for providing notifications to a customer, the operations comprising associating the customer with an account, associating the account with a mobile device, determining an account balance of the account, and determining, based on the account balance, whether the account is deemed to be in a low cash mode state. The operations may further comprise providing, via the mobile device, a notification to the customer when the account enters the low-cash mode state and providing, via the mobile device, a notification to the customer when the account enters the low-cash mode state.

Aspects of the present disclosure may additionally include systems, methods, and computer readable media for preventing an account from entering a low cash mode state, the operations comprising associating the customer with an account, associating the account with a mobile device, determining an account balance of the account, and determining, based on the account balance, whether the account is deemed to be in a low cash mode state. The operations may further comprise providing, via the mobile device, a notification to the customer when the account enters the low-cash mode state and providing, via the mobile device, a notification to the customer when the account enters the low-cash mode state.

Aspects of the present disclosure may additionally include systems, methods, and computer readable media for preventing an account from entering a low cash mode state, the operations comprising associating the customer with an account, associating the account with a mobile device, determining an account balance of the account, and predicting, as a result of an initiated transaction, that the initiated transaction will result in the first account entering the low cash mode state. The operations may further comprise providing, via the mobile device, a notification to the customer when the account is predicted to enter the low-cash mode state and presenting, with the notification, options to the customer to manage the first account while the first account is predicted to enter the low cash mode state.

Aspects of the present disclosure may additionally include systems, methods, and computer readable media for preventing an account from entering a low cash mode state, the operations comprising associating a customer with a first account, associating the customer with a second account, linking the second account with the first account, determining a first account balance of the first account, and determining, based on the first account balance, whether the first account is deemed to be in the low cash mode state. The operations may further comprise transferring, automatically, when the first account is deemed to be in the low cash mode state, funds from the second account into the first account, processing the initiated transaction, and presenting a notification to the customer.

Aspects of the present disclosure may additionally include systems, methods, and computer readable media for determining a negative balance fee, the operations comprising associating a customer with a first account, determining a first account balance of the first account, and assessing, when the first account balance is negative, the negative balance fee.

Aspects of the present disclosure may additionally include systems, methods, and computer readable media for generating synthetic data, the operations comprising associating a customer with an account, storing data associated with the account, applying machine learning to the data to generate synthetic field-level data, and substituting the synthetic field-level data in place of field-level data associated with the account in an Automated Clearing House transaction or a mobile network transfer.

Aspects of the present disclosure may additionally include systems, methods, and computer readable media for analyzing historical data, the operations comprising associating a customer with an account, storing data associated with the account, applying machine learning to the data to determine transaction tendencies, and using the transaction tendencies to predict an account balance.

Aspects of the present disclosure may additionally include systems, methods, and computer readable media for presenting and using account management options, the operations comprising associating a customer with an account, providing options for managing the account, and implementing the selected options.

Aspects of the present disclosure may additionally include systems, methods, and computer readable media for integrating social media and financial services, the operations comprising associating a customer with a first account at a financial institution, associating the customer with a social media account, linking the first account with the social media account, determining a first account balance of the first account, determining, based on the first account balance, whether the first account is deemed to be in a low cash mode state, and providing a notification to the customer when the first account is deemed to be in the low cash state.

Aspects of the present disclosure may additionally include systems, methods, and computer readable media for integrating social media and financial services the operations comprising associating a customer with a first account at a financial institution, associating the customer with a social media account, presenting an option for the customer to grant the financial institution permission to link the first account and the social media account, receiving permission to link the first account and the social media account, receiving permission to link the first account and the social media account, and linking the first account with the social media account. The operations may further comprise determining a first account balance of the first account, determining, based on the first account balance, whether the first account is deemed to be in a low cash mode state, and providing a notification to the customer when the first account is deemed to be in the low cash mode state using the social media account.

Aspects of the present disclosure may additionally include systems, methods, and computer readable media for preventing a negative account balance, the operations comprising associating a customer with an account at a financial institution, associating the account with a mobile device, determining a first account balance of the first account, determining, based on the first account balance, whether the first account is deemed to be in a low cash mode state, identifying a potential purchase and a potential purchase amount, determining, based on the potential purchase amount and the first account balance, whether the potential purchase will result in a negative first account balance, providing a notification to the customer that the potential purchase will result in a negative first account balance.

Aspects of the present disclosure may additionally include systems, methods, and computer readable media for preventing a negative account balance, the operations comprising associating a customer with an account at a financial institution, associating a customer with an account at a financial institution, determining a first account balance of the first account, determining, based on the first account balance, whether the first account is deemed to be in a low cash mode state, receiving a request for transfer of funds from a transaction initiated by the card, and denying the request for monetary transfer while the first account is deemed to be in the low cash mode state.

Aspects of the present disclosure may additionally include systems, methods, and computer readable media for predicting low-cash mode state, the operations comprising associating a customer with a first account, storing financial history data associated with the customer, accessing non-financial data, analyzing the financial history data and the non-financial data, determining, a future account balance of the first account, based on scheduled transactions, the financial history data, and the non-financial data, and determining whether the first account is deemed to be in the low-cash mode state based on the future account balance.

Aspects of the present disclosure may additionally include systems, methods, and computer readable media for avoiding negative account balance, the operations comprising providing an interface accessible via a user device associated with a first account, associating a customer with the first account at a financial institution, determining a first account balance of the first account, determining, based on the first account balance, whether the first account is less than a threshold value, providing, via the interface, a notification to the customer when the first account balance is less than the threshold value, and providing, via the interface, a notification to the customer when the first account balance is less than the threshold value.

Aspects of the present disclosure may additionally include systems, methods, and computer readable media for avoiding negative account balance, the operations comprising associating a customer with a first account, determining a first account balance of the first account, determining, based on the first account balance, whether the first account is deemed to be in a low cash mode state, providing a notification to the customer when the first account is deemed to be in the low cash mode state, and presenting, with the notification, options to the customer to manage the first account while the first account is deemed to be in the low cash mode state.

Aspects of the present disclosure may additionally include systems, methods, and computer readable media for managing accounts, the operations comprising associating a customer with an account, determining an account balance of the account, determining, based on the account balance, whether the account is deemed to be in a low cash mode state, determining whether smart lock is activated, providing a first notification to the customer when the account is deemed to be in the low cash mode state, providing a second notification to the customer when smart lock is activated, and presenting, with the first notification, at least one option to the customer to manage the first account.

Aspects of the present disclosure may additionally include systems, methods, and computer readable media for managing accounts, the operations comprising associating a customer with an account, associating a card with the account, determining whether smart lock is activated, receiving a request to transfer funds from a transaction initiated by the card, and denying, when smart lock is activated, the request.

Aspects of the present disclosure may additionally include systems, methods, and computer readable media for preventing fraudulent transactions, the operations comprising associating a customer with an account, associating the account with a mobile device, receiving a request to disable a function in an application on the mobile device, and processing the request.

Aspects of the present disclosure may additionally include systems, methods, and computer readable media for managing a negative account balance, the operations comprising associating a customer with an account, determining an account balance of the account, determining, based on the account balance, whether the account balance is negative, and displaying a time remaining until a negative balance fee is assessed.

Aspects of the present disclosure may additionally include systems, methods, and computer readable media for managing a negative account balance, the operations comprising associating a customer with an account, determining an account balance of the account, determining, based on the account balance, whether the account balance is negative, providing a first notification to the customer when the account balance is negative, and providing, after a specific amount of time, a second notification to the customer when the account balance is negative.

Aspects of the present disclosure may additionally include systems, methods, and computer readable media for generating a personalized grace period, the operations comprising associating a customer with an account at a financial institution, determining an account balance of the account, determining, based on the account balance, whether the account balance is negative, providing a first notification to the customer when the account balance is negative, determining the personalized grace period, and displaying, the personalized grace period to the customer.

Aspects of the present disclosure may additionally include systems, methods, and computer readable media for providing reminder notifications to a customer, the operations comprising associating a customer with an account at a financial institution, determining an account balance of the account, determining, based on the account balance, whether the account balance is negative, providing a first notification to the customer when the account balance is negative, and providing an option for the customer to receive a second notification while the account balance remains negative.

Aspects of the present disclosure may additionally include systems, methods, and computer readable media for calendar-based transaction management, the operations comprising associating a customer with an account at a financial institution, providing a calendar-based interface for the account, wherein a transaction is represented by a location on a calendar corresponding to a date associated with the transaction, assigning a date for processing the transaction based on the location of the representation on the calendar, changing the date for processing the transaction in response to receiving customer input moving the representation of the transaction on the calendar, and processing the transaction on the date for processing the transaction.

Aspects of the present disclosure may additionally include systems, methods, and computer readable media for determining a negative balance fee, the operations comprising associating a customer with a first account, determining a first account balance of the first account, and assessing, once during a period of time when the first account balance is negative, the negative balance fee.

Aspects of the present disclosure may additionally include systems, methods, and computer readable media for providing recommendations for managing an account in a low-cash mode state, the operations comprising associating a customer with an account at a financial institution, determining an account balance of the account, storing financial history data associated with the customer, accessing non-financial data, analyzing the financial history data and the non-financial data, determining, a future account balance of the account, based on the account balance, scheduled transactions, the financial history data, and the non-financial data, and determining whether the first account is deemed to be in the low-cash mode state based on the future account balance.

Aspects of the present disclosure may additionally include systems, methods, and computer readable media for maintaining an account above a low balance threshold, the operations comprising associating a customer with an account at a financial institution, receiving the low balance threshold from the customer, determining an account balance of the account, determining, based on the account balance, whether the account balance is less than the low balance threshold, providing a notification to the customer when the account balance is deemed to be less than the low balance threshold, and presenting, with the notification, options to the customer to manage the account while the account balance is less than the low balance threshold.

Aspects of the present disclosure may additionally include systems, methods, and computer readable media for predicting cash flow, the operations comprising associating a customer with an account at a financial institution, storing financial history data associated with the customer, storing account history data associated with the account, storing aggregated data associated with other customers and other accounts, accessing non-financial data, analyzing by machine learning the financial history data, the account history data, the aggregated data, and the non-financial data, and determining a future account balance of the account, based on scheduled transactions, the financial history data, the account history data, the aggregated data, and the non-financial data. The operations may further comprise determining whether the first account is deemed to be in the low-cash mode state based on the future account balance and determining a danger time period associated with the future account balance and the low cash mode state.

Aspects of the present disclosure may additionally include systems, methods, and computer readable media for preventing a negative account balance, the operations comprising associating a first customer with an account at a financial institution, associating a second customer with the account, associating the first customer with a mobile device, determining an account balance of the account, and determining, based on the account balance, whether the account is deemed to be in a low cash mode state. The operations may further comprise determining, via the mobile device, a location of the first customer, determining if the location of the first customer is associated with a location of a merchant, and providing, when the location of the first customer is associated with the location of a merchant and the account is deemed to be in the low cash mode state, a notification to the first customer and the second customer.

Aspects of the present disclosure may additionally include systems, methods, and computer readable media for preventing a negative account balance, the operations comprising associating a customer with an account at a financial institution, determining an account balance of the account, determining, based on the account balance, whether the account is deemed to be in a low cash mode state, activating, when the account is deemed to be in the low cash mode state, smart lock, providing a first notification to the customer when the account is deemed to be in the low cash mode state, providing a second notification to the customer when smart lock is activated, and presenting, with the second notification, at least one option to the customer to manage the account.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the associating a card with the first account description, serve to explain the disclosed embodiments. In the drawings:

FIGS. 11A-11B illustrates exemplary graphical user interfaces having a second disabled dashboard embodiment, consistent with disclosed embodiments;

FIGS. 14A-14B illustrates exemplary graphical user interfaces for a bank application enabling a smart geolocation feature, consistent with disclosed embodiments;

DETAILED DESCRIPTION

Figure 1:
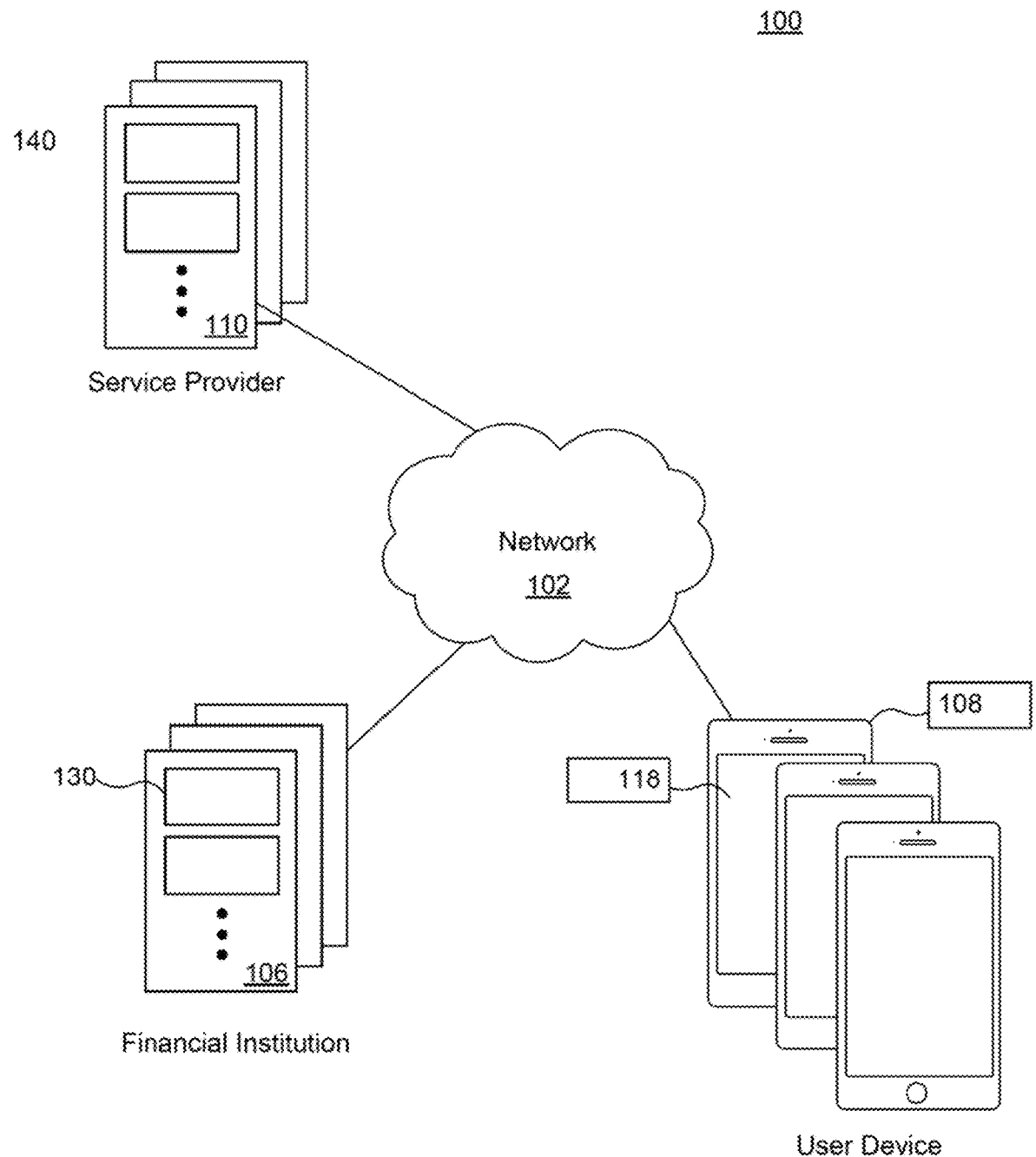
FIG. 1 is a block diagram of an exemplary system environment, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

As used herein, low-cash mode may be used to refer to a state of an account held by a customer at a financial service provider when the financial service provider determines that the account has insufficient funds to handle a transaction without resulting in a negative balance, that the account has a negative balance, that the account balance may be negative as a result of scheduled or predicted future transactions, or that the account balance has fallen below a predetermined threshold value.

FIG. 1 is a diagram illustrating exemplary system environment 100 in accordance with the disclosed embodiments. The components and arrangements shown in FIG. 1 are not intended to limit the disclosed embodiments, as the components used to implement the disclosed processes and features may vary. System environment 100 may include one or more networks 102, financial institutions 106, third-party service providers 110, and user devices 108. Each of the networks 102, financial institutions 106, and third-party service providers 110 may comprise one or more computing devices or servers, databases, cloud services, and/or internal networks. Other components known to one of ordinary skill in the art may be included in system environment 100 to gather, process, transmit, receive, acquire, and provide information used in conjunction with the disclosed embodiments. In addition, system environment 100 may further include other components that perform or assist in the performance of one or more processes that are consistent with the disclosed embodiments.

In some embodiments, system environment 100 may include one or more networks 102. Network 102 may comprise any computer networking arrangement used to exchange data. For example, network 102 may be the Internet, a private data network, a virtual private network (VPN) using a public network, and/or other suitable connections that enable the components of system environment 100 to send and acquire information. Network 102 may also include a public switched telephone network ("PSTN") and/or a wireless network such as a cellular network, wired Wide Area Network, Wi-Fi network, and/or another known wireless network (e.g., WiMAX) capable of bidirectional data transmission.

Each network 102, financial institution 106, and third-party service provider 110 may also include one or more local networks (not shown). A local network may be used to connect the components of FIG. 1, such as financial institution 106, user device 108, and third-party service provider 110 to network 102. A local network may comprise any type of computer networking arrangement used to exchange data in a localized area, such as Ethernet, Wi-Fi based on IEEE 802.11 standards, Bluetooth™, and other suitable network protocols that enable components of system environment 100 and other servers, computers, and systems of components of system environment 100 to interact with one another and to connect to network 102. In some embodiments, a local network comprises a portion of network 102. In other embodiments, components of system environment 100 may communicate via network 102 without a separate local network.

In some embodiments, system environment 100 may include one or more user devices 108. User device 108 may be one or more of a desktop computer, a laptop, a tablet, a smartphone, a multifunctional watch, a pair of multifunctional glasses, a tracking device, or any suitable device with computing capability. User device 108 may comprise a memory, a processor, and/or other specialized hardware that is configured to execute one or more methods of the disclosed embodiments. User device 108 may have an online banking or financial account management application installed thereon, which may enable user device 108 to communicate with, for example, with financial institution 106 and/or third-party service provider 110 via network 102 and/or a local network. Additionally, user device 108 may connect to financial institution 106 and/or third-party service provider 110 through use of web browser software via network 102 and/or a local network. Finally, user device 108 may provide a graphical user interface 118 to enable users to view data from the user device 108 generated by an application thereon and obtained over network 102 from one or more of financial institution 106 and/or third-party service provider 110.

In some embodiments, one or more of financial institution 106, third-party service provider 110, and/or network 102 may include one or more databases. Database may include one or more memory devices that store information. By way of example, databases may include Oracle™ databases, Sybase™ databases, or other relational databases or non-relational databases, such as Hadoop sequence files, HBase™, or Cassandra™. The databases or other files may include, for example, data and information related to the source and destination of a network request, the data contained in the request, etc. Systems and methods of disclosed embodiments, however, are not limited to separate databases. Database may include computing components (e.g., database management system, database server, etc.) configured to acquire and process requests for data stored in memory devices of database and to provide data from database.

In some embodiments, one or more of financial institution 106, third-party service provider 110, and/or network 102 may include one or more cloud services. Cloud service may include a physical and/or virtual storage system associated with cloud storage for storing data and providing access to data via a public network such as the Internet. Cloud service may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via network 102. In some embodiments, cloud service comprises multiple computer systems spanning multiple locations and having multiple databases or multiple geographic locations associated with a single or multiple cloud storage service(s). As used herein, cloud service refers to physical and virtual infrastructure associated with a single cloud storage service and may manage and/or store data.

In some embodiments, one or more of financial institution 106, third-party service provider 110, and/or network 102 may include one or more servers or clusters of servers. Servers or clusters of servers may be located in the same data center or different physical locations. Multiple servers and clusters may be formed as a grid to share resources and workloads. Each server and/or cluster may include a plurality of linked nodes operating collaboratively to run various applications, software modules, analytical modules, rule engines, etc. Each node may be implemented using a variety of different equipment, such as a supercomputer, personal computer, a server, a mainframe, a mobile device, or the like. In some embodiments, the number of servers and/or server cluster may be expanded or reduced based on workload. In some embodiments, one or more components of system environment 100 may be placed behind a load balancer to support high availability and ensure real-time (or near real-time) processing of optimal decision predictions.

In some embodiments, one or more of financial institution 106, third-party service provider 110, and/or network 102 may include one or more computing systems that are configured to execute software instructions stored on one or more memory devices to perform one or more operations consistent with disclosed embodiments. For example, a financial institution 106 may include memory devices storing data and software instructions and processors configured to use the data and execute the software instructions to perform server-based functions and operations known to those skilled in the art. Financial institution 106 may also include one or more general-purpose computers, mainframe computers, or any combination of these types of components. In some embodiments, financial institution 106 may have an application installed thereon to perform processes that are consistent with disclosed embodiments.

In some embodiments, one or more of financial institution 106, third-party service provider 110, and/or network 102 may include devices configured as a particular apparatus, system, or the like based on the storage, execution, and/or implementation of the software instructions that perform operations consistent with disclosed embodiments. Devices of financial institution 106 may be standalone or may be part of a subsystem included in a larger system. For example, financial institution 106 may include distributed servers that are remotely located and communicate over a network (e.g., WAN and/or a local network) or a dedicated network.

In some embodiments, one or more of financial institution 106, third-party service provider 110, and/or network 102 may include or may access one or more storage devices configured to store data and/or software instructions used by one or more processors to perform operations consistent with disclosed embodiments. For example, financial institution 106 may include memory configured to store one or more software programs that perform several functions when executed by a processor. The disclosed embodiments are not limited to separate programs or computers configured to perform dedicated tasks. For example, financial institution 106 may include memory that stores a single program or multiple programs. Additionally, one or more of financial institution 106, third-party service provider 110, and/or network 102 may execute one or more programs located remotely. For example, financial institution 106 may access one or more remote programs stored in memory included with a remote component that, when executed, perform operations consistent with disclosed embodiments. For example, financial institution 106 may exchange data and interact with systems, devices, and programs of third-party service provider 110 and/or hardware and software of user device 108. In certain aspects, one or more of financial institution 106, third-party service provider 110, and/or network 102 may include server software that generates, maintains, and provides services associated with user accounts.

Financial institution 106 in system environment 100 may include any entity that generates, provides, manages, and/or maintains financial service accounts 130, etc., for customers. Financial institution 106 may include a retail and commercial bank, internet bank, credit union, savings and loan association, investment bank or company, brokerage firm, and/or another financial institution known by those of skill in the art. Financial institution 106 may provide and maintain one or more financial service accounts 130 for an account owner. The one or more accounts 130 may include, among others types, a checking account, a savings account, certificate of deposit account, money market account, brokerage account, investment retirement account (IRA), 401(k) account, line of credit, and/or any other financial account known by those of skill in the art. System environment 100 may include more than one financial institution 106 with one or more financial accounts 130, a single financial institution 106 with two or more financial accounts 130, or any other combination thereof. In the context of the disclosed embodiments, the present embodiments include multiple accounts, including at least a first account and second account, including those situated in one or more financial institutions, owned by one or more account owners, and of one or more account type.

Each financial account 130 in system 100 may have differing or overlapping account ownership and access privileges. For example, the financial accounts 130 may be individual accounts, joint accounts, payable-on-death accounts, joint account with rights of survivorship, accounts in trust, or any other type of account ownership known by those of skill in the art. For example, an individual account may include a singular account owner. A joint account may include two or more account owners with equal access to funds and information related to the account. Accounts in trust may be controlled by a designated trustee for the benefit of another account owner, who may have limited access or control over the trust account. It is not desired to limit the type of financial account 130 used in the present embodiments.

Third-party service provider 110 may be any company, organization, or entity that may enable, monitor, coordinate, and/or control access and provide information to different account owners of different financial accounts 130 in system environment 100. Third-party service provider 110 may communicate with one or more financial institutions 110 and one or more customers via one or more user devices 108 and enable access to account information and manage access rights to different financial accounts 130. Third-party service provider 110 may serve as an information clearinghouse or intermediary between financial institution 106 and user device 108. For example, account owners may grant third-party service provider 110 access to certain information for financial accounts 130 maintained by one or more financial institution 106. Financial institution 106 may securely publish data to third-party service provider 110 for particular financial accounts whose owners have granted access, and particular data from those accounts, over a secure protocol or public or private network, and third-party service provider 110 may control access to the information between different account owners. In one embodiment, account owner of financial account 130 may grant access to information from the account, whereby financial institution 106 enables third-party service provider 110 to access account data via an application programming interface (API) or other means, and share data with an owner of another financial account. The two accounts are thereby linked by third-party service provider 110 having access to certain data in each account and publishing that data to the different account owners. This enables, for instance, an owner of a first account to see transactions in a second account. Certain personal and financial data may be obfuscated or not shared by third-party service provider 110, or financial institution 106 may not provide such information, upon request and based on the scope of access enabled by an account owner. These data sharing functions may also be carried out, in certain embodiments, by one or more financial institution 106 directly with account owners and without third-party service provider 110.

As will be discussed in greater detail below, account owners may establish rules to transfer money from a first account to a second account (or a third account) based on activity in the first account. Account owners may also establish rules to transfer money from a second account to a first account (or a third account) based on activity in the second account. Rules may be established and stored in an account owner's financial account 130 by financial institution 106, in a service account 140 of third-party service provider 110, or both. Rules may be established by account owners via graphical user interface 118 of user device 108 for, among other things, determining when to transfer funds, determining how much to transfer, and determining what restrictions are placed on transferred funds, transfer amounts, and transfer rates.

One or more financial institutions 106 and/or one or more third-party service providers 110 may host a web application, API, web site, or similar interface that is accessible over network 102 to account owners via user device 108. The interface may be hosted on one or more web servers and operate in a client-server model with user device 108, while obtaining information, including account information, from service provider 110 and/or financial institution 106. Via user device 108, an account owner may view graphical user interface 118 on user device 108. Graphical user interface 118 may provide account owners with the ability to view financial account information of another account, for example, another account owner's account. Graphical user interface 118 may also provide an interface enabling the disclosed functions herein, including, among other things, authorizations to transfer cash and/or funds (assets), authorizations to share information and connect and/or link financial accounts, establish rules for transferring cash and/or funds (assets) between linked accounts, and track and monitor transfers and the status of financial accounts.

System for Low-Cash Mode

As disclosed herein, low-cash mode may be used to refer to a state of an account held by a customer at a financial service provider when the financial service provider determines that the account has insufficient funds to handle a transaction without resulting in a negative balance, that the account has a negative balance, that the account balance may be negative as a result of scheduled or predicted future transactions, or that the account balance has fallen below a predetermined threshold value.

Consistent with the present embodiments, financial institution 106, 116 may provide the customer at user device 118 with options to manage accounts 131, 132 in low cash mode including methods, systems, and features disclosed herein which provide the customer the ability to at least increase the balance of accounts 131, 132 (e.g. personal loan, transfer of cash and/or funds), approve or deny individual transactions, lock a card associated with accounts 131, 132, or prevent spending in order to avoid a negative account balance. Additionally, methods, systems, and features disclosed herein may provide the customer the ability to prioritize payments, cancel transactions, manage the amount of a negative balance or length of time carrying a negative balance in order to minimize negative balance fees, select repayment options when an overdraft cannot be avoided, and other options and features which the customer can select in order to avoid or minimize a negative account balance.

System for Alerting to Customers when Entering/Exiting Low-Cash Mode

Consistent with disclosed embodiments, a financial institution may provide a notification to a customer when an account associated with the customer enters low cash mode in the form of an alert. The notification may be triggered when an account balance is negative; when an account balance falls below a predetermined threshold; during a particular time of the month that is determined based on scheduled reoccurring transactions such as direct deposits and automatic billing as well as analysis of historical data; determined based on transaction date related to upcoming holidays, birthdays, anniversaries, or calendared special occasions; triggered when a customer is interacting with a merchant online; or determined based on geographic location of a customer or merchant. The notification may be delivered to the customer as an email, text message, voice call, alert through an application on a mobile phone, social media alert, alert through a mobile device, alert through wearable technology, alert through a device connected to the internet, or other methods for instantaneously alerting a customer.

The notification may further include information relating to any negative balance fees to be assessed if the negative balance is not cured and a period of time to cure negative balance. In some embodiments, the negative balance fees may be tiered based on, for example, the extent to which the account is negative or the length of time the account balance is negative.

Figure 4A:
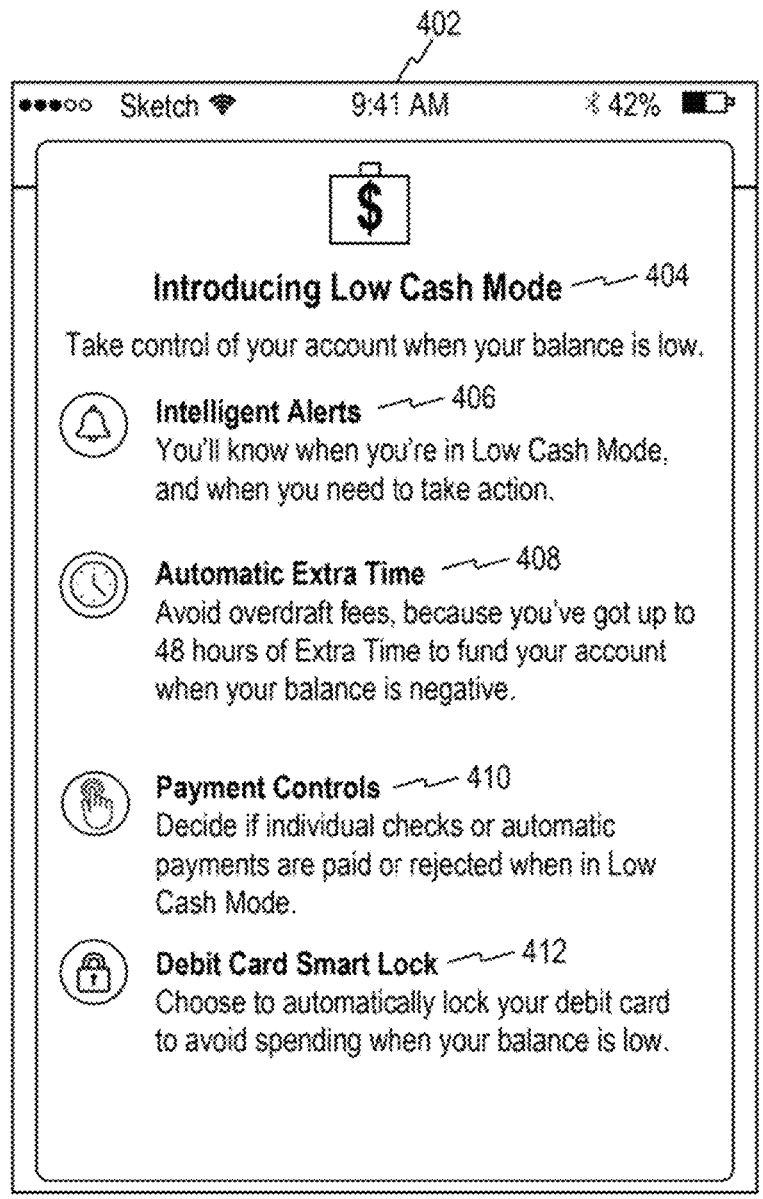
FIGS. 4A-4E illustrate exemplary graphical user interfaces (GUIs) for managing a financial account in a low cash mode, consistent with disclosed embodiments.
Figure 4C:
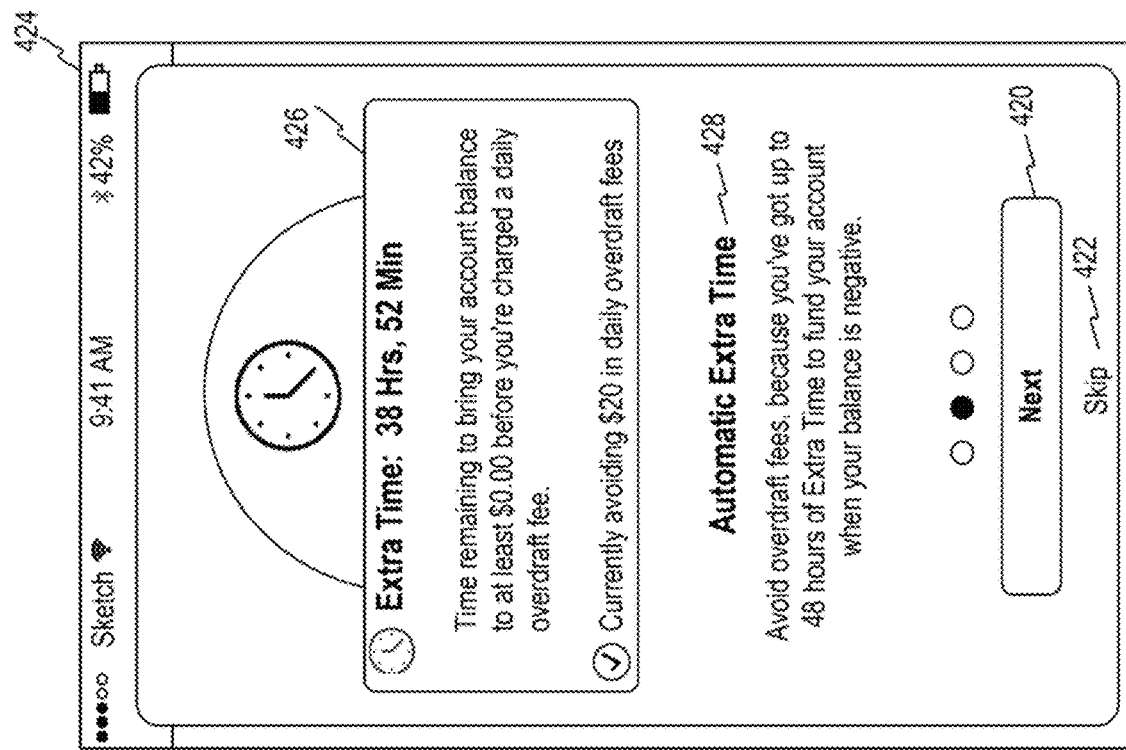
Figure 4B:
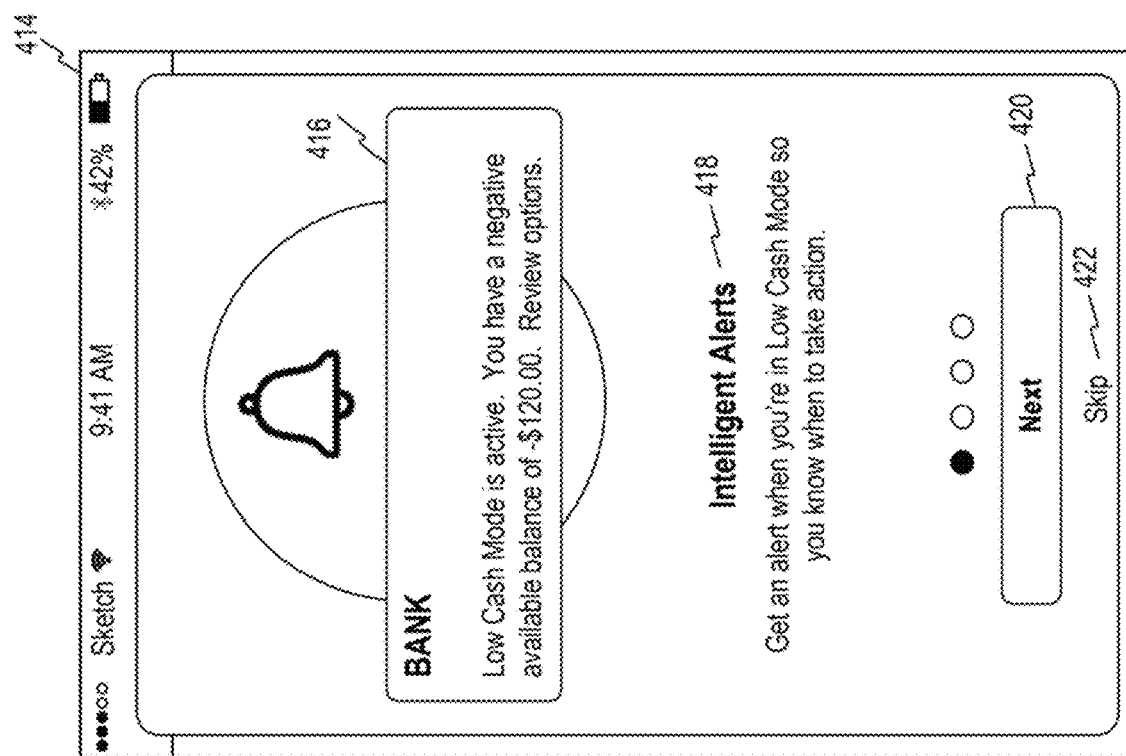

FIG. 4B illustrates an exemplary graphical user interface 414 for providing an intelligent low balance alert 418 to a customer, consistent with disclosed embodiments.

Consistent with disclosed embodiments, financial institution may also provide a notification to a customer when the account associated with the customer is no longer in low cash mode. The notification may be triggered when a customer cures a negative balance; when the account balance is greater than a predetermined threshold balance; a particular time of the month is past; a time period related to upcoming holidays, birthdays, anniversaries, or calendared special occasions has past; or the financial institution determines the customer is no longer in danger of incurring a negative balance based on a change in geographic location of a customer. The notification may be delivered to the customer as an email, text message, voice call, alert through a mobile banking application, social media alert, alert through a mobile device or mobile device application, alert through wearable technology, alert through a device connected to the internet, or other means for instantaneously providing an alert to the customer.

As shown in FIG. 4B, a notification on a mobile device may link to an application on a mobile device. The application on the mobile device may display a textual alert 416. The textual alert may provide information including that an account has entered low cash mode, the account balance, time remaining to cure the negative balance, options for curing the negative balance, and/or options for minimizing negative balance fees. For example, textual alert 416 may indicate "Low Cash Mode is active. You have a negative available balance of −$120.00. Review options." Textual alert 416 may prompt a customer operating user device 108 to review options for replenishing the account so as to achieve a positive balance and/or remove the account from low cash mode. Next button 420 and skip button 422 may enable a user to take a next step in the process of reviewing options and/or skip the process of reviewing options entirely.

Figure 6C:
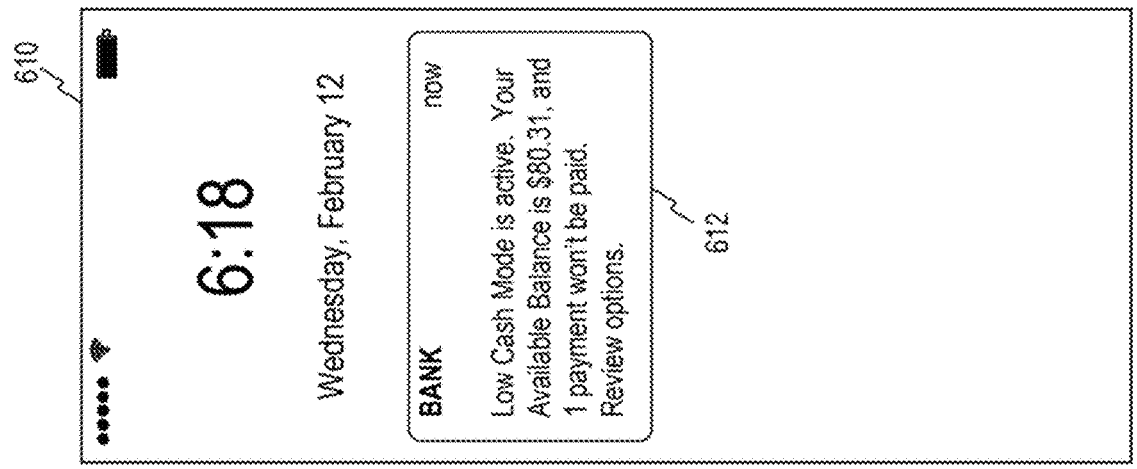
FIGS. 6A-6C illustrate exemplary graphical user interfaces for displaying available balance user alerts, consistent with disclosed embodiments.
Figure 6B:
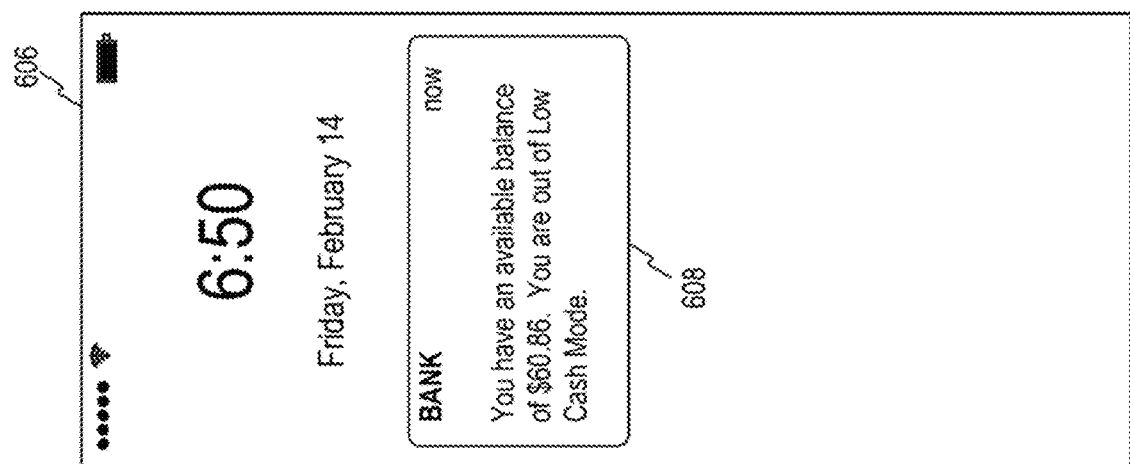
Figure 6A:
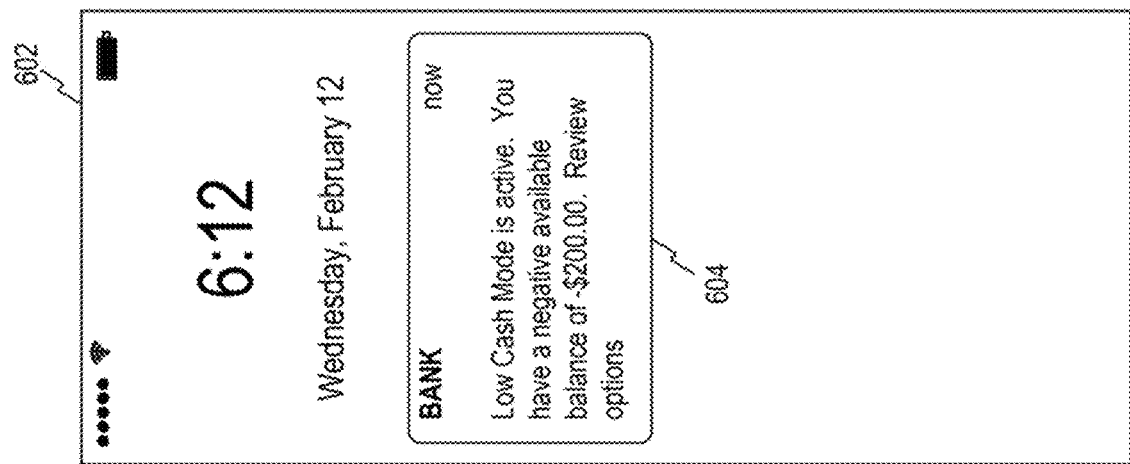

FIGS. 6A-6C illustrate exemplary graphical user interfaces for displaying available balance user alerts, consistent with disclosed embodiments. FIG. 6A illustrates an exemplary graphical user interface for displaying an alert of a negative available balance, consistent with disclosed embodiments. As shown in FIG. 6A, graphical user interface 602 may include an intelligent alert message 604 that indicates "Low Cash Mode is active. You have a negative available balance of $−200.00. Review options." FIG. 6B illustrates an exemplary graphical user interface for displaying an alert of a balance outside of low cash mode, consistent with disclosed embodiments. As shown in FIG. 6B, graphical user interface 606 may include an intelligent alert message 608 that indicates "You have an available balance of $60.86. You are out of Low Cash Mode." FIG. 6C illustrates an exemplary graphical user interface for displaying an alert of a non-payments, consistent with disclosed embodiments. As shown in FIG. 6C, graphical user interface 610 may include an intelligent alert message 612 that indicates "Low cash mode is active. Your available balance is $80.31, and 1 payment won't be paid. Review options." Other intelligent alerts may be contemplated.

Figure 17:
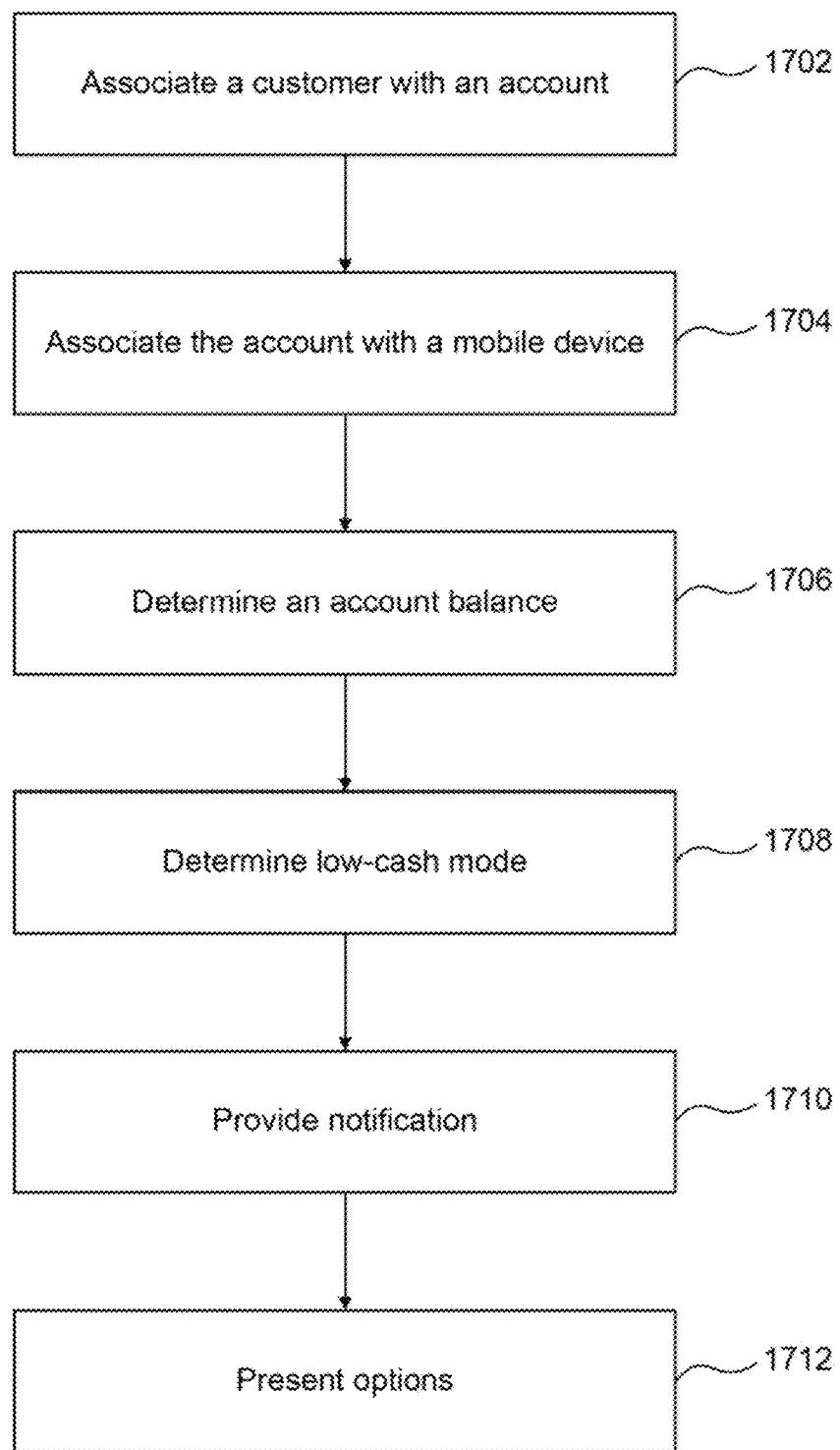
FIG. 17 illustrates an exemplary flow chart for providing notifications to a customer, consistent with disclosed embodiments.

FIG. 17 illustrates an exemplary flow chart for providing notifications to a customer. At step 1702, financial institution 106 may associate a customer with an account at the financial institution. At step 1704, financial institution 106 may associate the account with a mobile device 108. At step 1706, financial institution 106 may determine an account balance of the account.

At step 1708, financial institution 106 may determine, based on the account balance, whether the account is deemed to be in a low-cash mode state, as disclosed herein. At step 1710, if the account is deemed to be in a low-cash mode state, financial institution 106 may provide a notification to the customer that the account is deemed to be in a low-cash mode state. At step 1712, financial institution 106 may present options to manage the account while the account is in the low-cash mode state.

System for Preventing Overdraft

Consistent with disclosed embodiments, the financial institution may offer customers various options to avoid negative account balances and associated negative balance fees. The financial institution may offer the customers options disclosed herein including, for example, the ability to transfer money between accounts, the ability to cancel pending transactions or payments, the ability to obtain a loan, or the ability to accelerate ACH transactions or payroll deposits. These options may be offered to the customers by the financial institution through various methods, including through an application on a mobile device. In some embodiments, these options may be selectable by the customer and implemented automatically, without any action or intervention by the financial institution.

Consistent with disclosed embodiments, the financial institution may present the option to the customer of obtaining or applying for a personal loan in order to avoid a negative account balance. Financial institution may present this option to the customer with a preapproved amount and an interest rate for immediate approval and deposit of the amount into the account. Additionally or alternatively, the customer may choose to customize the terms of the loan, subject to approval by the financial institution.

Figure 2A:
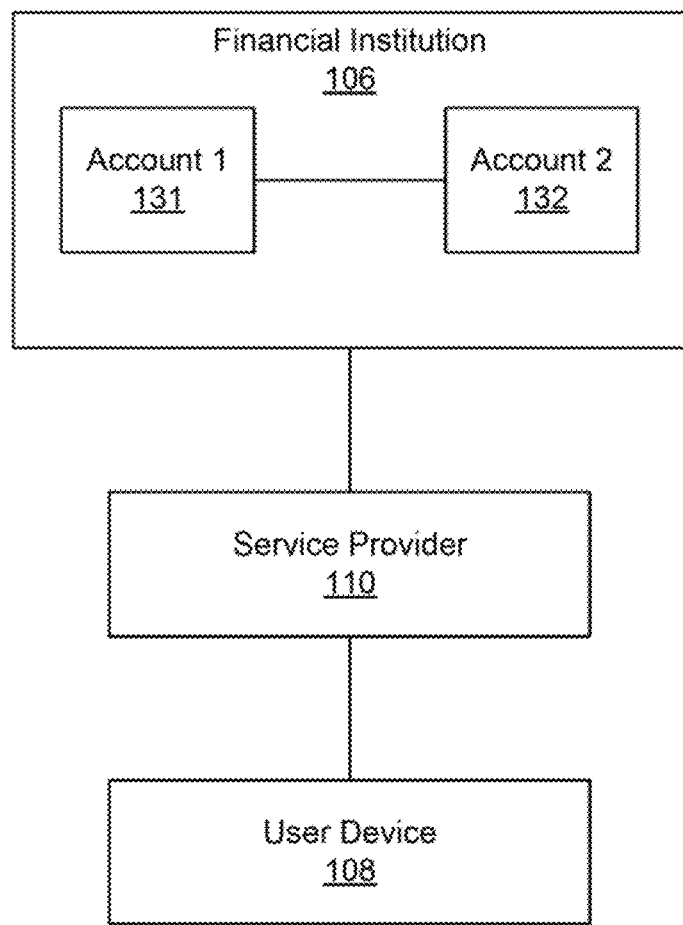
FIGS. 2A-2D illustrate block diagrams of exemplary methods of linking financial accounts, consistent with disclosed embodiments.
Figure 2B:
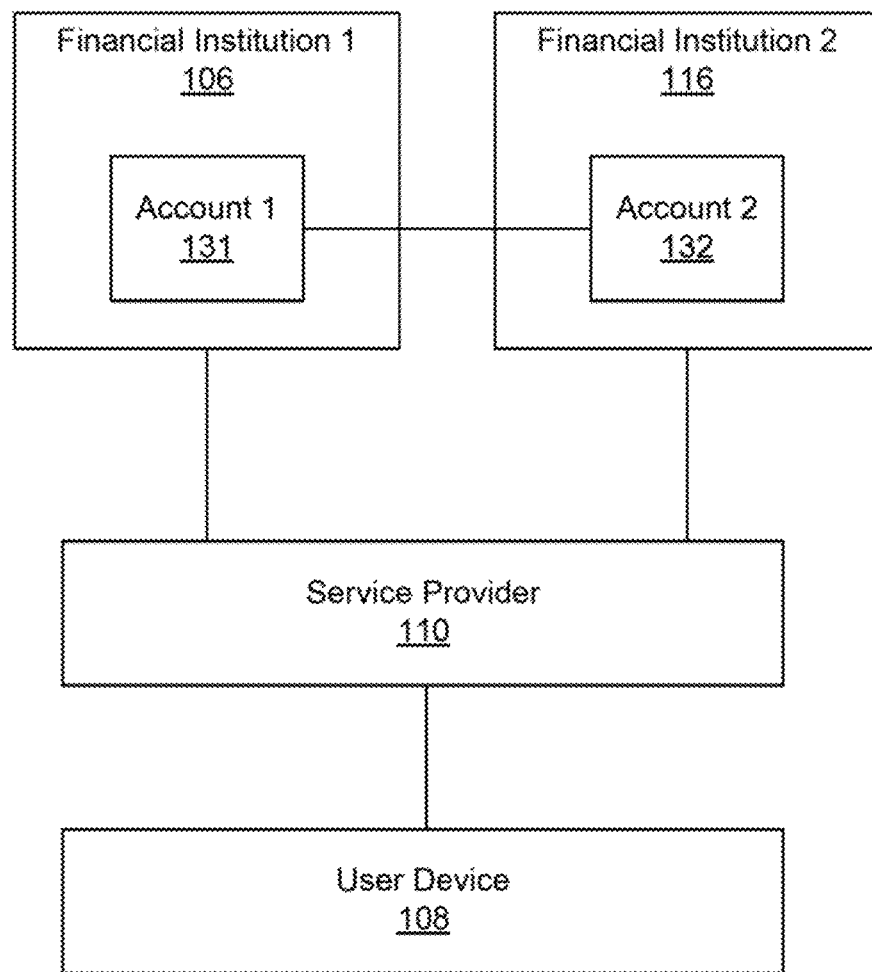

In FIG. 2B, first account 131 and second account 132 may be maintained within separate financial institutions 106, 116. As noted above, first account 131 and second account 132 may have differing, overlapping, or identical account ownership. As with FIG. 2A, third-party service provider 110 may be a third-party entity acting as an information clearing house or intermediary between financial institutions 106, 116, and one or more user devices 108. Consistent with this present embodiment, either financial institution 106 or financial institution 116 may present options to customers with at least one account in low cash mode or when an account balance in first account 131 (or second account 132) drops beneath a predetermined threshold value. Financial institution 106 may present the option of obtaining/applying for a personal loan in order to avoid an overdraft of first account 131 (or second account 132). Either financial institution 106 or financial institution 116 may present this option to the customer with a preapproved amount and an interest rate for immediate approval and deposit of the amount into first account 131 (or second account 132). Additionally or alternatively, the customer may choose to customize the terms of the loan, subject to approval by the financial institution.

Figure 2C:
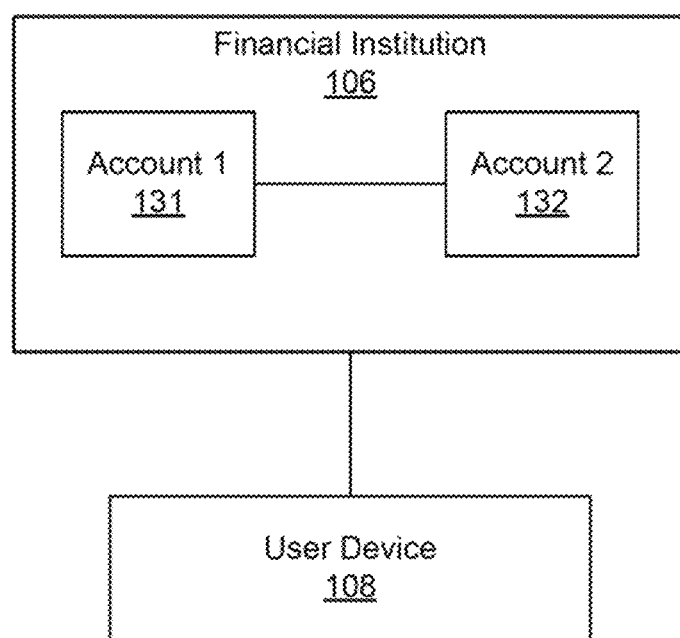

In FIG. 2C, first account 131 and second account 132 may be maintained within a common financial institution 106 and involve differing, overlapping, or identical account ownership. In this present embodiment, financial institution 106 may communicate directly with account owners via user device 108, without third-party service provider 110. A plurality of user devices 108 (not shown) associated with the account owner or owners may receive communication from financial institution 106. Consistent with this present embodiment, financial institution 106 may present options to customers with at least one account in low cash mode or when an account balance in first account 131 (or second account 132) drops beneath a predetermined threshold value. Financial institution 106 may present the option of obtaining/applying for a personal loan in order to avoid an overdraft of first account 131 (or second account 132). Financial institution 106 may present this option to the customer with a preapproved amount and an interest rate for immediate approval and deposit of the amount into first account 131 (or second account 132). Additionally or alternatively, the customer may choose to customize the terms of the loan, subject to approval by the financial institution.

Figure 2D:
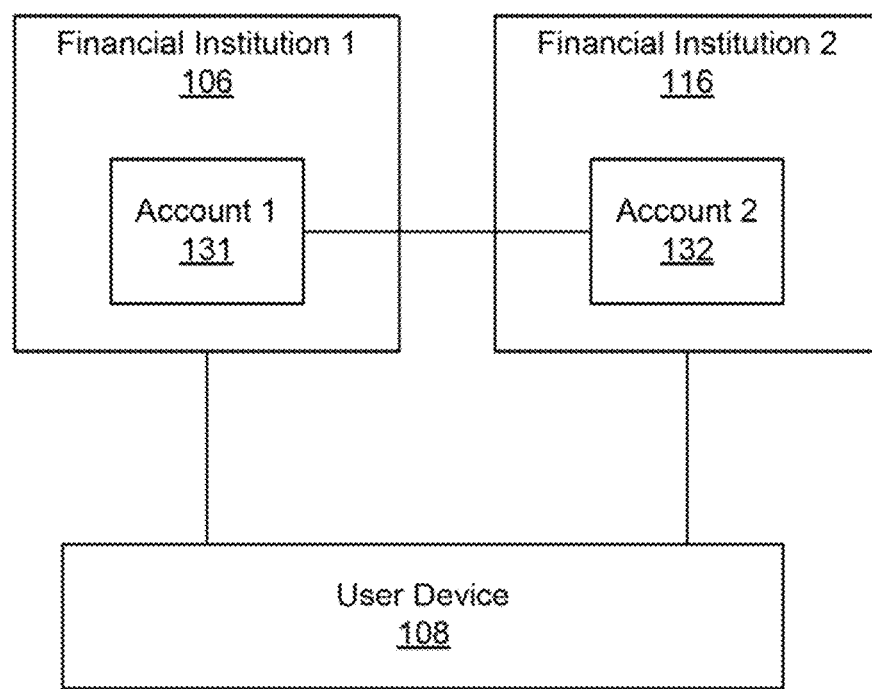

In FIG. 2D, first account 131 and second account 132 may be maintained within different financial institutions 106, 116, involve differing, overlapping, or identical account ownership, and financial institutions 106, 116 may communicate directly with account owners via user device 108 without third-party service provider 110. A plurality of user devices 108 (not shown) associated with the account owner or owners may receive communication from financial institutions 106, 116. Consistent with this present embodiment, either financial institution 106 or financial institution 116 may present options to customers with at least one account in low cash mode or when an account balance in first account 131 (or second account 132) drops beneath a predetermined threshold value. Financial institution 106 may present the option of obtaining/applying for a personal loan in order to avoid an overdraft of first account 131 (or second account 132). Either financial institution 106 or financial institution 116 may present this option to the customer with a preapproved amount and an interest rate for immediate approval and deposit of the amount into first account 131 (or second account 132). Additionally or alternatively, the customer may choose to customize the terms of the loan, subject to approval by the financial institution.

Additionally or alternatively, the preventative options may further include the ability to accelerate pending ACH deposits or a regularly scheduled deposit including, for example, a payroll deposit. The financial institution may accelerate the deposits by expediting processing, providing the funds as a loan from the financial institution for little or no cost as a loan for the amount of the future deposit, waiting to process withdrawals until the deposit has been processed, or other means known in the art used to accelerate deposits.

Figure 18:
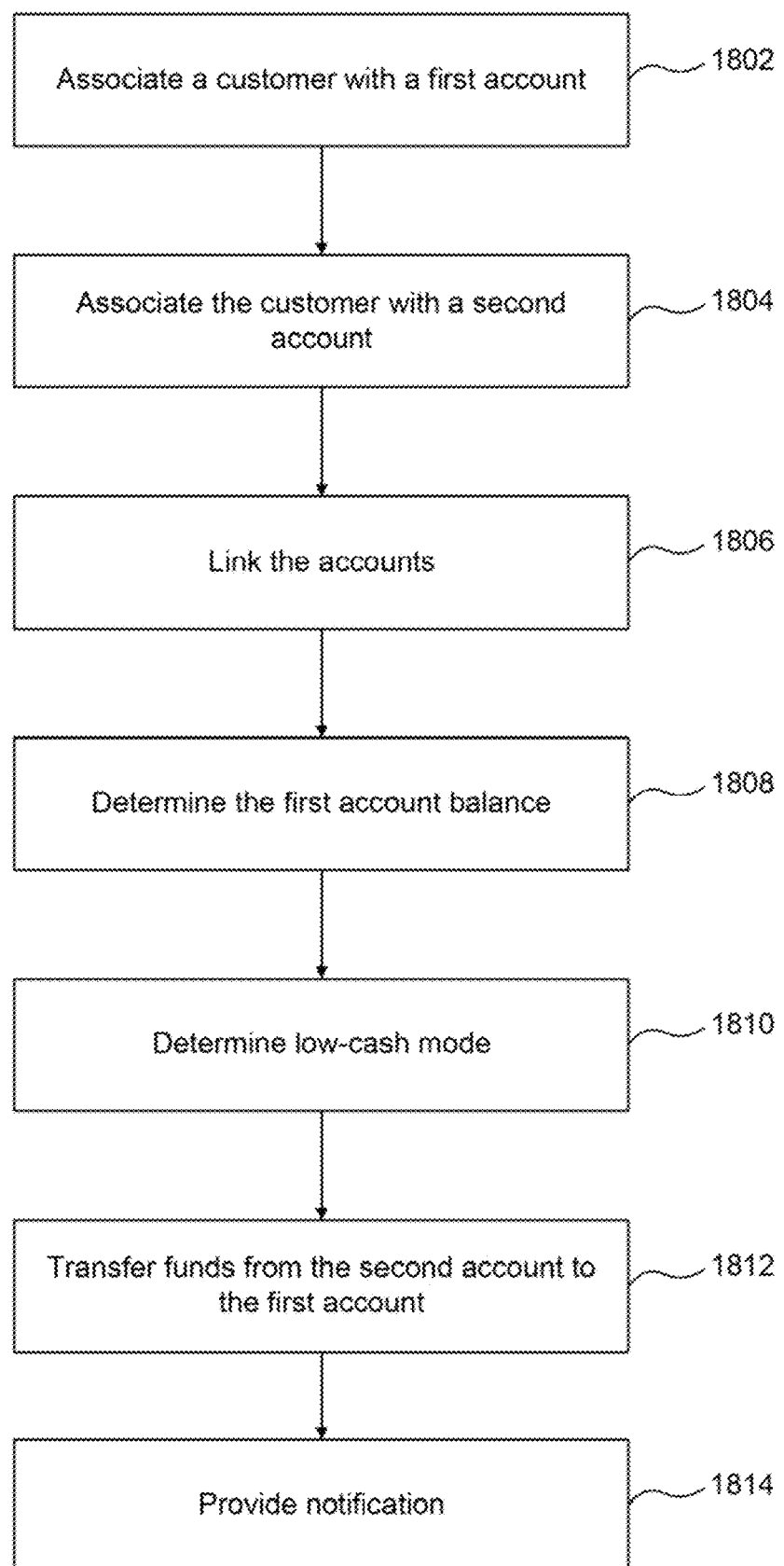
FIG. 18 illustrates an exemplary flow chart for managing a financial account, consistent with disclosed embodiments.

FIG. 18 illustrates an exemplary flow chart for providing notifications to a customer. At step 1802, financial institution 106 may associate a customer with a first account at financial institution 106. At step 1804, financial institution 106 may associate the customer with a second account at financial institution 106 or a different financial institution. At step 1806, financial institution 106 may link the first account with the second account. At step 1808, financial institution 106 may determine an account balance of the first account.

At step 1810, financial institution 106 may determine, based on the first account balance, whether the account is deemed to be in a low-cash mode state, as disclosed herein. At step 1812, if the account is deemed to be in a low-cash mode state, financial institution 106 may automatically transfer funds from the second account to the first account. The amount of funds transferred may be preselected by the customer or determined by financial institution 106. Additionally or alternatively, the amount of funds transferred may be sufficient such that the first account is no longer deemed to be in the low-cash mode state or sufficient to prevent a negative first account balance.

At step 1814, financial institution 106 may provide a notification to the customer that the first account is deemed to be in a low-cash mode state, that funds were automatically transferred from the second account, the amount of funds transferred from the second account, a current first account balance, and/or options for managing the first account while in the low-cash mode state.

System for Tiered Overdraft Fees

In other embodiments, a financial institution may charge a negative balance fee when a transaction results in a negative account balance. In some embodiments, the financial institution may assess the negative balance fees using a tier system. The tiered negative balance fees may be based on, for example, the extent to which the account is negative with higher fees for larger negative amounts as compared to smaller negative amounts or based on historical data associated with the account.

System for Synthetic Data and Machine Learning

Consistent with disclosed embodiments, the financial institution may include data privacy and security measures in order to protect transaction, account, and customer data. Financial institution may use, for example, encryption/decryption, tokenization/detokenization, masking, obfuscation, or other methods for protecting data. Additionally or alternatively, financial institution may employ artificial intelligence or machine learning algorithms to protect transaction, account, and customer data. The artificial intelligence or machine learning algorithms may also be used to generate synthetic data or artificial data stored in a data platform to be substituted for transmitted data or for fields in transmitted data that are deemed sensitive by the costumer or financial institution.

System for Fraud Protection Features

Consistent with disclosed embodiments, financial institution may integrate fraud protection features with the features associated with an account in low-cash mode. Fraud protection features may include security questions, multi-factor authentication, password standards, alerts associated with suspicious activity, and any other feature or service intended to prevent, detect, or resolve fraud. Password standards may include minimum password requirements such as length or character requirements.

Security questions may include a set of questions and answers wherein the customer or account holder provides answers to questions when creating an account. The customer-provide answers to the questions are stored by the financial institution and used to verify the identity of the customer. The questions and answers are setup such that only the customer should be able to provide the specific answer to the specific questions. The financial institution may prompt a customer for the answers to security questions when the customer attempts to login to the account from a computer or mobile device not previously associated with the account.

In one example, multi-factor authentication may include, when a customer logs into an account, generating a one-time passcode such as a random string of characters and sending the one-time passcode to a device (e.g., as a text message, email, or voice call), prompting the customer for entry of one-time passcode, validating the entered passcode, and permitting access to the account.

Figure 20:
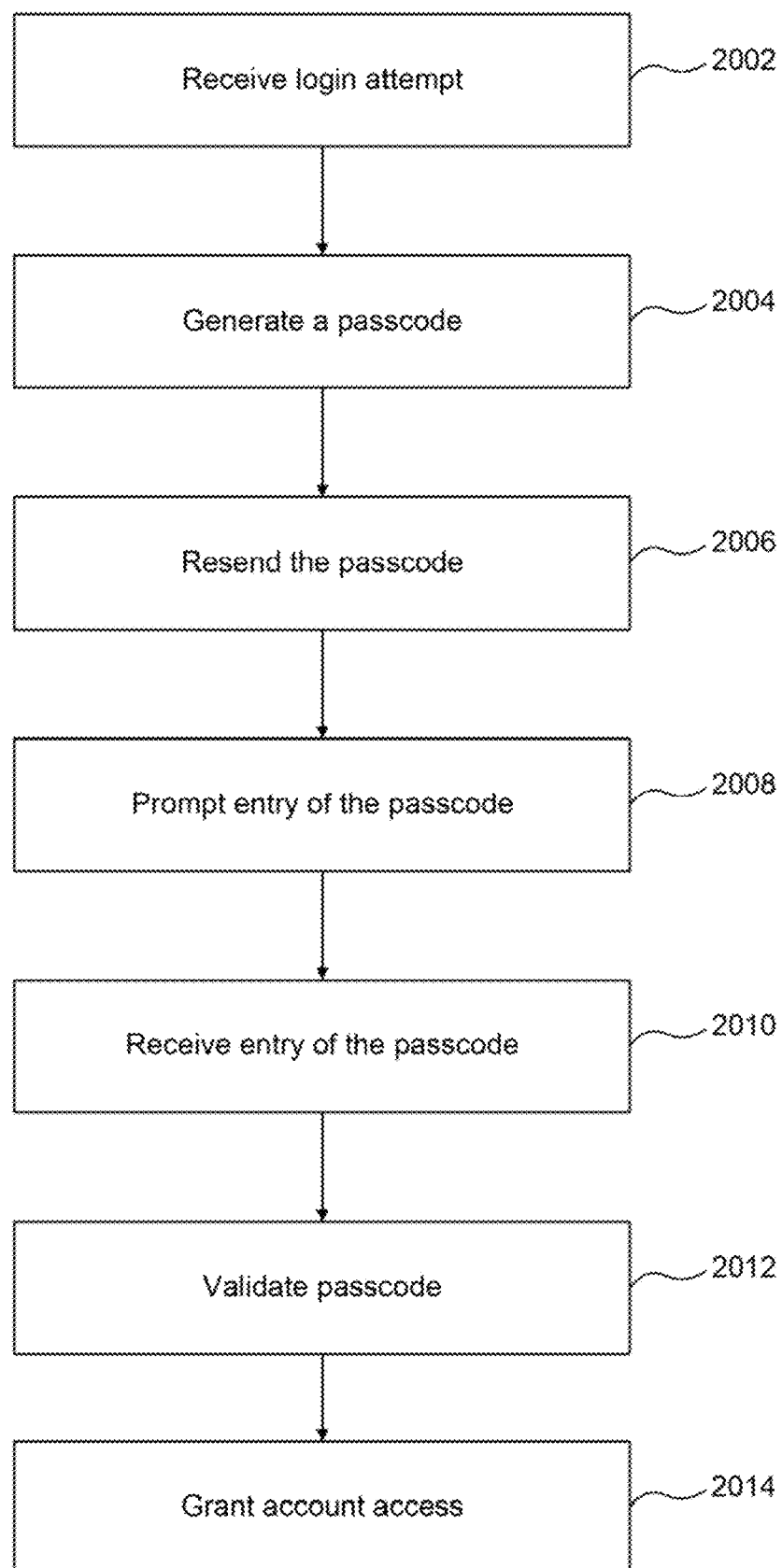
FIG. 20 illustrates an exemplary flow chart for multi-factor authentication, consistent with disclosed embodiments.
Figure 21:
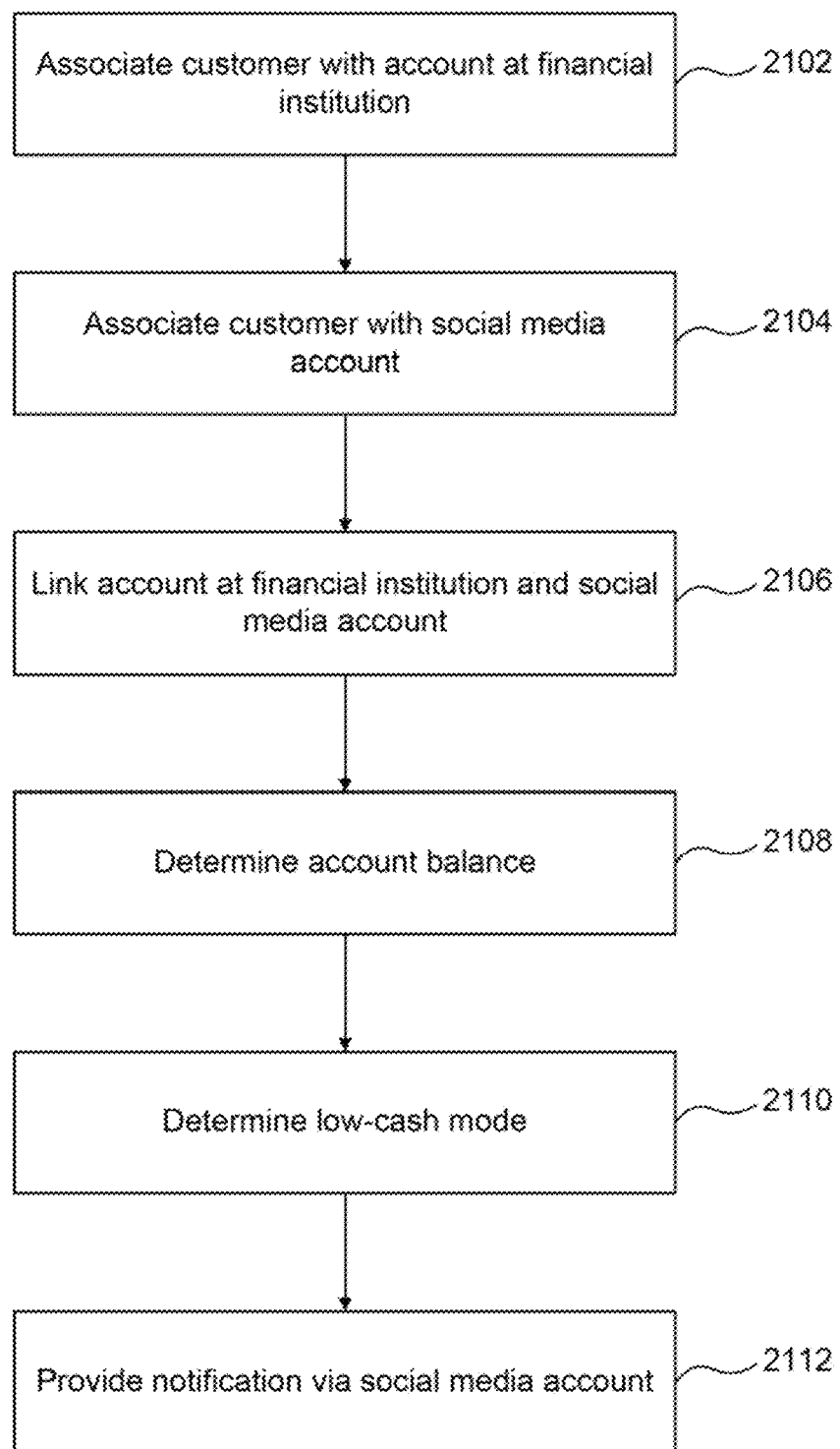
FIG. 21 illustrates an exemplary flow chart for providing notification to a customer, consistent with disclosed embodiments.

FIG. 20 illustrates an exemplary flow chart for multi-factor authentication. At step 2002, financial institution 106 may receive a login attempt to access an account with financial institution 106. At step 2004, financial institution 106 may generate a one-time passcode to be used to verify the identity of the customer. At step 2006, financial institution 106 may send the one-time passcode to the customer, for example in a text message, email, or voice call.

At step 2008, financial institution 106 may prompt for entry of the one-time passcode. At step 2010, financial institution 106 may receive entry of the passcode. At step 2012, financial institution 106 may validate the passcode received in order to ensure that the passcode received matches the one-time passcode that was generated and sent. At step 2014, if the received passcode is validated, then financial institution 106 may grant the customer access to the account.

System for Integration with PNC Virtual Wallet

Consistent with disclosed embodiments, the financial institution may provide options allowing customers to perform actions relating to low cash mode through a website, a mobile version of a website, an application or a micro-application on a mobile device, or through an ancillary application, such as a budgeting or money-management application, for example PNC Mobile Wallet®.

Figures 8A, 8B:
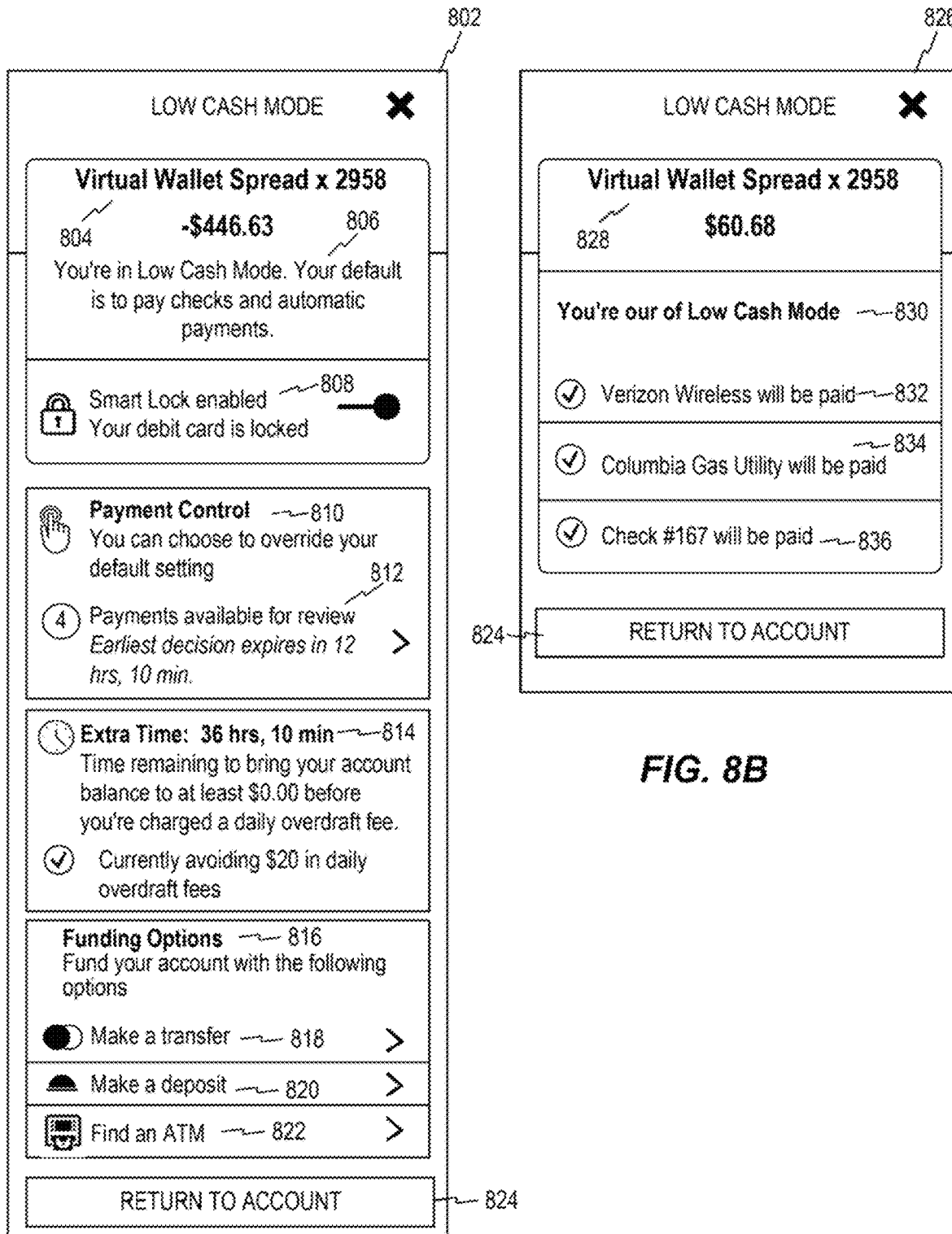
FIGS. 8A-8B illustrates exemplary graphical user interfaces having a dashboard configuration for managing a financial account in low cash mode, consistent with disclosed embodiments.

FIGS. 8A-8B illustrates exemplary graphical user interfaces having a dashboard configuration for managing a financial account in low cash mode, consistent with disclosed embodiments. As shown in FIGS. 8A-8B, there are subsections for virtual wallet spread at 804, such as subsections 806, 808, 810, 814, 816, 820, 822, 824. The user may be presented with a notification indicating that "You're in Low Cash Mode. Your default mode is to pay checks and automatic payments" at 806. At 808, an indication may provide "Smart Lock is enabled. Your debit card is locked." Payment control 810 is another subsection. For payment control 810, the user can choose to override the default setting. The user can also select payments available for review 812. At 814, the user can select extra time, which is the time remaining to bring the account balance to at least $0.00 before the user is charged a daily overdraft fee. At 816, dashboard provides funding options where a user can fund the account. At 818, the user may select an option to make a transfer. At 820, the user may make a deposit. At 822, the user may be able to find an ATM. At 824, the user may return to an account home page. FIG. 8B displays a user interface out of low cash mode 830. When out of low cash mode, the user's account may process automatic payments and checks will be paid. For example, at 832, the Verizon Wireless bill will be paid. At 834, Columbia gas utility bill will be paid. At 835, a check will be paid.

System for Linking with Virtual Wallet and Social Media

In some embodiments, the financial institution may urge or permit customers to link financial accounts with social media accounts. The link between accounts may provide financial institution with access to information gathered by the social media account and associated applications. The link may also provide another channel for financial institution to send alerts or messages to a customer. For example, a customer could receive a message via a social network instant or direct message that the account has entered low cash mode.

Additionally or alternatively, the financial institution may provide a customer with the option to associate a social media account associated with the customer with a financial account. The financial institution may then interact with the customer using the notifications and infrastructure provided by the social media platform. For example, the financial institution may provide a notification that an account associated with a user has entered low cash mode using Facebook Messenger or Twitter Direct Message. The financial institution may also access or analyze data associated with a customer's social media profile, presence, usage, activity, connections, or other social media data.

System for Pre-Purchase Alerts

Consistent with disclosed embodiments, the financial institution may provide a notification to a customer that a pending, scheduled, or anticipated purchase or transaction will result in a negative account balance before the purchase or transaction is made. For example, a financial institution may notify a customer that a transaction associated with an item placed in a virtual shopping cart while visiting an online merchant would result in a negative balance. In another embodiment the financial institution may use historical data associated with a customer to predict and notify a customer that an anticipated transaction will result in a negative balance. The financial institution may further anticipate transactions based on the time of the day, month, or year; a geographic location associated with a merchant; a geographic location associated with the customer; or other indicators associated with the customer and spending an amount greater than a current balance.

Figure 23:
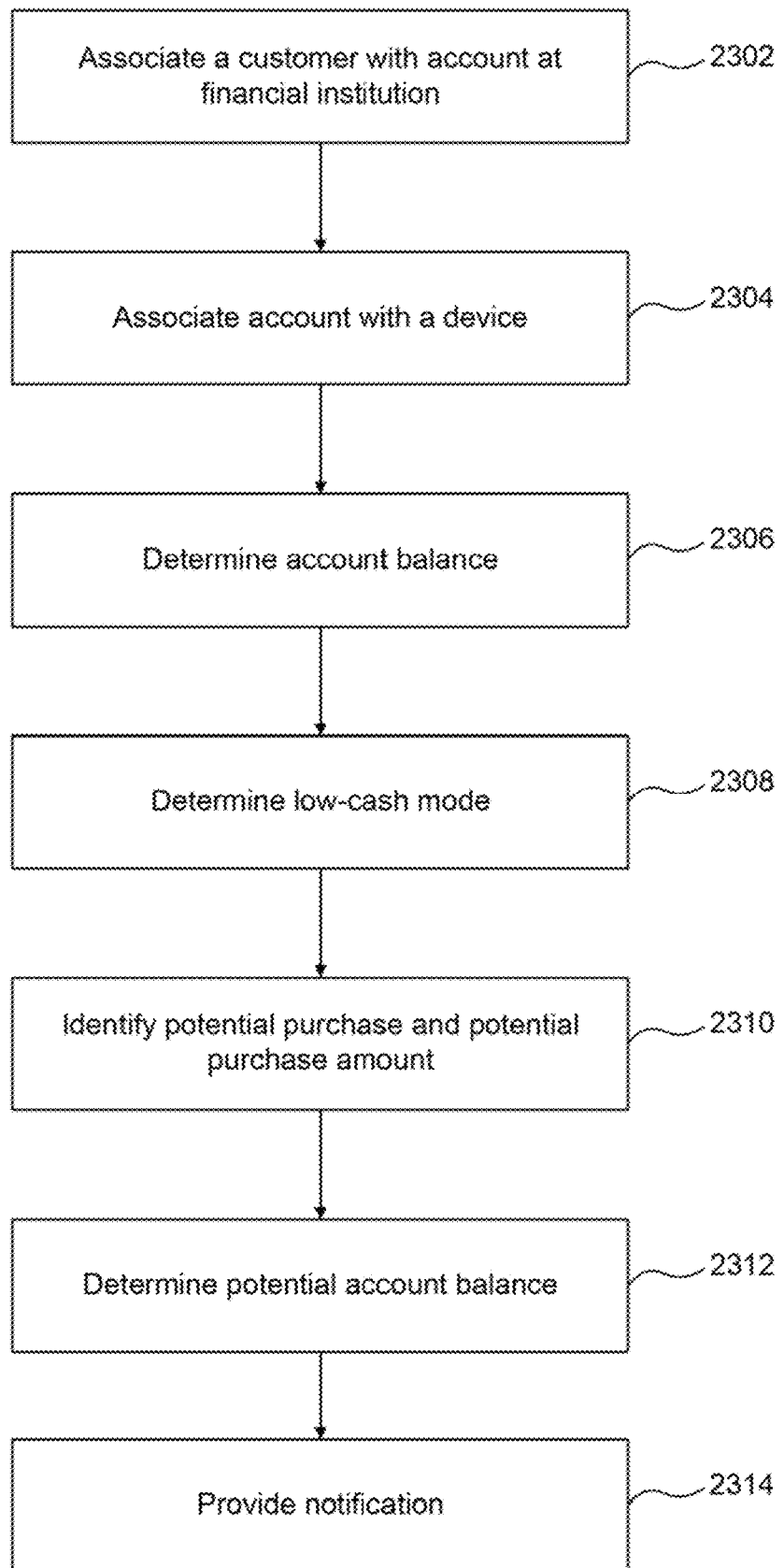
FIG. 23 illustrates an exemplary flow chart for preventing a negative account balance, consistent with disclosed embodiments.

FIG. 23 illustrates an exemplary flow chart for preventing a negative account balance. At step 2302, financial institution 106 may associate a customer with an account at the financial institution. At step 2304, financial institution 106 may associate the account with a device 108. At step 2306, financial institution 106 may determine an account balance of the account.

At step 2308, financial institution 106 may determine, based on the account balance, whether the account is deemed to be in a low-cash mode state, as disclosed herein. At step 2310, financial institution may identify a potential purchase and the amount of the potential purchase. At step 2312, financial institution 106 may, based on the account balance and potential purchase amount, determine a potential account balance. At step 2314, financial institution 106 may provide a notification to the customer. The notification may include a predicated account balance, options to prevent a negative balance, options to avoid the account entering the low-cash mode state, or additional information and options for managing the account as disclosed herein.

System for Overall Increased Efficiency of Transactions

Implementation of the disclosed embodiments may result in overall increased efficiency of transactions by financial institution 106. The increased efficiency may result from at least improved capability to transfer funds between accounts, automation of high demand or regularly occurring tasks/queries such as balance confirmation, by storing and displaying more information in the same place, by providing quicker searching of transaction data, providing additional avenues for communicating with customers, providing more effective avenues for communicating with customers, and other features discussed below which improve functionality for the customers or financial institution 106. Additionally or alternatively, the disclosed embodiments may increase customer satisfaction with the financial institution and improve customer loyalty.

System for Automatic Card Lock

Consistent with disclosed embodiments, when an account associated with a customer enters low cash mode, the financial institution may disable, reject, or block transactions initiated by a credit or debit card associated with the account. The notification (disclosed above) may inform the customer that an account has entered low cash mode and that any card associated with the account has been locked. The financial institution may provide the customer with the ability to choose the option to have the financial institution of automatically locking any card when the associated account enters low cash mode. The financial institution may also provide the customer with the ability to unlock a card that has been locked due to the account's entry into low cash mode. These options and functionality may be provided by the financial institution through a mobile application or web-based interface.

Figure 24:
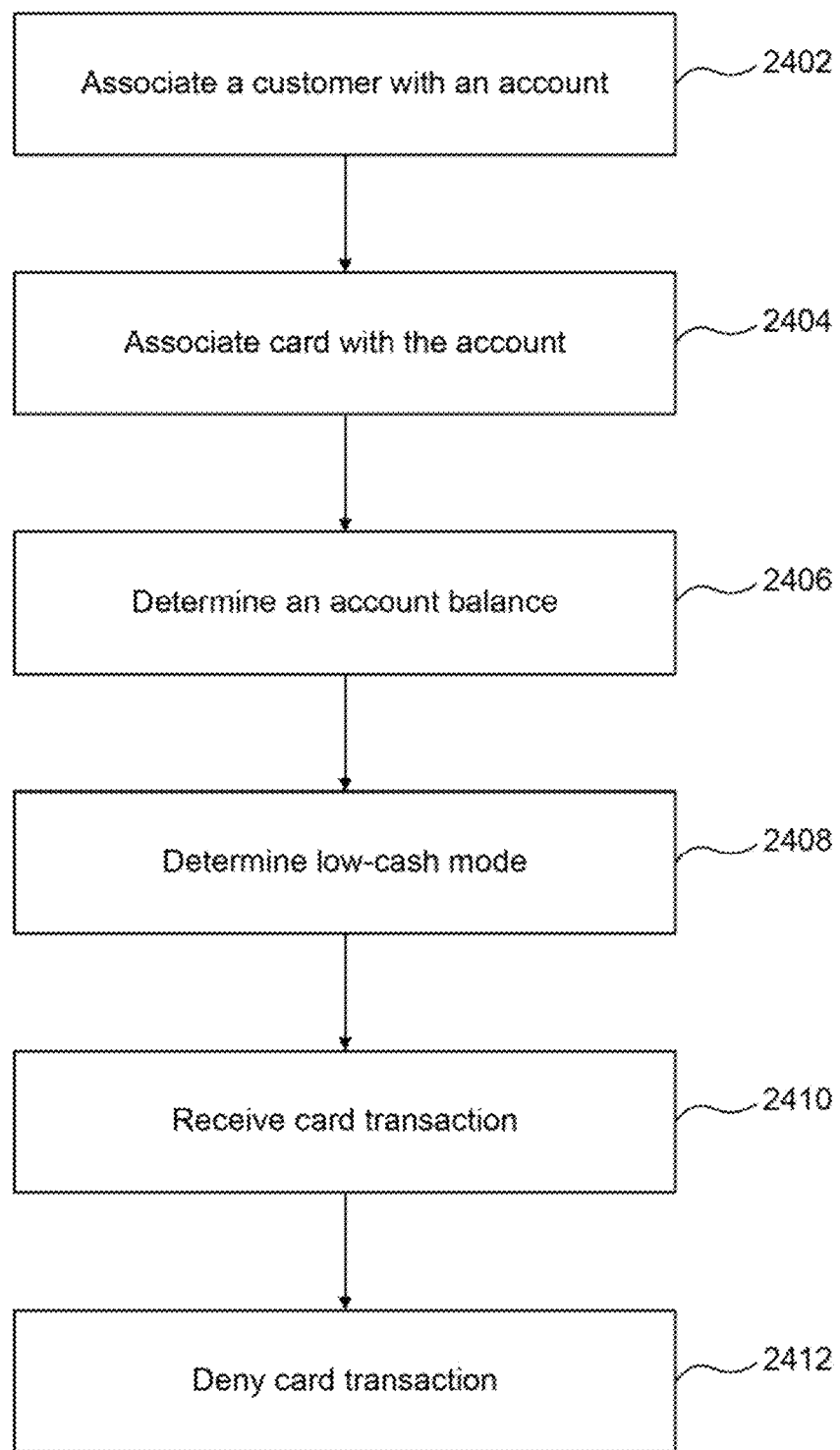
FIG. 24 illustrates an exemplary flow chart for preventing a negative account balance, consistent with disclosed embodiments.

FIG. 24 illustrates an exemplary flow chart for preventing a negative account balance. At step 2402, financial institution 106 may associate a customer with an account at the financial institution. At step 2404, financial institution 106 may associate the account with a card such as a debit card or credit card. At step 2406, financial institution 106 may determine an account balance of the account.

At step 2408, financial institution 106 may determine, based on the account balance, whether the account is deemed to be in a low-cash mode state, as disclosed herein. At step 2410, financial institution may receive a transaction initiated by the card associated with the account. At step 2412, if the account is deemed to be in a low-cash mode state, financial institution 106 may automatically deny the transaction initiated by the card.

System for Low-Cash Mode Based on Predicted Balance

Consistent with disclosed embodiments, the financial institution may determine that an account is in low cash mode based on a predicted balance. The predicted balance may be determined by comparing historical transaction data with current transaction data and predicting a future balance by manipulating the current balance based on expected transactions, deposits, and withdrawals. In some embodiments, the financial institution may apply artificial intelligence or machine learning algorithms to historical data associated with a customer or account in order to learn and predict transactions and spending tendencies and thereby generate a predicted balance.

Figure 7A:
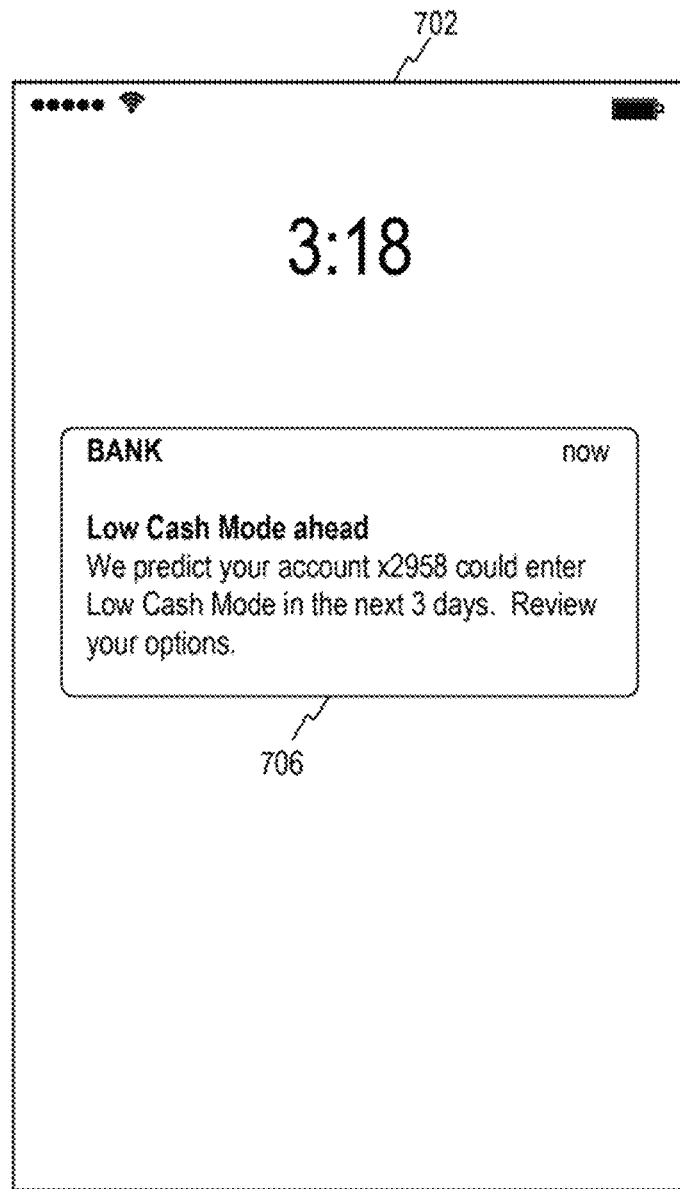
FIGS. 7A-7C illustrate exemplary graphical user interfaces for predicting a low cash mode and related expenses, consistent with disclosed embodiments.

FIG. 7A illustrates an exemplary graphical user interface for notifying a customer that an account associated with the customer may enter low cash mode in a future time period, consistent with disclosed embodiments. As shown in FIG. 7A, a graphical user interface 702 may provide an intelligent alert 706 that indicates "Low Cash Mode ahead" and "We predict your account x2958 could enter low cash mode in the next 3 days. Review your options."

Figure 19:
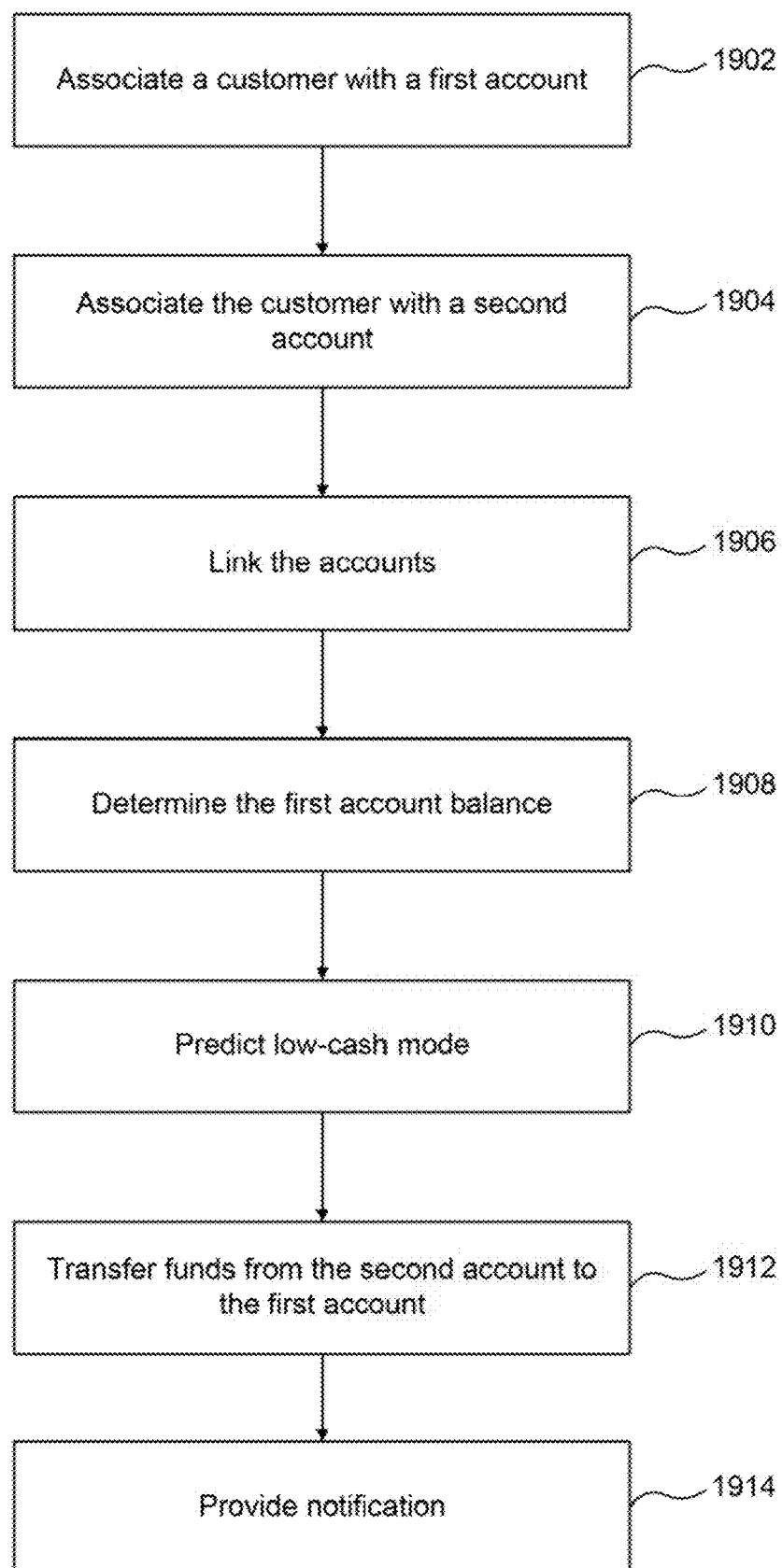
FIG. 19 illustrates an exemplary flow chart for managing a financial account, consistent with disclosed embodiments.

FIG. 19 illustrates an exemplary flow chart for providing notifications to a customer. At step 1902, financial institution 106 may associate a customer with a first account at financial institution 106. At step 1904, financial institution 106 may associate the customer with a second account at financial institution 106 or a different financial institution. At step 1906, financial institution 106 may link the first account with the second account. At step 1908, financial institution 106 may determine an account balance of the first account.

At step 1910, financial institution 106 may determine, based on a predicted first account balance, whether the first account will enter a low-cash mode state, as disclosed herein. At step 1912, if the account is predicted to enter the low-cash mode state, financial institution 106 may automatically transfer funds from the second account to the first account. The amount of funds transferred may be preselected by the customer or determined by financial institution 106. Additionally or alternatively, the amount of funds transferred may be sufficient such that the first account is no longer predicted to enter the low-cash mode state or sufficient to prevent a negative first account balance.

At step 1914, financial institution 106 may provide a notification to the customer that the first account is predicted to enter the low-cash mode state, that funds were automatically transferred from the second account, the amount of funds transferred from the second account, a current first account balance, and/or options for managing the first account while in the low-cash mode state.

Figure 25:
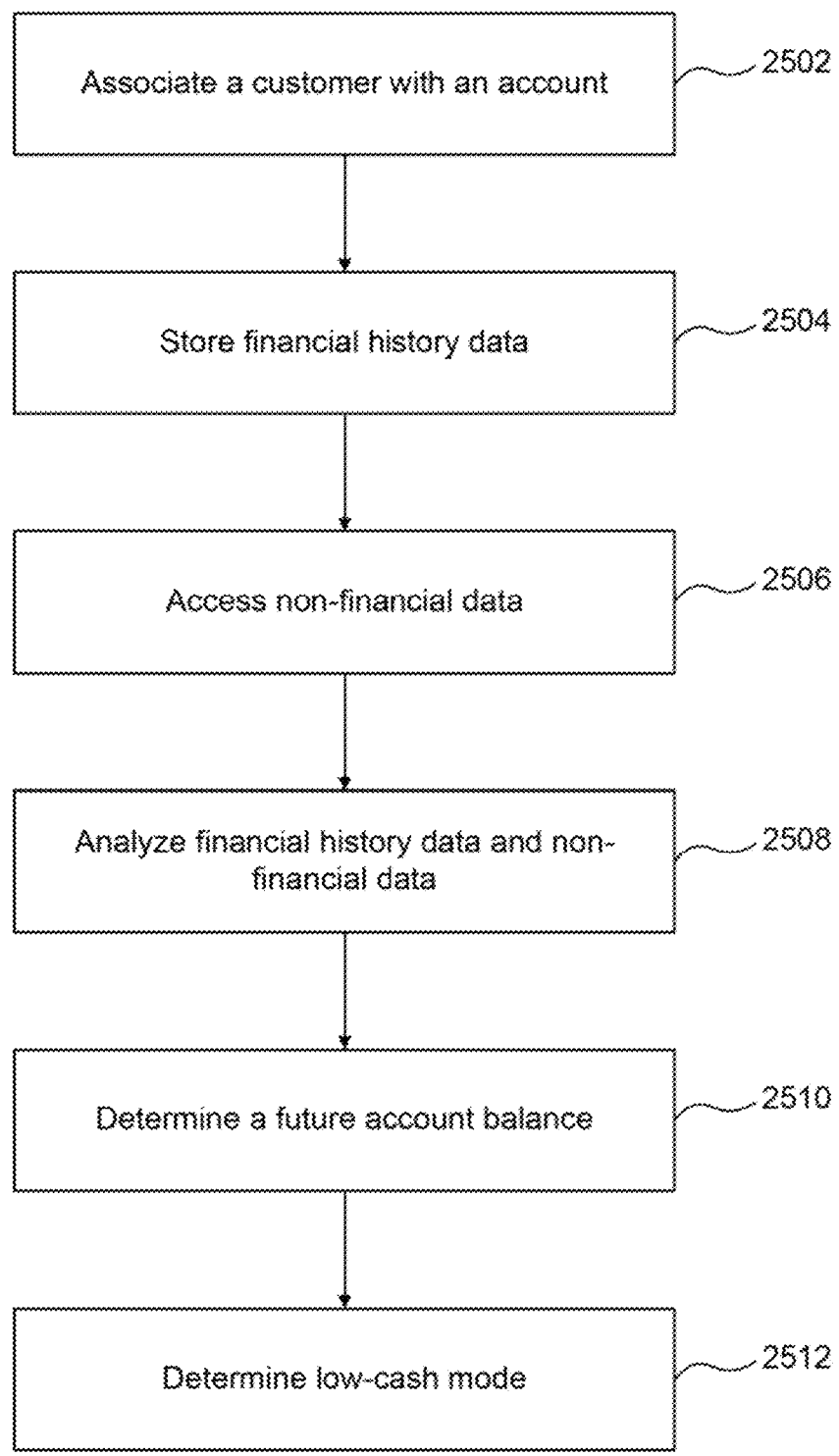
FIG. 25 illustrates an exemplary flow chart for predicting low-cash mode, consistent with disclosed embodiments.

FIG. 25 illustrates an exemplary process for prediction low-cash mode. At step 2502, financial institution 106 may associate a customer with an account at financial institution 106. At step 2504, financial institution 106 may store financial history data associated with the customer and/or the account. At step 2506, financial institution 106 may access non-financial data. At step 2508, financial institution 106 may analyze the financial history data and the non-financial data. At step 2510, financial institution 106 may determine a future account balance of the account based on the analysis performed in step 2508. At step 2512, financial institution 106 may determine, based on the future account balance, whether the first account will enter a low-cash mode state, as disclosed herein.

System for Selecting Overdraft Protection Features

In the disclosed embodiments regarding payment designation options, the financial institution may offer such options through various methods, including through an application on a mobile device. In some embodiments, these options may be selectable by the customer and implemented automatically without any action or intervention by the financial institution (e.g., without approval of the selected features by the financial institution).

Figure 26:
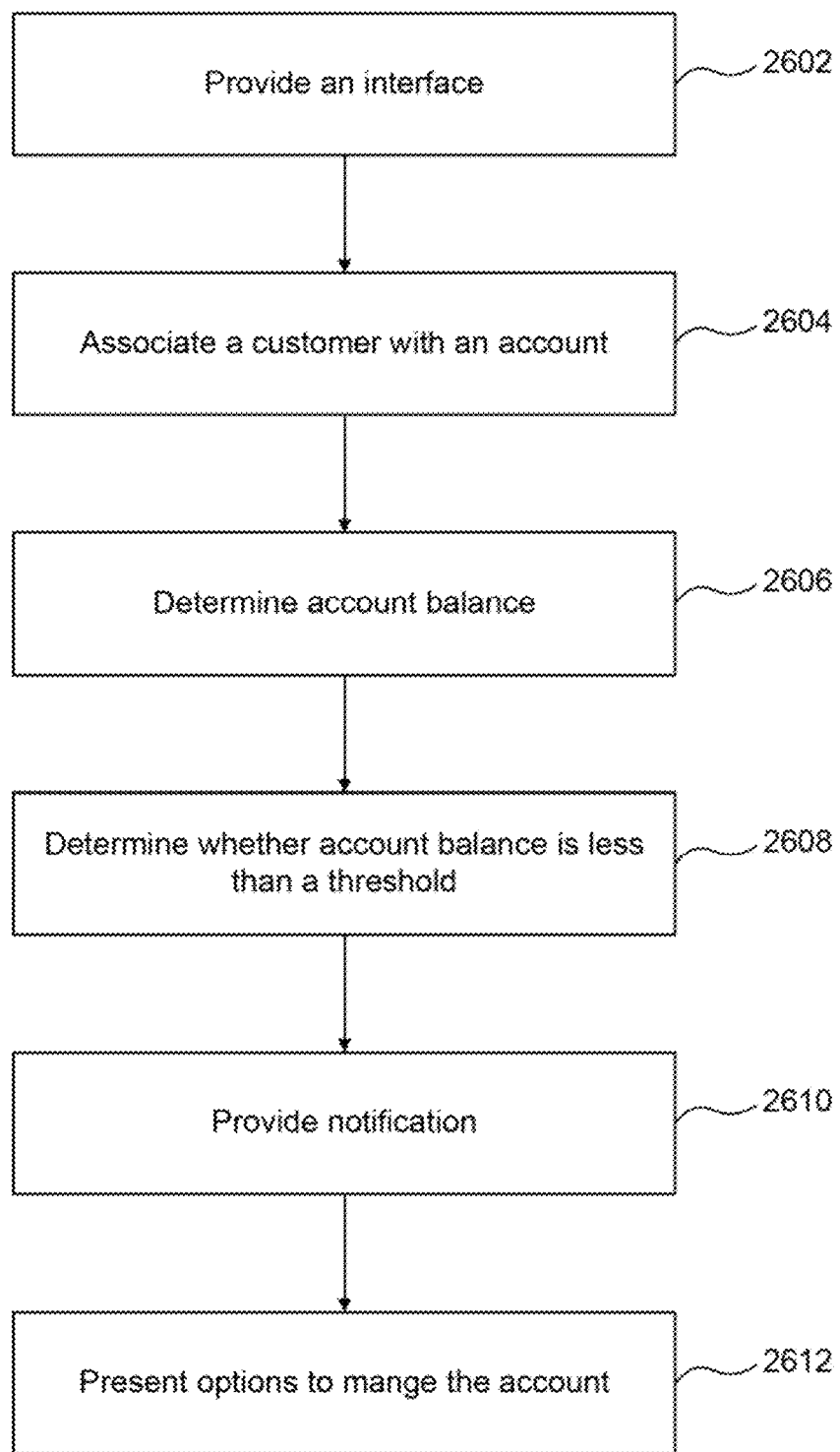
FIG. 26 illustrates an exemplary flow chart for managing a financial account, consistent with disclosed embodiments.

FIG. 26 illustrates an exemplary process for managing a financial account. At step 2602, financial institution 106 may provide an interface for managing a financial account. At step 2604, financial institution 106 may associate a customer with an account at financial institution 106. At step 2606, financial institution 106 may determine an account balance of the account.

At step 2608, financial institution 106 may determine, based on the account balance, whether the account is deemed to be in a low-cash mode state, as disclosed herein. At step 2610, if the account is deemed to be in a low-cash mode state, financial institution 106 may provide a notification to the customer that the account is deemed to be in a low-cash mode state. At step 2612, financial institution 106 may present options to manage the account while the account is in the low-cash mode state.

System for Customer Management of Transactions

In some embodiments, financial institution may provide options to the customer with an account in low cash mode to select which transactions to approve while other transactions are canceled or delayed. The options presented by the financial institution may also allow the customer to select an order of the transactions for processing, resulting in a prioritization of processing transactions. The customer may further select payments to delay until the occurrence of an event, such as a deposit, or for a specified length of time. The financial institution can vary the options presented based on the origin of an individual transaction, for example presenting the option to cancel some transactions while others can only be delayed. Different transaction origins may include point of sale transactions, ACH transactions, checks, scheduled payments, or any other method of initiating a transfer of funds into or out of an account.

In some embodiments the financial institution may offer a customer the option to designate payments for processing or non-processing after a payment transaction has occurred. A financial institution may, for example, receive data indicating that a payment transaction between a merchant and a customer account has occurred while the customer account is in low cash mode, and may offer the customer the option of designating that payment transaction for processing. In some embodiments, financial institution may additionally offer the customer the option to designate future payments from that merchant or location as payments which should be processed while the customer account is in low cash mode.

In other embodiments, financial institution may offer customers the option to designate payments to be delayed or canceled while the associated account in operating in low cash mode. In some embodiments, payments may not be available to be designated for processing during low cash mode unless criteria set by the financial institution or the customer are met. For example, the financial institution may not allow any payments to be designated for processing if the customer account is in delinquency, has a balance above or below a threshold, has an overdraft or penalty fee outstanding, or has a customer account history consistent with other groups of customer accounts. As another illustrative example, the customer account may be associated with parental controls or a controlling agent. The financial institution may withhold offering the customer designation options or may offer the customer the designation options but prevent the customer from making designations unless the financial institution has received an authorization from the customer's parent or controlling agent.

Figure 4E:
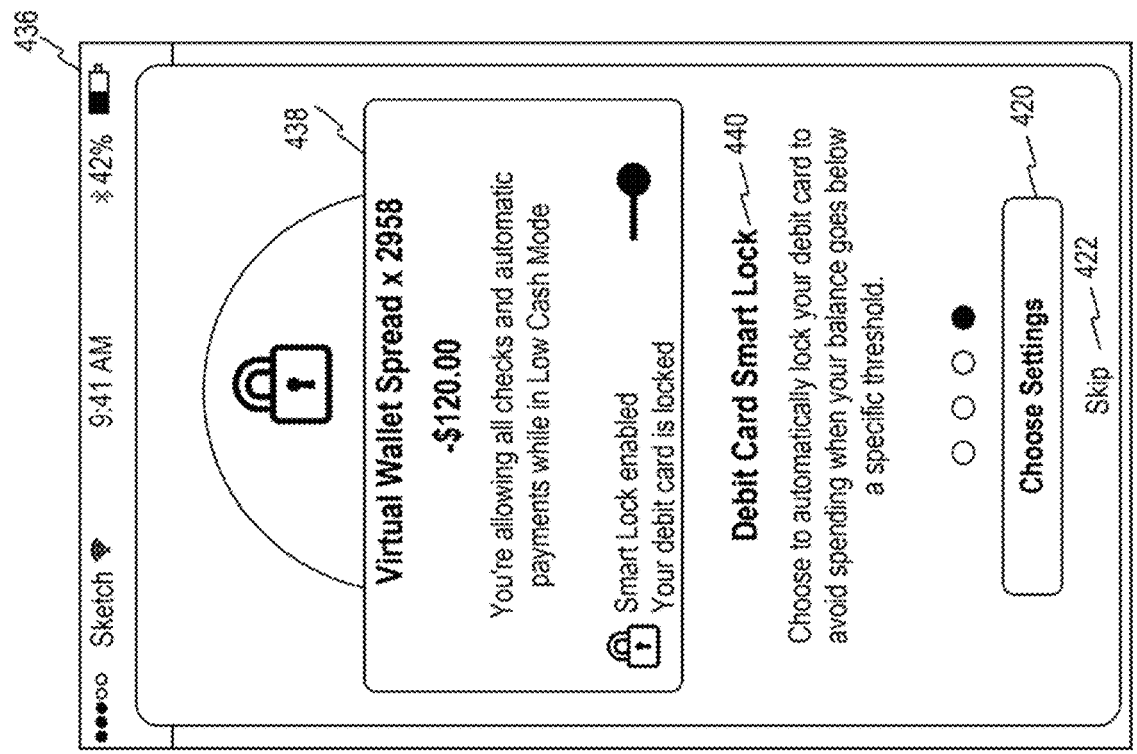
Figure 4D:
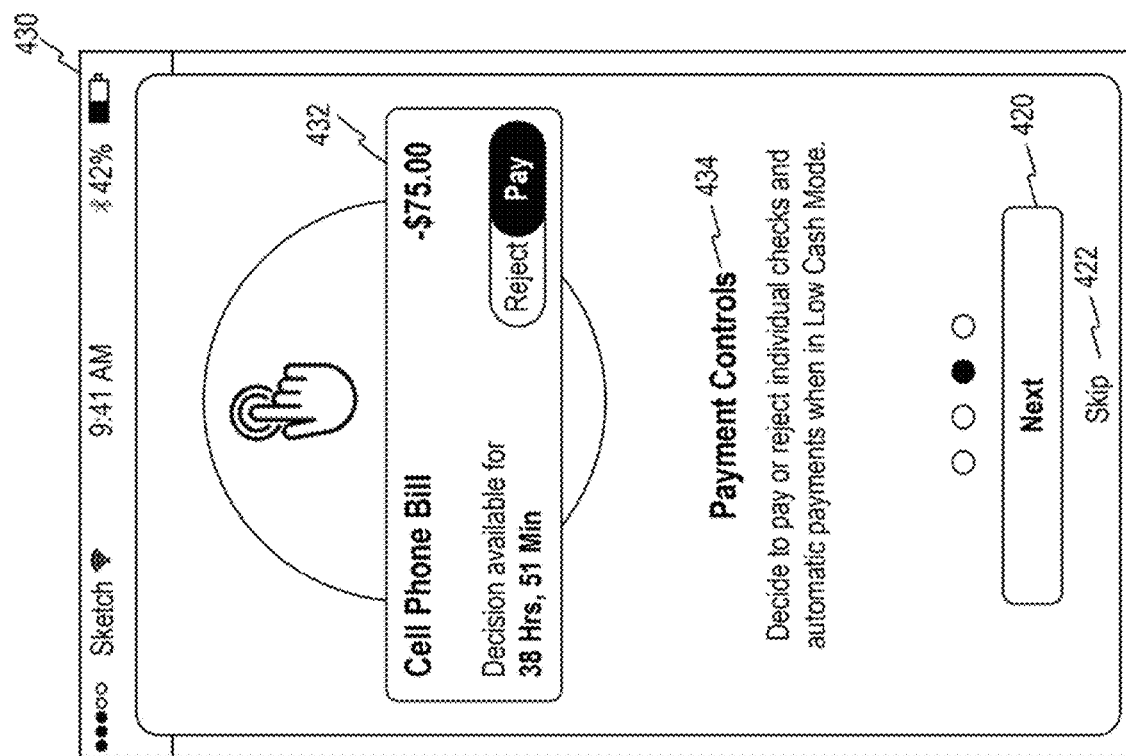

FIG. 4D illustrates an exemplary graphical user interface 430 for paying or rejecting individual checks and automatic payments, consistent with disclosed embodiments. Consistent with disclosed embodiments, the financial institution may present the customer with preventative options. Preventative options may include, for example, the ability to cancel transactions including Automated Clearing House ("ACH") transactions and pending, uncashed checks. The financial institution may provide suggestions or recommendations of which transactions to cancel and provide means for canceling the pending transactions. As shown in FIG. 4D, a user may also be given the option 432 to manually cancel payment of a cell phone bill of $75.00 or may be given the option to pay the cell phone bill of $75.00. A user may toggle between "reject" or "pay" and cancel automatic bill transactions.

Figure 5B:
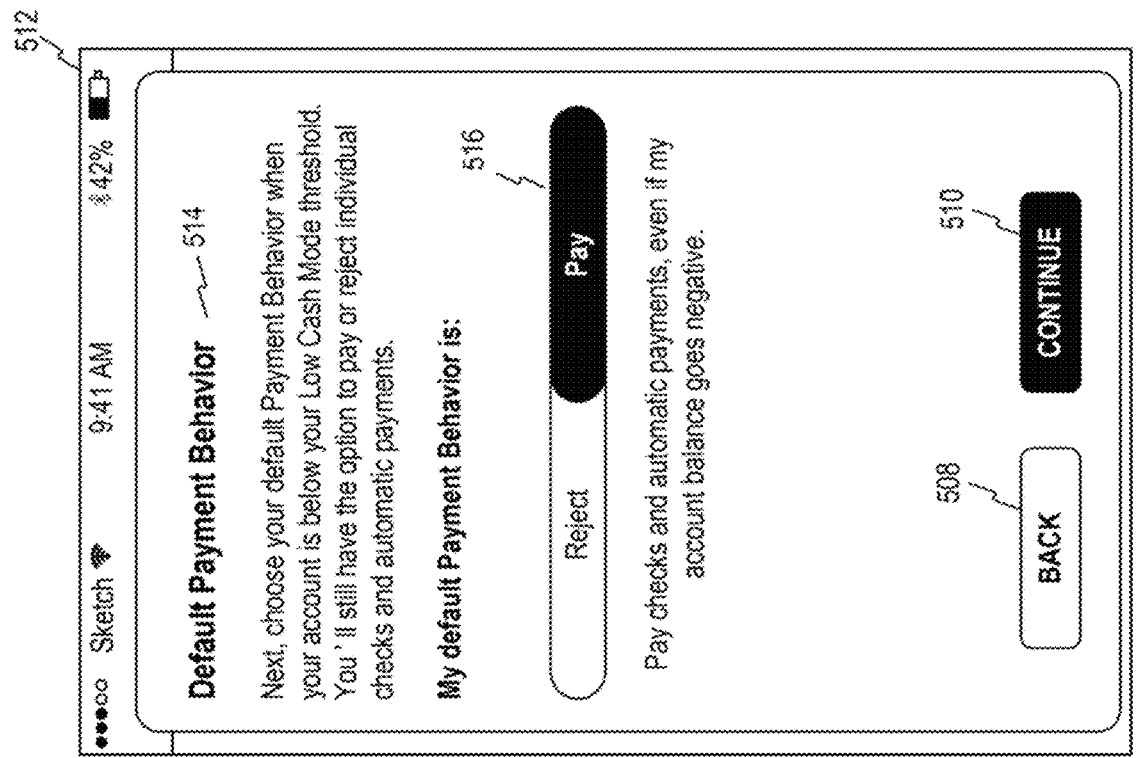
FIGS. 5A-5D illustrates exemplary graphical user interfaces for low cash mode customization and configurations, consistent with disclosed embodiments.

FIG. 5B illustrates an exemplary graphical user interface for setting a default payment behavior 514, consistent with disclosed embodiments. As shown in FIG. 5B, a user may choose their default payment behavior when their account is below their low cash threshold. The user will have the option to pay or reject individual checks and automatic payments. A switch 516 may enable the user to toggle between default "Reject" and "Pay" options. As shown in FIG. 5B, switch 516 for the user's default payment behavior is set to "Pay" individual checks and automatic payments when the account is in low cash mode. That is, the user's default behavior is to still pay checks and automatic payments even if the account balance is negative. Switch 516 may be set to a default behavior "Reject," which would automatically prevent checks and automatic payments from processing, unless the user affirmatively determines to pay the check or automatic payment (or allow it to process). Back 508 and Continue 510 buttons may be provided for users to navigate between screens to allow for further configuration or customization of low cash mode preferences or properties.

Figure 9A:
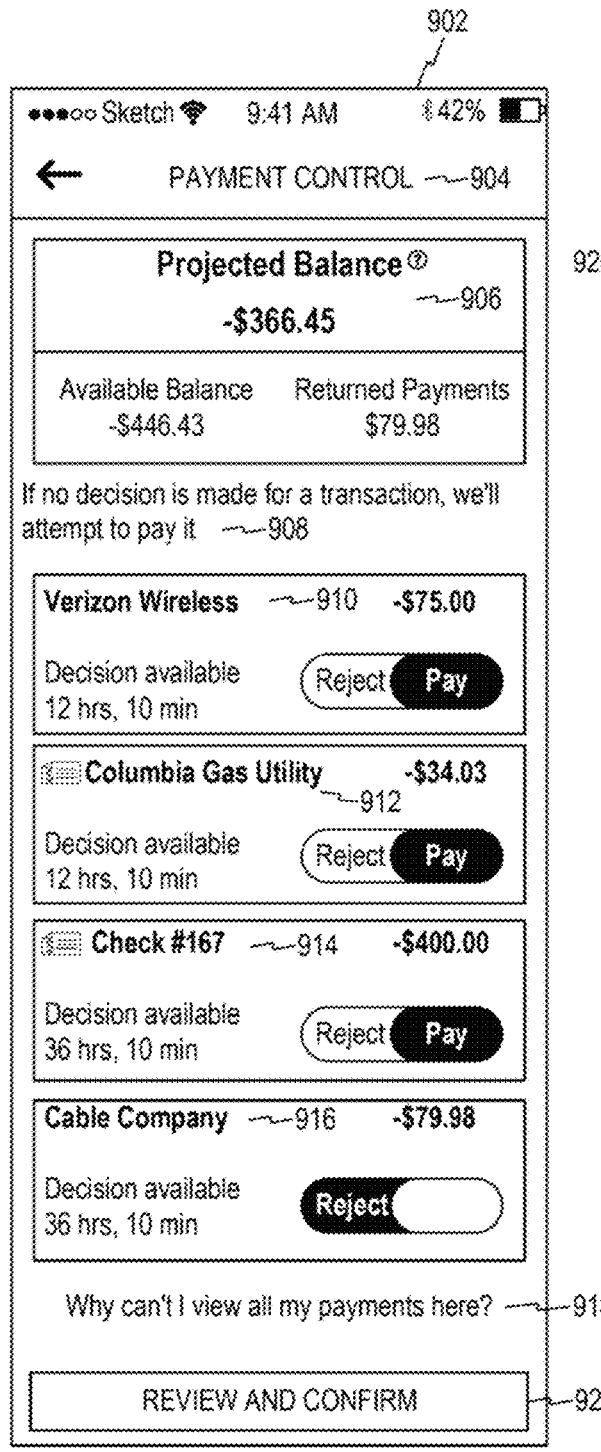
FIGS. 9A-9E illustrates exemplary graphical user interfaces having a dashboard configuration for payment control and review of transactions, consistent with disclosed embodiments.
Figure 9B:
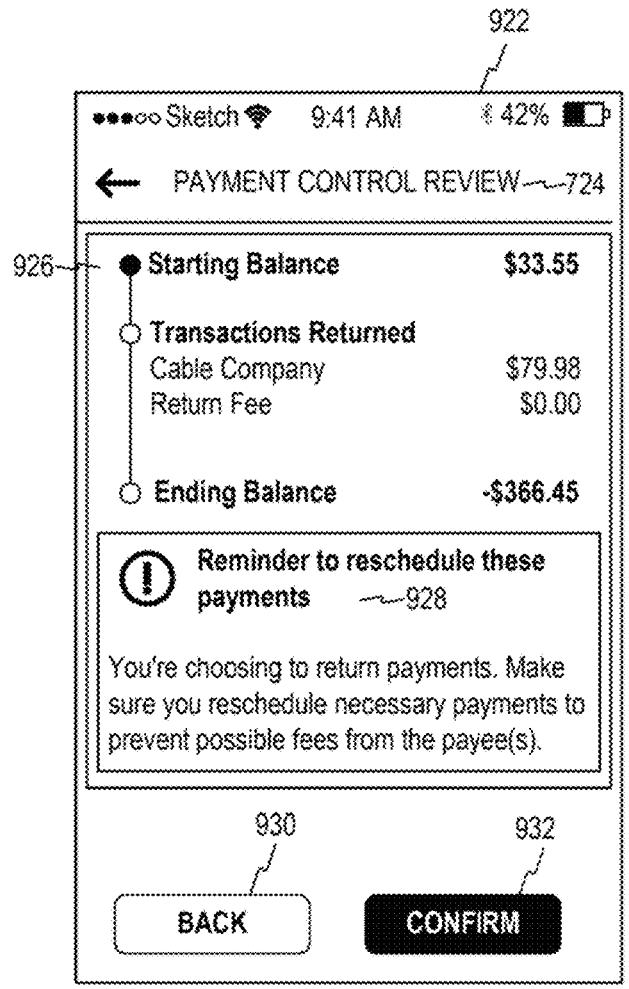
Figure 9C:
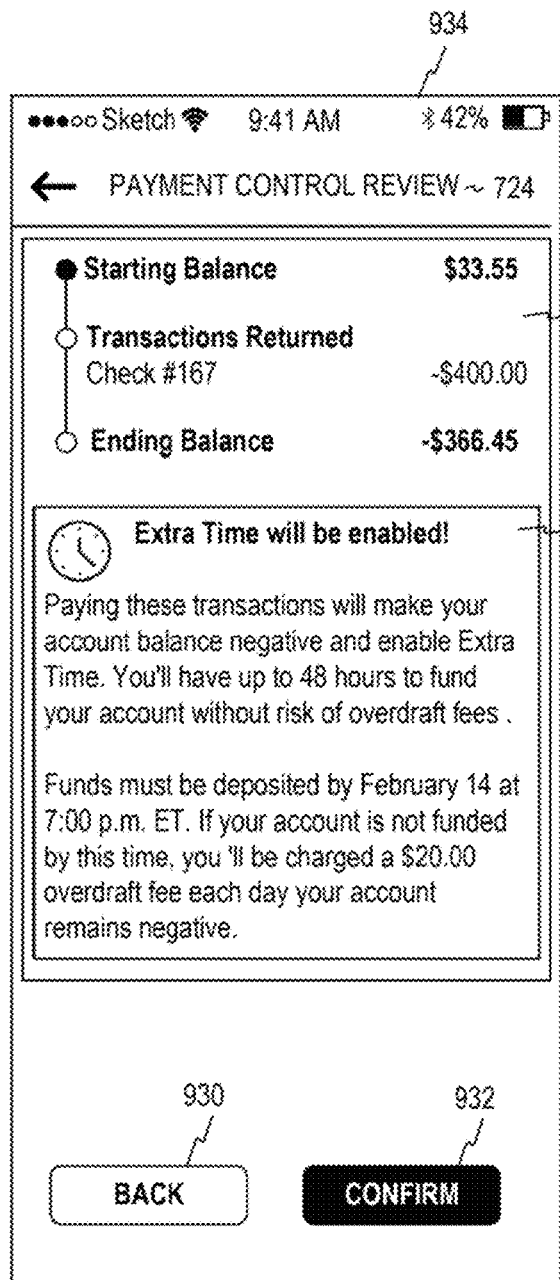
Figure 9D:
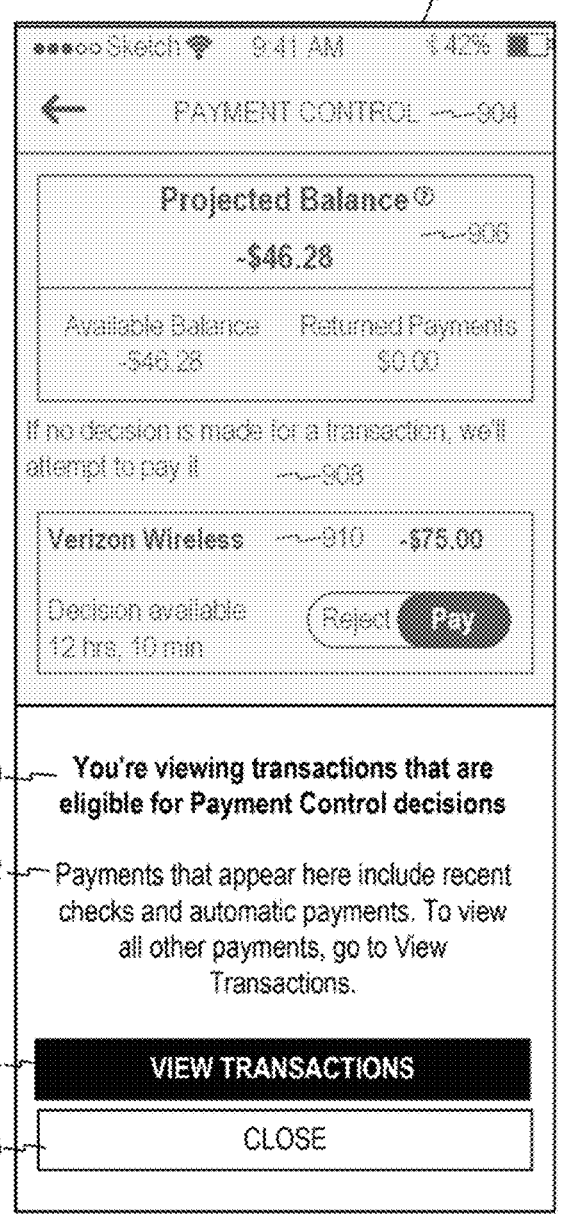
Figure 9E:
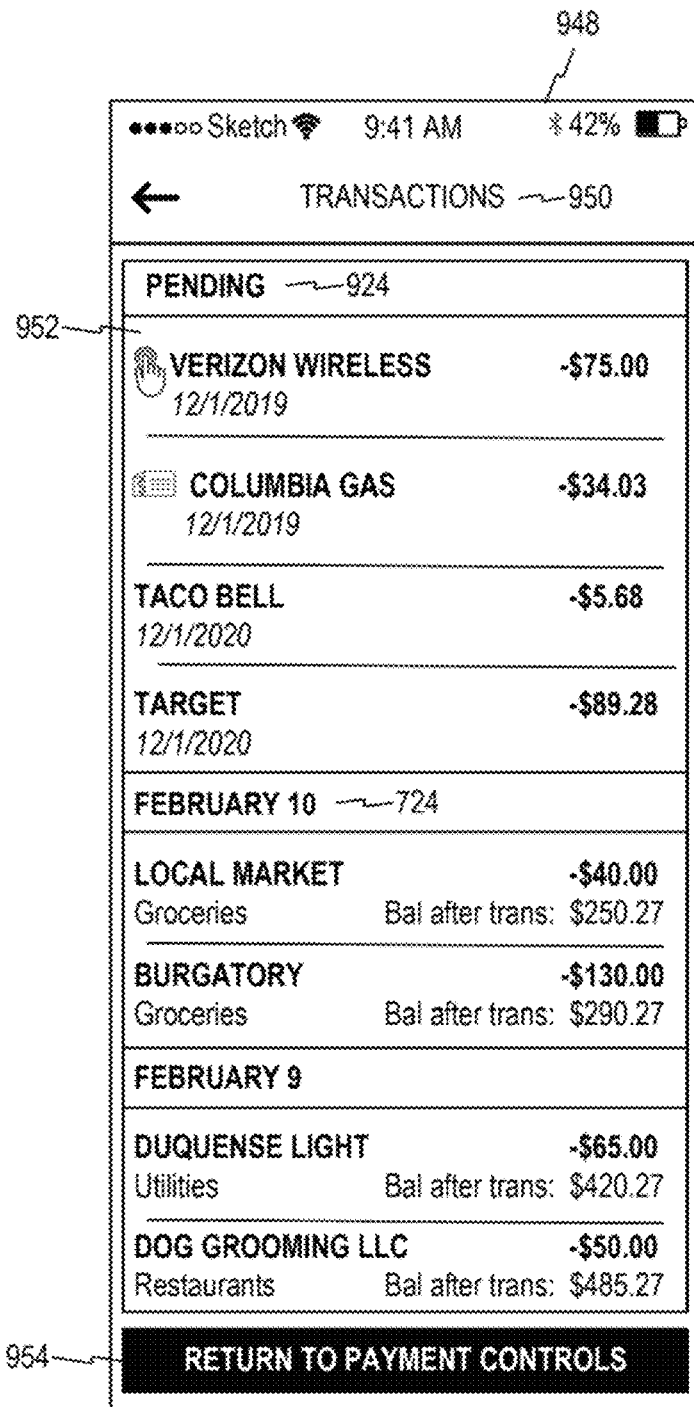

FIGS. 9A-9E illustrates exemplary graphical user interfaces including a dashboard configuration for payment control and review of transactions, consistent with disclosed embodiments. At FIG. 9A, user interface 902 may include a projected balance that may be displayed at 906 as part of the options for managing an accounts, such as payment control 904. In this example, without user input, the financial institution will process pending transactions as shown at 908, where, if no decision is made for a transaction, then the financial institution will attempt to pay it. At 910, the user is provided an option to reject or pay the Verizon wireless bill. At 912, the user is provided an option to reject or pay the Columbia gas utility bill. At 914, the user is provided an option to reject or pay the check. At 916, the user has selected to reject payment for the cable company. The dashboard configuration may include an amount of time remaining for a user to choose to pay or reject a transaction. In this example, at 916 the user has 36 hours and 10 minutes to make the decision. At 918, the user may obtain more information as to why all payments are not visible here. At 920, the user may review and confirm the decisions. At FIG. 9B, user interface 922 may show a starting balance 926 and then a calculated ending balance after transactions are returned. It may also include a reminder at 926 to reschedule these payments 928. Interface 922 may include back 930 and confirm 932 buttons. FIGS. 9C-9E illustrate various embodiments of user interfaces 934, 938, and 948. At FIGS. 9C-9E, starting balance 926 may be presented. Extra time may be enabled at 936. Payments at 942 that appear here include recent checks automatic payments. To view all other payments, go to view transactions. At 944, view transactions. At 946, the user may close interface 938. At 924 pending transactions may be shown. 952 may display Verizon wireless as an example and at 954 may return to payment controls.

System for Account Management Over a Time Period

Consistent with disclosed embodiments, financial institution may provide a customer with the option to approve or deny processing or initiation of transactions for a period of time, such as an entire day (as discussed above). Alternatively, the financial institution may provide the customer the ability to review options associated with individual transactions. In one embodiment, the financial institution may provide a notification to the customer (as disclosed herein) that presents the option to the customer to approve or deny spending for the day.

In another embodiment, financial institution may provide a notification to the customer (as disclosed herein) that prompts the customer to configure how an account can spend for a specified period of time, such as a day. The notification may direct the customer to open an application on a mobile device where the financial institution presents options for processing transactions associated with an account within the specified period of time.

Figure 27:
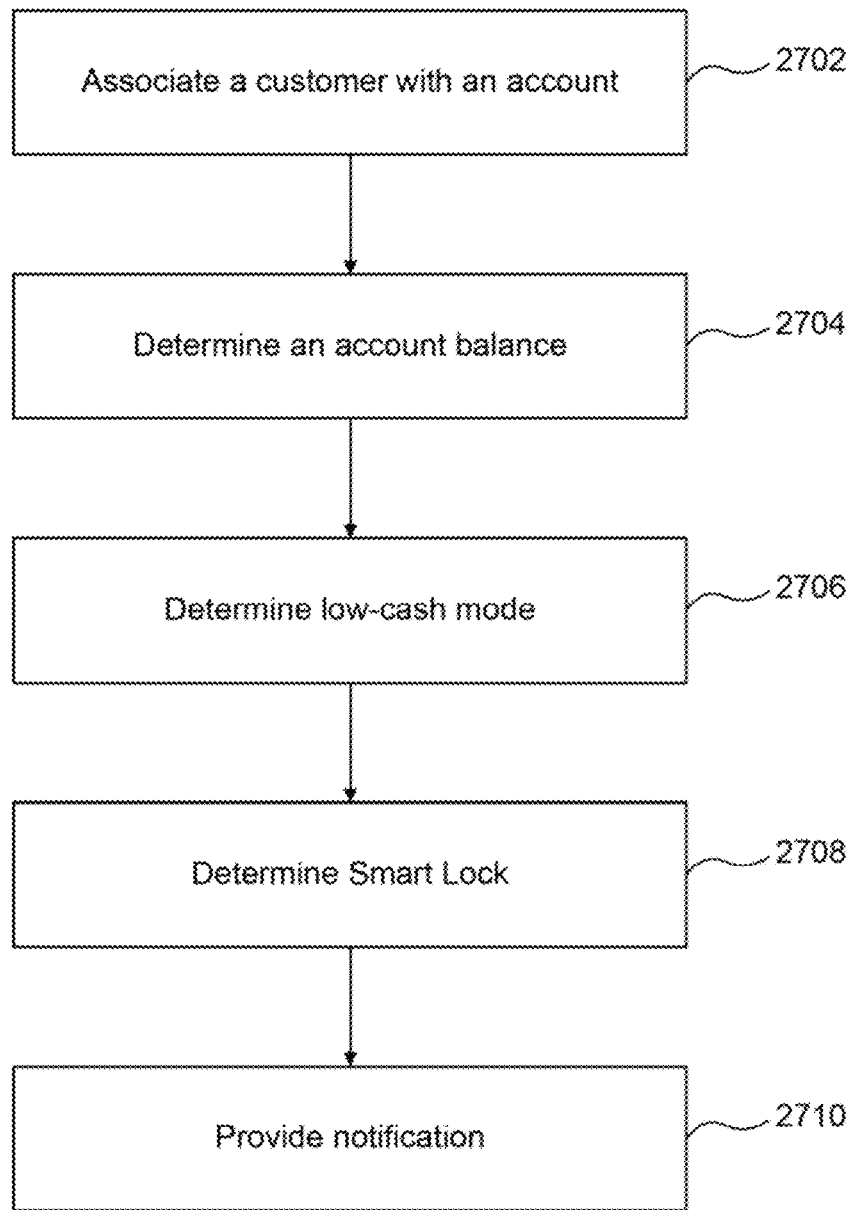
FIG. 27 illustrates an exemplary flow chart for managing a financial account, consistent with disclosed embodiments.

FIG. 27 illustrates an exemplary flow chart for managing a financial account. At step 2702, financial institution 106 may associate a customer with an account at financial institution 106. At step 2704, financial institution 106 may determine an account balance of the account.

At step 2706, financial institution 106 may determine, based on the account balance, whether the account is deemed to be in a low-cash mode state, as disclosed herein. At step 2708, financial institution 106 may determine whether smart lock is activated or designated to be activated when the account is deemed to be in the low-cash mode state. At step 2710, financial institution 106 may provide a notification to the customer. The notification provided in step 2710 may include multiple notifications. Additionally or alternatively, the notification may include information relative to the low-cash mode state and/or options to manage the account.

System for Smart Lock

Consistent with disclosed embodiments, the financial institution may provide an option for a customer to lock a card associated with an account. When a card is locked, the financial institution will cancel or decline transactions associated with the card. The lock may be initiated automatically when the balance of the account falls below a predetermined threshold. Additionally or alternatively, the financial institution may present the customer with the option to lock a card through an interface such as an application on a mobile device. The predetermined threshold for locking the card may or may not be different for the threshold triggering low cash mode for the same account. The financial institution may select a default predetermined value for locking the card or, alternatively, present the customer with the ability to set the predetermined threshold for locking the card. The financial institution may present the customer with the option to unlock a card associated with a card through an interface such as an application on a mobile device. As shown in FIG. 4E, a smart lock feature is enabled and a debit card is locked. In this example, while the debit card is locked, the user has chosen to allow all checks and automatic payments to proceed in low cash mode.

FIG. 4E illustrates an exemplary graphical user interface 436 for viewing a virtual wallet spread and automatically locking a customer's debit card, consistent with disclosed embodiments.

Figure 5A:
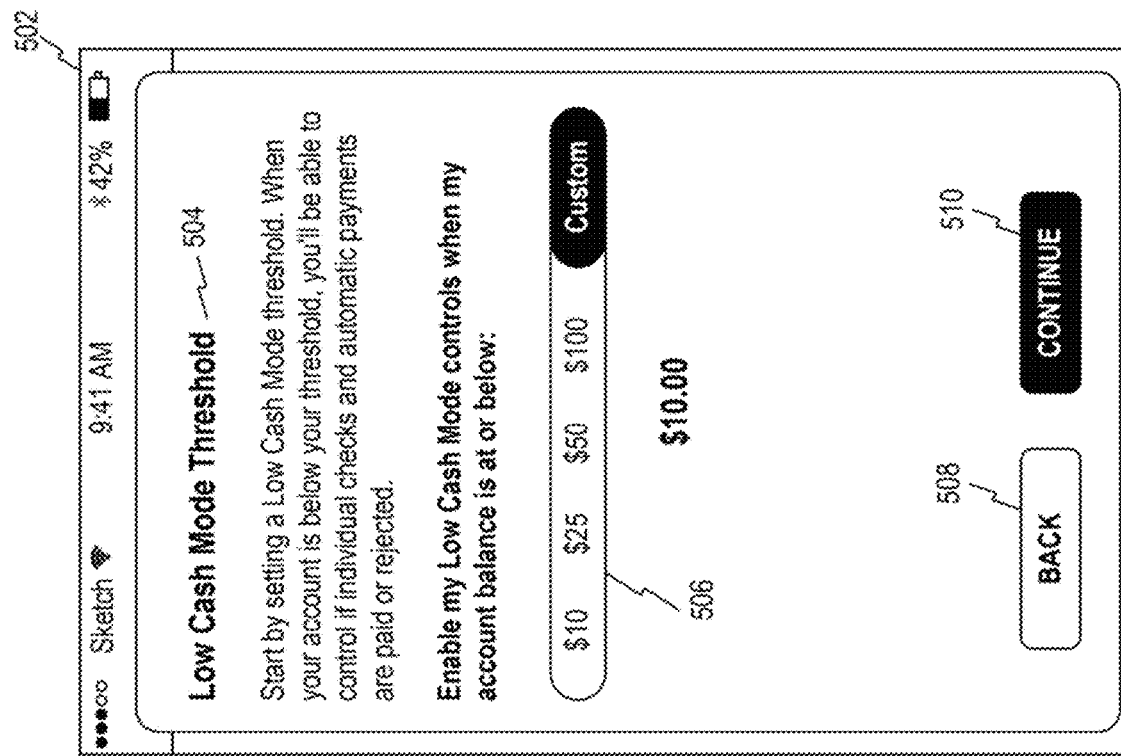
Figure 5D:
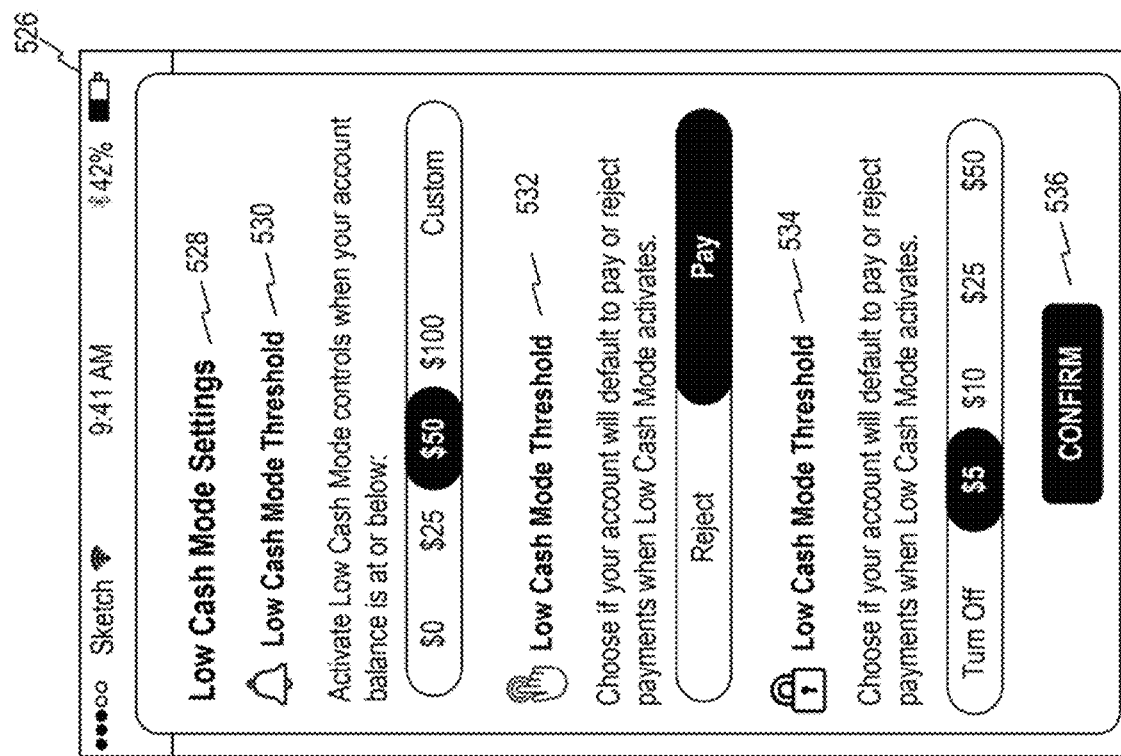
Figure 5C:
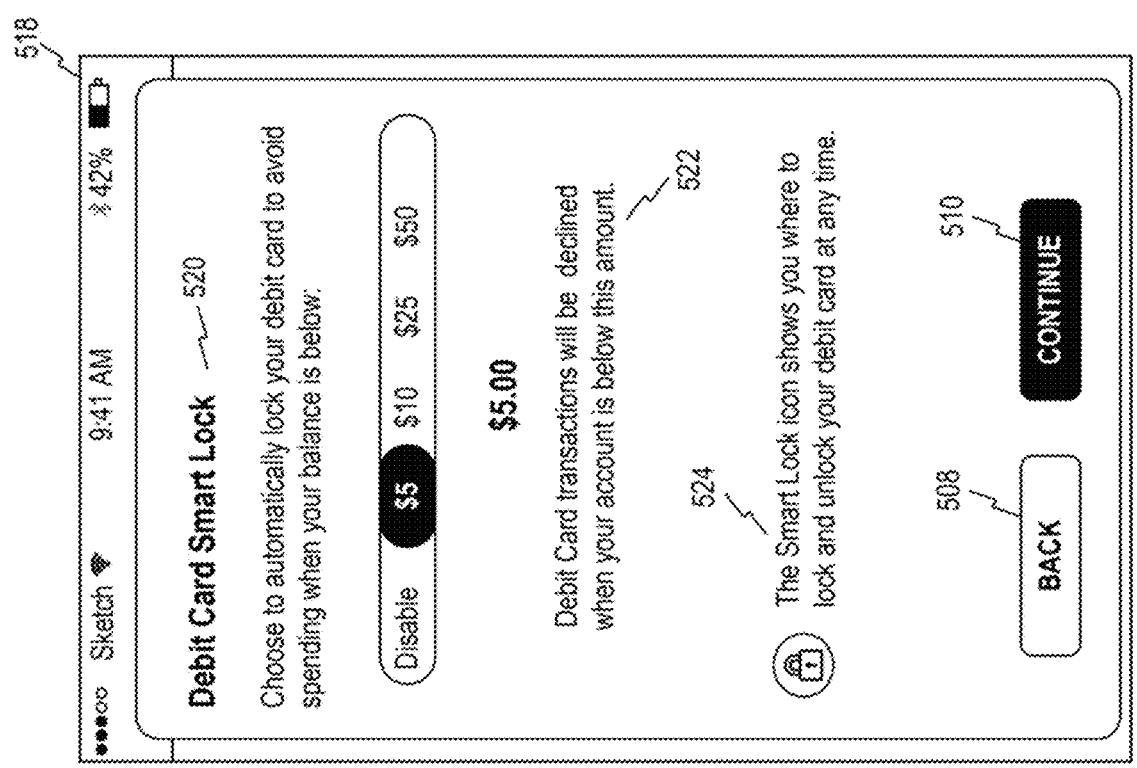

FIG. 5C illustrates an exemplary graphical user interface 518 for debit card smart lock, consistent with disclosed embodiments. As shown in FIG. 5C, a user may automatically lock a debit card associated with the account to avoid spending when the account balance is low. For example, the user may "disable," select $5, $10, $25, or $50 as threshold values to automatically lock the debit card. Debit card transactions will be declined when a user's account is below the predetermined amount (e.g. as shown in FIG. 5C, $5.00). FIG. 5C also includes a lock icon 524 which is a smart lock icon that demonstrates to the user where to lock and unlock the debit card at any time. Back 508 and Continue 510 buttons may be provided for users to navigate between screens to allow for further configuration or customization of low cash mode preferences or properties.

FIGS. 11A-11B illustrate exemplary graphical user interfaces having a second disabled dashboard embodiment, consistent with disclosed embodiments. At FIG. 11A, user interface 1102 may be disabled such that a user may only lock or unlock a car associated with the account. For example, smart lock is enabled at 1104. At 1104, a user's debit card may be unlocked. In FIG. 11B, user interface 1106 illustrates that smart lock may still be enabled at 1108 but the user's debit card may now be locked. Other interfaces not shown, which illustrate a user toggle between an unlocked and a locked state for use of debit card are contemplated with disclosed embodiments.

FIGS. 13A-13D illustrates exemplary graphical user interfaces for a mobile application enabling smart lock triggers, consistent with disclosed embodiments. At user interface 1302, the user may enable smart lock at 1304. At 1306, there may be alert preferences provided to a user. At 1308, alerts may be made automatically during predicted danger days. At 1312, anytime my balance goes below a predetermined threshold, such as $50 dollars, an alert will be made to the user. At 1314, anytime my account has a negative available balance an alert will be made to a user. At 1316, default payment behavior may be set for a user. At 1318, an option for how transactions should be handled when the account is smart locked and the user fails to respond to the alert may be set by a user. At 1320, the user may select the option to pay all transactions even if it results in a negative balance (which is shown as checked by a user). At 1322, the user may select the option to decline all transactions (unchecked).

Figure 13B:
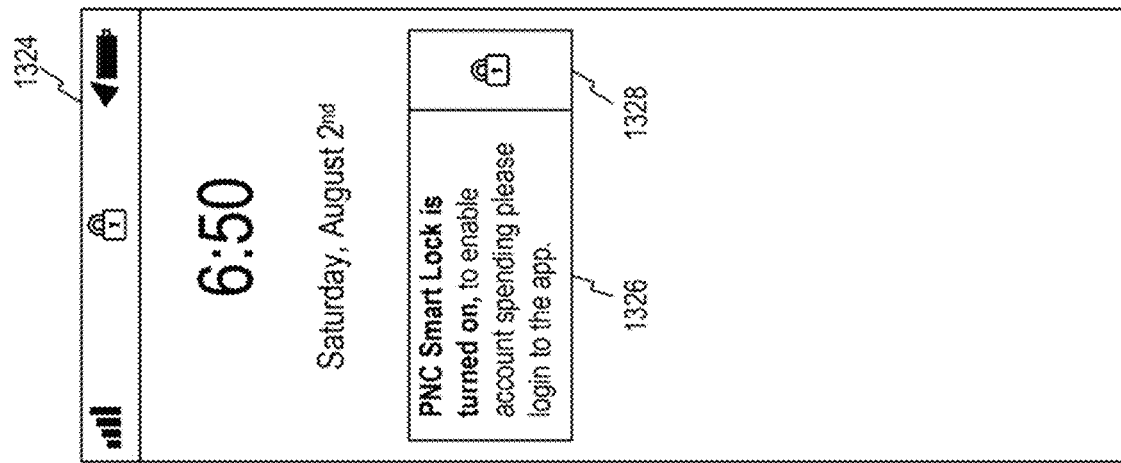
FIGS. 13A-13D illustrates exemplary graphical user interfaces for a bank application enabling smart lock triggers, consistent with disclosed embodiments.
Figure 13A:
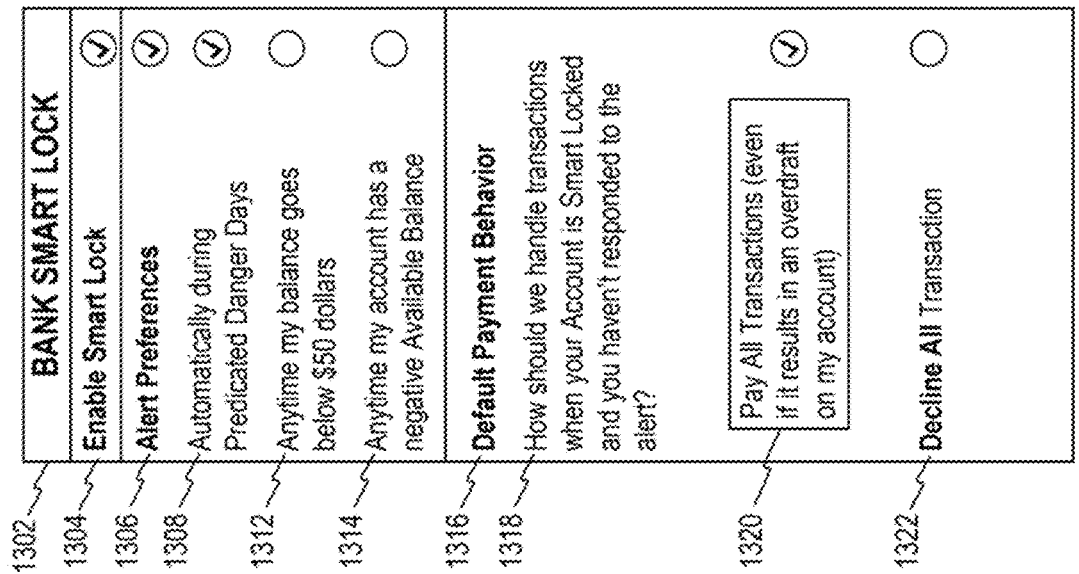
Figures 13C, 13D:
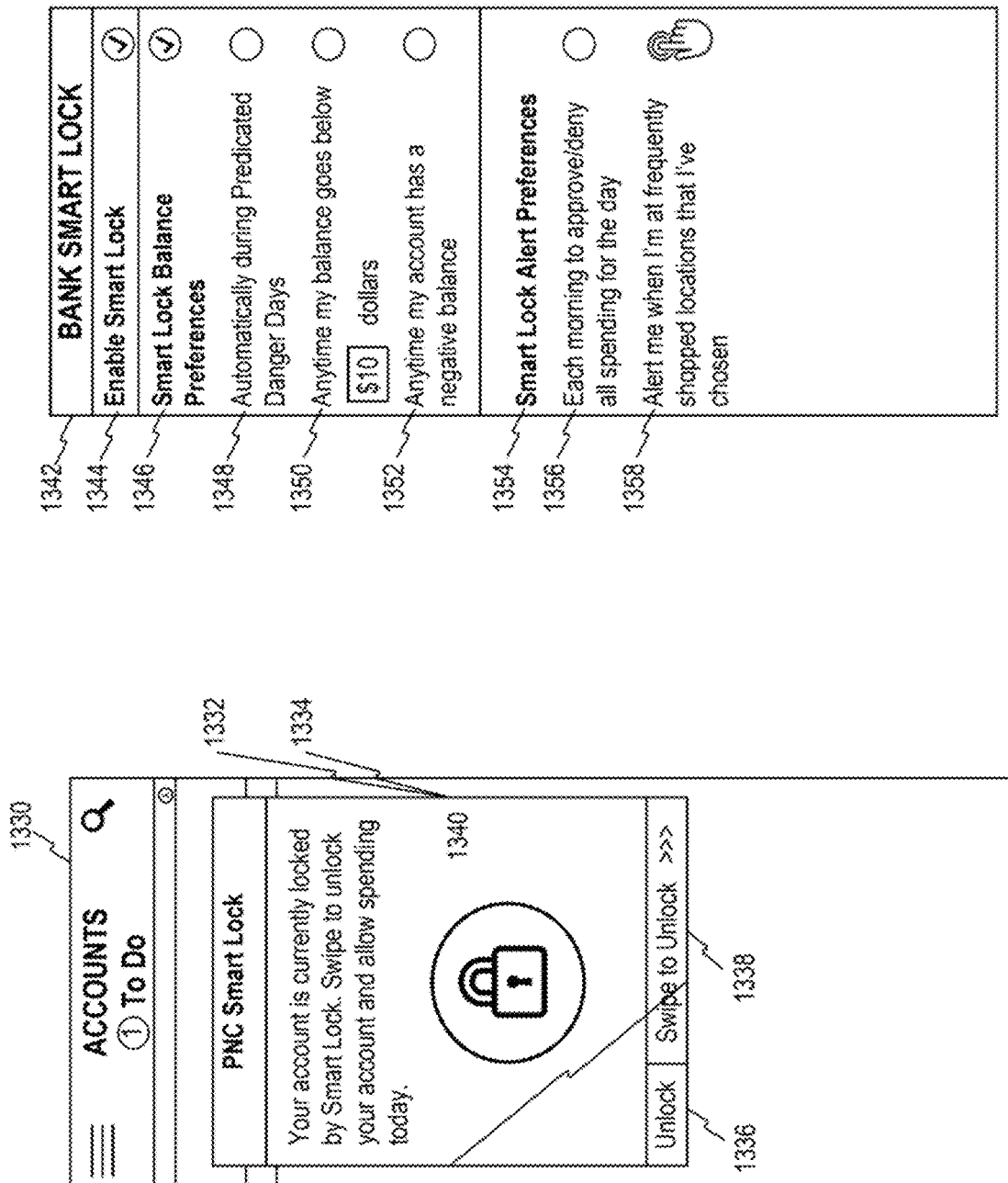

At FIG. 13B, user interface 1324, a smart lock is turned on, to enable account spending, and states to please login to the application at 1326 by selecting lock icon at 3928. FIG. 13C, illustrates a user interface 1330 displaying an "Accounts To Do" screen including a PNC Smart Lock at 1332 displaying a message at 1334 that "Your account is currently locked by Smart lock. Swipe to unlock your account and allow spending today." At 1340 there is a lock icon, and at 1336 there is an unlock icon. At 1338 there is a swipe to unlock feature. At 1302, there is a bank smart lock interface. At FIG. 13D, there is another bank lock interface 1342 for enabling smart lock 1344. In particular, there is an enable smart lock icon that can be selected allowing a user to select smart lock preferences 1346. At 1348, an option for automatically during predicated danger days go ahead. At 1350, an option for anytime my balance goes below $10 dollars. At 1352, an option for anytime my account has a negative balance. At 1354 there are smart lock alert preferences. At 1356, an option for each morning to approve/deny all spending for the day. At 1358, "Alert me when I'm at frequently shopped locations that I've chosen" is presented as an option that the user may select.

Figure 28:
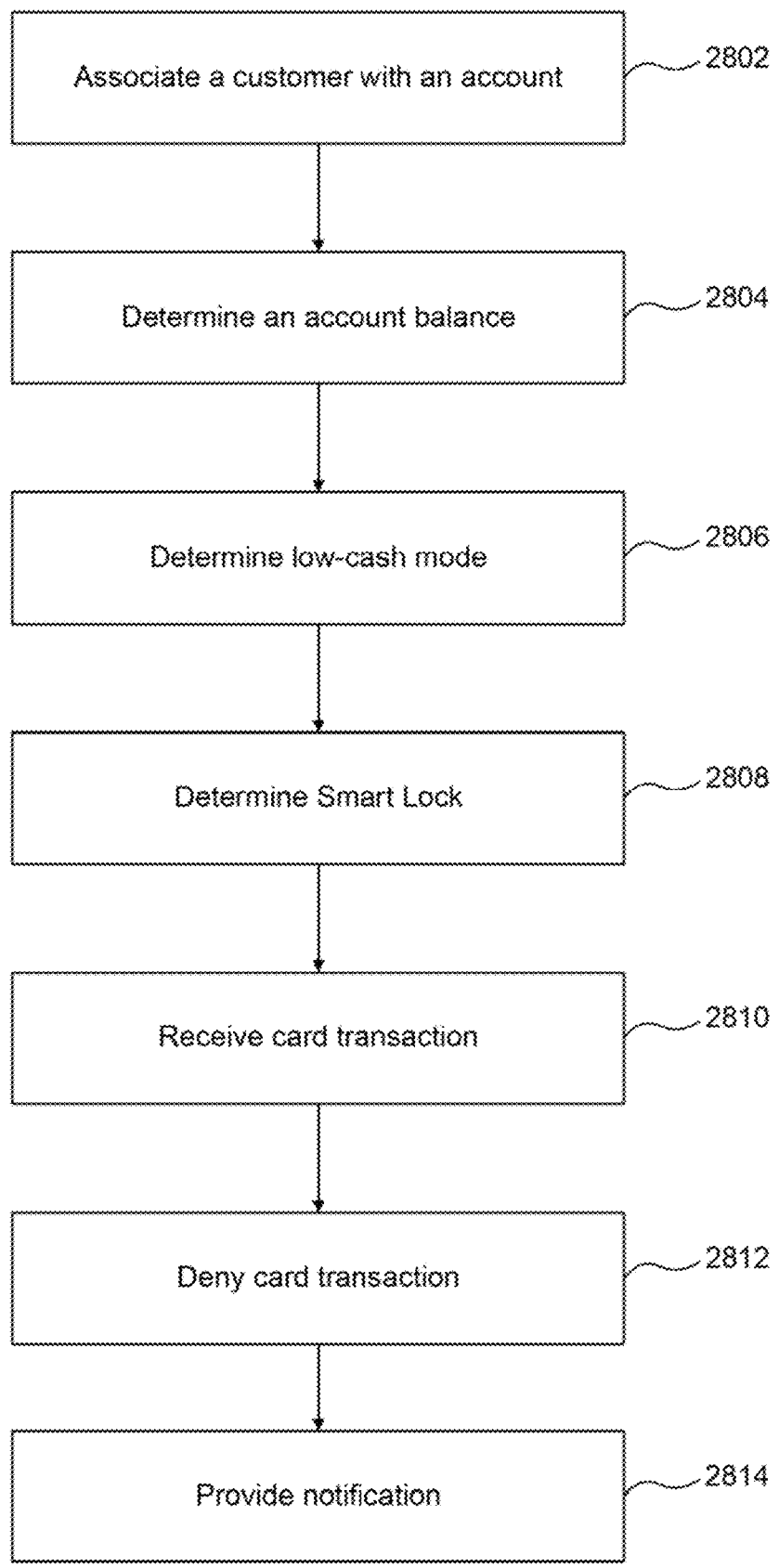
FIG. 28 illustrates an exemplary flow chart for managing a financial account, consistent with disclosed embodiments.

FIG. 28 illustrates an exemplary flow chart for managing a financial account. At step 2802, financial institution 106 may associate a customer with an account at financial institution 106. At step 2804, financial institution 106 may determine an account balance of the account.

At step 2806, financial institution 106 may determine, based on the account balance, whether the account is deemed to be in a low-cash mode state, as disclosed herein. At step 2808, financial institution 106 may determine whether smart lock is activated or designated to be activated when the account is deemed to be in the low-cash mode state. At step 2810, financial institution 106 may receive a request or initiation of a card transaction. At step 2812, if smart lock is activated, financial institution 106 may deny the card transaction. At step 2814, financial institution may provide a notification to the customer, as disclosed herein.

System for Overdraft Protection—Additional Accounts

Consistent with present embodiments, a financial institution may present a customer with the option to transfer funds from a different account into an account in low cash mode or into an account to prevent the account from entering low cash mode. Upon entry of an account into low cash mode or in order to prevent an account from entering low cash mode, the financial institution may automatically transfer funds from a predetermined account into an account in low cash mode. The predetermined account may be a different account owned by the same customer in the same financial institution, owned by a different customer in the same financial institution, owned by the same customer in a different financial institution, owned by a different customer in a different financial institution, or any other financial institution account previously linked with the customer's account currently in low cash mode (as discussed below). The predetermined account may also be a credit card or similar line of credit wherein the balance of the transaction is posted to the credit card or similar account automatically instead of resulting in a negative balance for the account in low cash mode.

In some embodiments, the financial institution may provide customers the option to draw on funds located in an alternative account for a transaction when an account is in low cash mode or when the transaction will result in the account entering low cash mode. In response to an alert provided by the financial institution, the financial institution may provide the customer with the ability to select an alternative account associated with the customer from which to draw funds for the transaction. The alternative account may be a checking account, savings account, line of credit, or any other account associated with the customer. Additionally or alternatively, the financial institution may provide the option for a customer to preselect an alternative account associated with the customer from which to automatically draw funds when the account is in low cash mode or when the transaction will result in the account entering low cash mode.

FIGS. 2A-2D provide various embodiments of the present disclosure that illustrate linking a first account 131 with a second account 132. To enable transfers from first account 131 to second account 132, an account owner may send a request to connect and/or link first account 131 with second account 132. The request may be sent from user device 108 that is registered to an account owner, where the request may be received by one or more of financial institution 106 and third-party service provider 110. The request may include a request from first account 131 to second account 132 via user device 108, seeking authorization from the owner of second account 132 to provide access to transaction data, account details, and/or other information pertaining to second account 132. In some embodiments, the owner (or joint owner) of the first account and the second account are the same person. The request may be transmitted to a user device 108 registered with second account 132 for the owner of second account 132 to review. The request may include details on information to be shared, authorization to do so, and legal waivers for sharing personal and account details with a third-party. In response, owner of second account 132 may authorize, via user device 108 and graphical user interface 118, the request to link first account 131 with second account 132. The authorization may be sent back to third-party service providers 110 and/or financial institution 106, which will link accounts and enable information sharing between owners of first account 131 and second 132.

The ability to monitor transactions in first account 131 from second account 132 enables the owner of second account 132 to verify certain deposits, whether transferred cash and/or funds are maintained for a period of time, and to monitor and track savings (and transferred funds) in first account 131. In the present embodiment, automatic electronic transfers may be made from second account 132 to first account 131 based on activity in first account 131. For example, when first account 131 enters a low cash mode, or when an account balance in first account 131 drops beneath a predetermined threshold value, electronic transfers may be made from second account 132 to first account 131 automatically. Alternatively, electronic transfers may be made manually based on user interaction via a graphical user interface. A predetermined threshold value may be a static value (e.g. $25) or alternatively, may represent, a dynamic percentage value (e.g. a percentage value of a total account balance) that may change over time. In the present embodiment, the owner of second account 132 may be provided information, including transaction details and periodic statements, related to activity in first account 131. The owner of second account 132 may then verify that rules are being applied correctly and that transferred funds to first account 131 are transferred and maintained according to preset rules governing the funds transfer. Particular rules with respect to transfers will be discussed below.

FIGS. 2A-2D show various implementations in which financial institution 106, third-party service provider 110, and user device 108 may be arranged in system 100. In FIG. 2A, first account 131 and second account 132 may be maintained within a common financial institution 106. First account 131 and second account 132 may have differing or overlapping account ownership. Third-party service provider 110 may be a third-party entity acting as an information clearing house or intermediary between financial institution 106 and user device 108, retrieving certain data from financial institution 106 and selectively providing data to account owners via one or more user devices 108. Consistent with this present embodiment, financial institution 106 may present options to customers with at least one account in low cash mode or when an account balance in first account 131 (or second account 132) drops beneath a predetermined threshold value.

Figure 16:
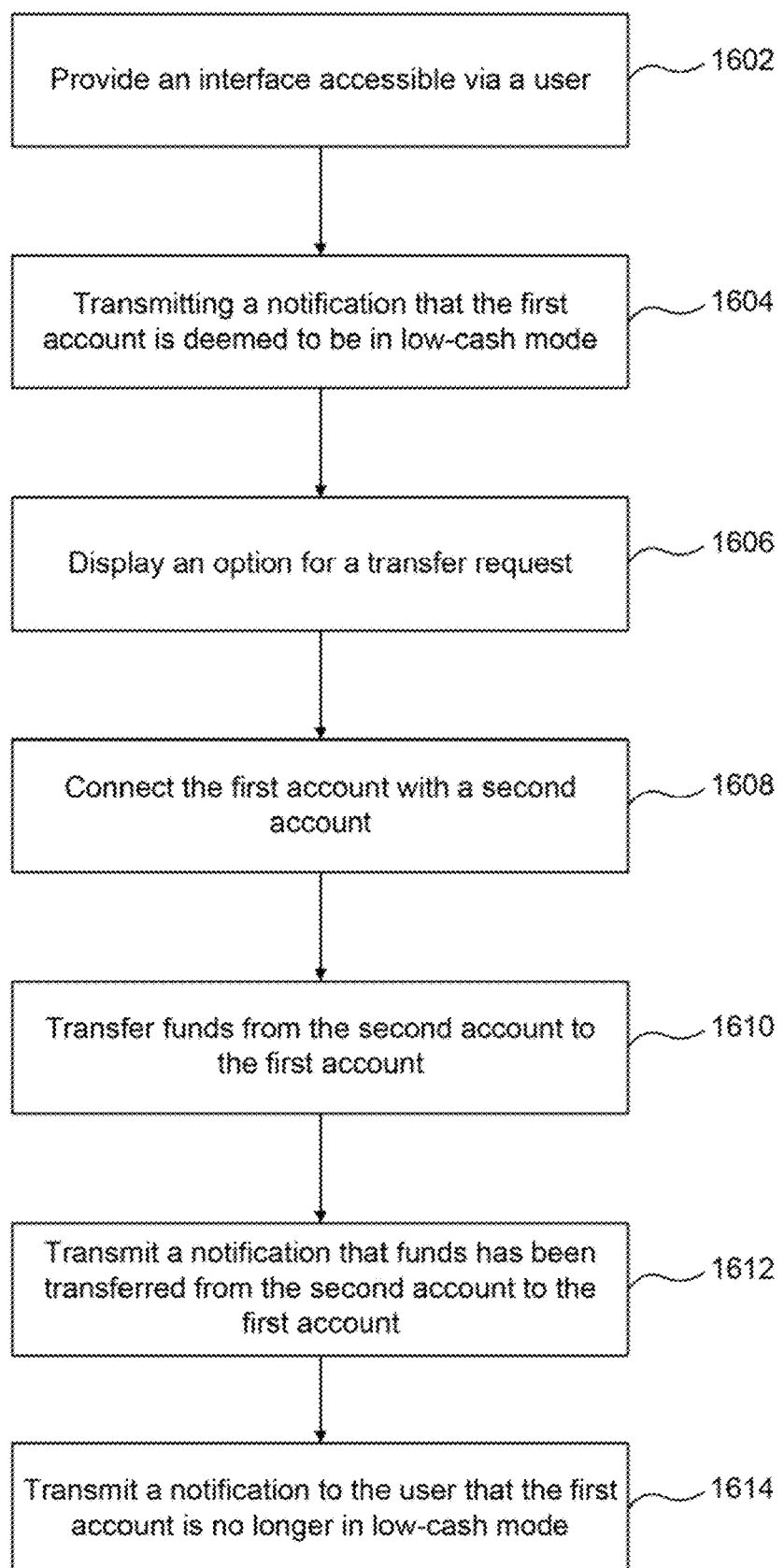
FIG. 16 illustrates an exemplary flow chart for managing a financial account in low-cash mode, consistent with disclosed embodiments.

FIG. 16 illustrates an exemplary flow chart for managing a financial account in low cash mode, consistent with disclosed embodiments. At step 1602, financial institution 106 may provide an interface to a user, such as via a user device 108 registered with a first account. User interface may be any of a dashboard or a window, and may include messages, icons, and or buttons for selection by a user.

At step 1604, financial institution 106 may transmit a notification to a user when the first account is deemed to be in a low-cash mode state based on a balance in the first account, as disclosed herein. In some embodiments, the first account is deemed to be in the low-cash mode state when the first account balance is less than or equal to a predetermined percentage of a total amount of funds stored in the first account.

At step 1606, financial institution 106 may display, when the first account balance is less than a threshold value, an option to transfer funds into the first account. Financial institution 106 may determine, before transferring funds, that the second account has sufficient funds to transfer the desired amount of funds to the first account without resulting in a negative account balance in the second account.

At step 1608, financial institution 106 may receive, via the interface, a selection of the option for the transfer request to connect the first account with a second account. Financial institution 106 may request authorization, prior to transferring the funds, to initiate the transfer of funds from the second account to the first account. Financial institution 106 may include a stored amount identifier, an indication of sufficient funds in the second account, and a request for authorization to transfer the funds from the second account to the first account based on the stored amount identifier. In some embodiments, financial institution 106 may determine that the second account has insufficient funds to transfer funds to the first account, and notify, via the interface, the user that funds has not been transferred from the second account to the first account.

At step 1610, financial institution 106 may transfer funds, based on the request, from the second account to the first account. Financial institution 106 may store a date identifier associated with the transferred cash, the date identifier indicating a deposit date for transfer into the first account. Financial institution 106 may provide, via an interface accessible via a user device registered with the second account, a fee indication specifying a fee associated with the transfer request from the second account. Financial institution 106 may provide via an interface accessible via a user device registered with the second account, a notification indicating the amount of funds transferred from the second account to the first account.

At step 1612, financial institution 106 may transmit a notification, via the interface, to the user that funds have been transferred from the second account to the first account. At step 1614, financial institution 106 may transmit an additional notification, via the interface, to the user that the first account is not longer deemed to be in the low-cash mode state based on the new first account balance. Other notifications not shown, and consistent with this disclosure, may be contemplated.

System for Disabling Features

Consistent with disclosed embodiments, the financial institution may provide the option for a customer to disable some or all functionality of an application on a mobile device. The financial institution may present this option when a customer indicates via phone call, web interface, or visit to a branch location that a mobile device associated with the customer has been lost, misplaced, or stolen.

Figure 10A:
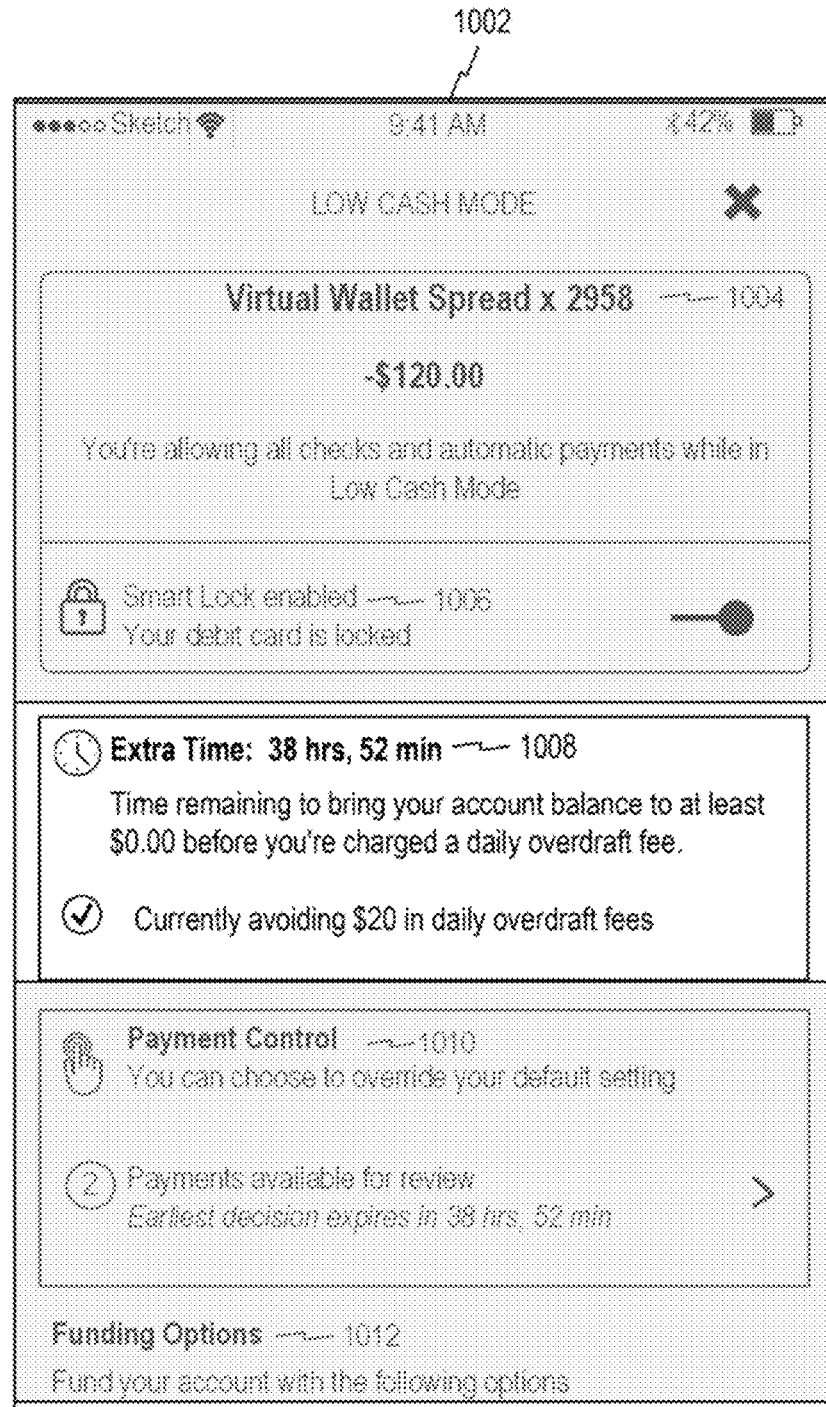
FIGS. 10A-10C illustrate exemplary graphical user interfaces having a first disabled dashboard embodiment, consistent with disclosed embodiments.
Figure 10C:
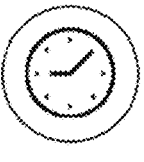
Figure 10B:
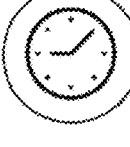

FIGS. 10A-10C illustrate exemplary graphical user interfaces having a first disabled dashboard embodiment, consistent with disclosed embodiments. FIG. 10A illustrates an exemplary graphical user interface having a dashboard embodiment for extra time, consistent with disclosed embodiments. At 1006, there is a display of time remaining to bring the account balance to at least $0.00 before the user is charged a negative balance fee. Other sections of the interface 1002 may be disabled including sections pertaining to Virtual Wallet spread 1004, smart lock 1008, payment control 1010, and funding options 1012. In some embodiments, financial institution may provide the option for a customer to disable some or all functionality of an application on a mobile device 108 (as shown in FIGS. 10A-10C). Financial institution may present this option when a customer indicates via phone call, web interface, or visit to a branch location that a mobile device associated with the customer has been lost, misplaced, or stolen or based on other permissions/restrictions (such as parental controls).

At FIGS. 10B-10C, all sections (also referred to as subsections) of interfaces 1020, 1034 may be disabled with the exception of an extra time status 1024 which illustrates extra time item due 1026. Message 1028 may state to a user "You'll need to deposit $90 by Dec. 3, 2019 to avoid potential overdraft fees. You can only purchase extra time once per transaction." A close button may be displayed at 1020 and to make a deposit at 1032. At 1036, if a user's balance is not above $75 by a date, a user may be charged an overdraft fee.

System for Displaying a Grace Period

FIG. 4C illustrates an exemplary graphical user interface 424 for providing an extra time remaining alert 426 to a customer, consistent with disclosed embodiments. Consistent with present embodiments, financial institution 106 may display, either by providing an alert 426 or via an interface 424 such as an application on a mobile device, a specified amount of time representing a grace period within which the customer must cure a negative balance without the financial institution assessing an associated negative balance fee. Such a feature may be desirable for customers who struggle to manage their money or meet deadlines regularly. In some embodiments the financial institution may display a second specified amount of time remaining representing a second grace period before the financial institution assesses an additional negative balance fee when the customer failed to cure a negative balance within a previous grace period.

As shown in FIG. 4C, an extra time of "38 Hrs., 52 Min." is displayed as a message 426 and allotted to the user as "time remaining to bring your account balance to at least $0.00 before you're charged a daily overdraft fee." Message 426 additionally informs the user that he is "currently avoiding $20 in daily overdraft fees." As in FIG. 4B, next button 420 and skip button 422 may also enable a user to take a next step in the process of reviewing grace period or extra time options and/or skip the process of reviewing grace period options entirely.

System for Automatic Reminder Notifications

Consistent with the present embodiment, the financial institution may provide a notification to a customer during a grace period as a reminder to cure the negative balance. The financial institution may provide the notifications to the customer at predetermined times. The times may be predetermined by the financial institution or set by the customer. The times may relate to the amount of time remaining to cure the negative balance or the amount of time the balance has been negative. The financial institution may provide notifications such as a push notification on a mobile device associated with the customer, an SMS notification, an email notification, a voice call, a notification through a social media account associated with the customer, or any other notification intended to reach the customer.

System for Personalized Grace Periods

Consistent with the present embodiment, financial institution may also personalize a grace period for individual customers based on characteristics associated with the customer. In one embodiment, the financial institution may determine the length of a grace period based on the overdraft amount. For example, the financial institution may determine a shorter grace period for a small overdraft amount while determining a longer grace period for a larger overdraft amount. In another example, the financial institution may determine a longer grace period for a small overdraft amount while determining a shorter grace period for a larger overdraft amount.

In another embodiment, financial institution may determine the length of a grace period based on historical account data. The financial institution may determine a longer grace period if the historical account data indicates that the account balance consistently remains above a predetermine threshold.

In another embodiment, financial institution may determine the length of a grace period based on a customer's status with the financial institution. Financial institution 106 may determine longer a grace period for a customer in good standing with the financial institution. Financial institution 106 may also consider factors such as debit card use, average balance, direct deposit amounts, timing of regularly occurring or historical transactions, or any other indicator of high activity/volume with the financial institution when the financial institution determines if a customer is in good standing.

In another embodiment, financial institution may determine the length of a grace period based on a customer's actions within the grace period. For example, financial institution 106, may determine to increase the length of a grace period if the customer takes action to cure a negative balance within a grace period but does not fully cure a negative balance.

In another embodiment, financial institution may determine a fixed amount of time to be used as a grace period before an account balance is negative. The fixed amount of time may be available for use by a customer throughout a time period such as a month. The fixed amount of time the financial institution determines as a grace period could then be instituted by the customer when an account has a negative balance. Financial institution would then refrain from assessing a negative balance fee while grace period remains. When the grace period runs out, if the customer has not cured the negative balance, then the financial institution may assess a negative balance fee. If the customer cures the negative balance before the grace period ends, then the financial institution may refrain from assessing a negative balance fee and the remaining grace period time may be remain available for use by the customer. The grace period may run during single instance of a negative account balance or across multiple instances of negative account balance by the customer within the time period.

In another embodiment, financial institution may determine a fixed amount of time to be used as a grace period based on historical data associated with a customer. Financial institution may determine the time to be used by the customer as a grace period, for example, based on a number of historical occurrences of a negative balance. In one embodiment, the fixed amount of time to be used as a grace period is shorter when the customer has historical occurrences of a negative balance. In another example, the fixed amount of time to be used as a grace period is longer when the customer has greater amounts of time between historical occurrences of a negative balance.

In another embodiment, financial institution may determine a fixed amount of time to be used as a grace period on a reoccurring basis for example, monthly or annually. Financial institution may further allow time allocated as a grace period to be saved, compiled, accumulated, or carried over so that the customer continues to build a reserve of time to be used as a grace period when an account balance is negative. However, financial institution may set a maximum amount of time to be saved, compiled, accumulated, or carried over as a grace period. The financial institution may also implement other measures to limit the accumulation of total grace period. For example, the time allotted as a grace period may expire if unused for length of time (such as one year).

In another embodiment, financial institution may allocate a fixed amount of time to be used as a grace period as an incentive. The incentive may be given by the financial institution periodically, such as on the anniversary of the customer's relationship with the financial institution or may be included as an incentive within a package when a customer purchases a product from financial institution. Additionally or alternatively, the time to be used as a grace period may be given as an incentive for referrals by a customer, rewarding the customer and a new customer invited by the customer with time to be used as a grace period when the new customer opens an account with financial institution based on an invitation from the customer. In another embodiment, financial institution may offer to sell more time to be used as a grace period to the customer. Financial institution may allow the customer to purchase additional grace period time.

FIGS. 10A-10C illustrate exemplary graphical user interfaces having a first disabled dashboard embodiment, consistent with disclosed embodiments. FIG. 10A illustrates an exemplary graphical user interface 1002 having a dashboard embodiment for extra time, consistent with disclosed embodiments. At 1006, there is a display of time remaining to bring the account balance to at least $0.00 before the user is charged a negative balance fee. Other sections of the interface 1002 may be disabled including sections pertaining to Virtual Wallet spread 1004, smart lock 1008, payment control 1010, and funding options 1012. In some embodiments, financial institution may provide the option for a customer to disable some or all functionality of an application on a mobile device 108 (as shown in FIGS. 10A-10C). Financial institution may present this option when a customer indicates via phone call, web interface, or visit to a branch location that a mobile device associated with the customer has been lost, misplaced, or stolen or based on other permissions/restrictions (such as parental controls).

Figure 12:
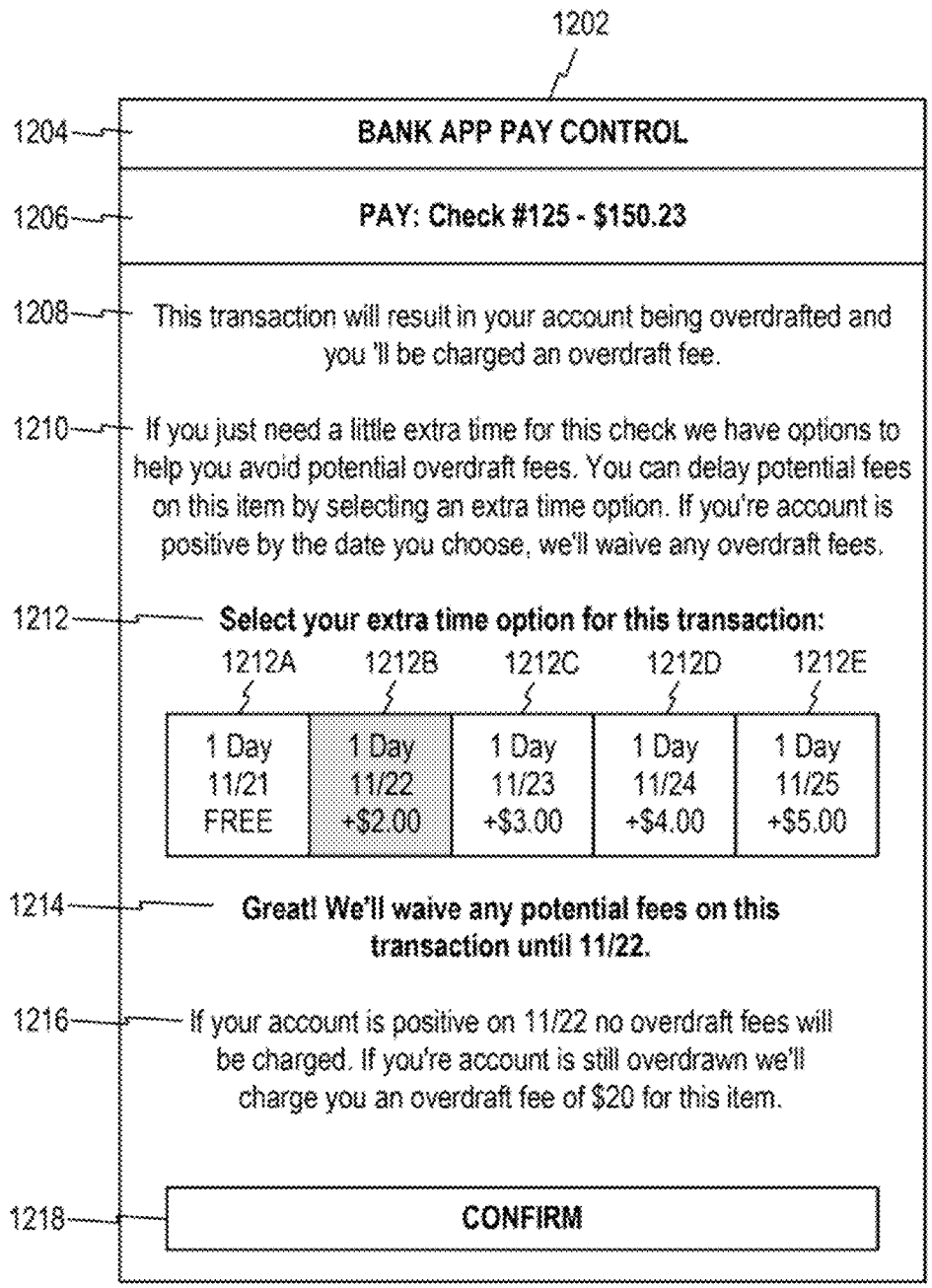
FIG. 12 illustrates an exemplary graphical user interface for a bank application enabling payment control, consistent with disclosed embodiments.

FIG. 12 illustrates an exemplary graphical user interface for an application enabling payment control, consistent with disclosed embodiments. At graphical user interface 1202, a bank application for payment control is shown having one or more subsections. At 1204, a title of the application is displayed to the user. At 1206, a title of a transaction in question, in particular, check #125, may be displayed to a user with the associated amount. At 1208, a message may be displayed to a user as part of the application indicating that this transaction will result in the account going negative and the user being charged a negative balance fee. At 1210, another message may explain the options available to a user. For example, at 1212, an option may be presented to a user to select the extra time option for this transaction." At 1212A, 1 Day may be selected as an extension with no associated cost. At 12B, an extension fee may be $2.00. At 1212C, an extension fee may be 3 dollars. At 1212D, an extension fee may be 4 dollars. At 1212E, an extension fee may be 5 dollars. At 1214, a message may be provided to a user saying "Great we'll waive any potential fees on this transaction until November 22" if an extension to November 22 is selected by a user. At 1216, if a user's account balance is positive on November 22, no negative balance fee will be charged to the user. Conversely, if a user's account balance is still negative, a banking application may charge the user a negative balance fee of $20. At 1218, a user may click confirm to confirm an extension selection made.

Figure 29:
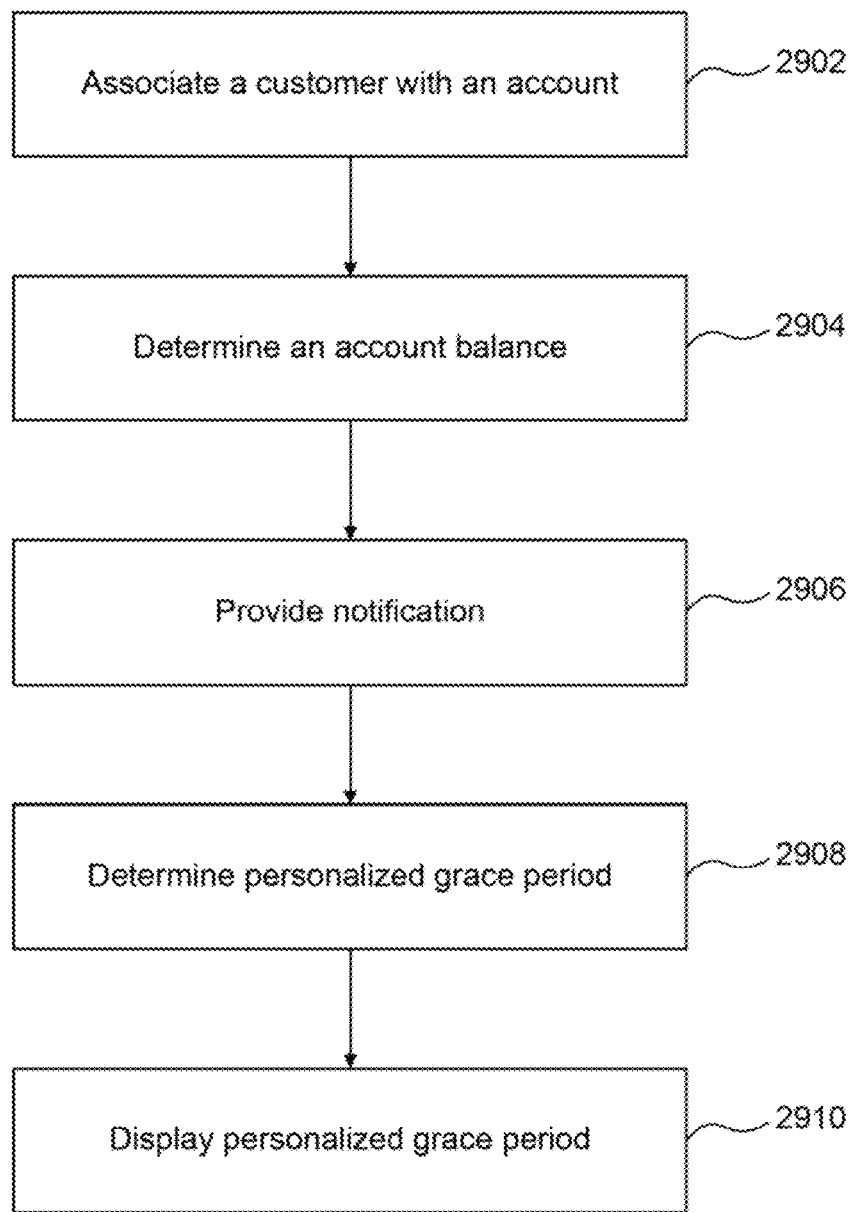
FIG. 29 illustrates an exemplary flow chart for generating a personalized grace period, consistent with disclosed embodiments.

FIG. 29 illustrates an exemplary flow chart for determining a personalized grace period. At step 2902, financial institution 106 may associate a customer with an account. At step 2904, financial institution 106 may determine an account balance of the account. At step 2906, financial institution 106 may provide a notification to the customer, as disclosed herein. At step 2908, financial institution may determine a personalized grace period, as disclosed herein. At step 2910, financial institution may display the personalized grace period to the customer.

System for Customized Reminder Notifications

In some embodiments, financial institution may present an option to the customer to allow the customer to dynamically set reminders within an interface related to the financial institution so that the financial institution provides notifications to the customer reminding the customer to cure a negative account balance. Financial institution may suggest time or increments for the reminder notifications. Financial institution may also permit customers to select reminders that are regularly occurring or persistent until the negative account balance is cured. Financial institution may further permit customers to select the timing, time increments, consistency, or manner of reminder notifications.

System for Integration with PNC Virtual Wallet Calendar

In other embodiments, financial institution may provide the customer with an option to view past, present, and future transactions on a calendar interface, for example the PNC Virtual Wallet Calendar. When an account enters low cash mode, the financial institution may provide customers with the option to allow the financial institution to automatically reschedule payments in order to prevent or cure a negative balance. The financial institution may automatically reschedule transactions by applying machine learning or artificial intelligence algorithms to the calendared transactions.

System for Time Period-Based Negative Balance Fees

In some embodiments, the financial institution may provide a negative balance fee as a substitute for a transactional fee when a customer account has insufficient funds. For example, the financial institution may provide the customer with the option of electing to pay a flat fee for every predetermined period of time in which the customer's account has a negative balance. In some embodiments the period of time is not predetermined or may be dynamically adjusted to suit the customer based on the customer's data or the customer account's historical data.

System for Recommendations Based on Scheduled Payments

Consistent with disclosed embodiments, the financial institution may provide a notification to a customer that a pending, scheduled, or anticipated purchase or transaction will result in a negative account balance before the purchase or transaction is made. For example, a financial institution may notify a customer that a transaction associated with an item placed in a virtual shopping cart while visiting an online merchant would result in a negative balance. In another embodiment the financial institution may use historical data associated with a customer to predict and notify a customer that an anticipated transaction will result in a negative balance. The financial institution may further anticipate transactions based on the time of the day, month, or year; a geographic location associated with a merchant; a geographic location associated with the customer; or other indicators associated with the customer and spending an amount greater than a current balance.

System for Maintaining a Minimum Threshold Value

In some embodiments, the financial institution may provide the customer an option of setting a low balance threshold. The low balance threshold represents a maximum negative balance after the customer account enters low cash mode. In electing to set a low balance threshold, the customer can prevent negative balances from decreasing beyond a negative amount set as the negative balance threshold. This provides the customer with peace of mind that a negative balance will not exceed the customer's ability repay and also has the benefit of assisting the financial institution in assessing a financial risk profile associated with the customer. The low balance threshold may include providing the customer with the ability to selectively choose one or more scheduled payments for processing. Once the customer indicates that selection of scheduled payments for processing is complete, the financial institution may render remaining scheduled payments unactionable. Unactionable payments cannot be cancelled or modified by a customer but may be cancelled or modified by the financial institution.

The low balance threshold may be dynamic and automatically set as a function of various factors, such as the customer's age, income, credit score, financial history, or other factors relevant to the customer's likelihood of repaying a negative balance. In some embodiments, the low balance threshold is set by an agreement between the customer and the financial institution. The low balance threshold may also be set by the financial institution, allowing a customer to choose among scheduled payments for processing but preventing the customer from changing the low balance threshold amount.

In some embodiments, the financial institution may provide the customer an option of setting a low balance threshold. The low balance threshold represents a maximum negative balance after the customer account enters low cash mode. In electing to set a low balance threshold, the customer can prevent negative balances from decreasing beyond a negative amount set as the negative balance threshold. This provides the customer with peace of mind that a negative balance will not exceed the customer's ability repay and also has the benefit of assisting the financial institution in assessing a financial risk profile associated with the customer. The low balance threshold may include providing the customer with the ability to selectively choose one or more scheduled payments for processing. Once the customer indicates that selection of scheduled payments for processing is complete, the financial institution may render remaining scheduled payments unactionable. Unactionable payments cannot be cancelled or modified by a customer but may be cancelled or modified by the financial institution.

The low balance threshold may be dynamic and automatically set as a function of various factors, such as the customer's age, income, credit score, financial history, or other factors relevant to the customer's likelihood of repaying a negative balance. In some embodiments, the low balance threshold is set by an agreement between the customer and the financial institution. The low balance threshold may also be set by the financial institution, allowing a customer to choose among scheduled payments for processing but preventing the customer from changing the low balance threshold amount.

FIGS. 11A-11D illustrates exemplary graphical user interfaces for low cash mode customization and configurations, consistent with disclosed embodiments. FIG. 5A illustrates an exemplary graphical user interface for setting a low cash mode threshold, consistent with disclosed embodiments. As shown in FIG. 5A, a user may configure or customize a low cash mode by setting a low cash threshold. When a user's account is below their threshold, the user may be able to control individual checks and automatic checks are paid or rejected. As shown in FIG. 5A, a user may enable their low cash mode controls 506 when their account balance falls beneath $10, $25, $50, $100, or a custom amount. Back 508 and Continue 510 buttons may be provided for users to navigate between screens to allow for further configuration or customization of low cash mode preferences or properties. Additionally or alternatively, the user may select to automatically enable low cash mode based on a determination by the financial institution (not show). The financial institution would then determine when the account enters low cash mode as discussed herein.

FIG. 5D illustrates an exemplary graphical user interface for setting a plurality of threshold values for paying or rejecting payments, consistent with disclosed embodiments. As shown in FIG. 5D, a user may be able to activate low cash mode controls when their account balance is at or below a certain value (e.g. $50). The user may be able to select from a plurality of different threshold values or enter a custom threshold value. The user may be able to choose if the account will default to pay or reject payments when low cash mode activates and may also choose if the account will default to pay or reject payments when low cash mode activates. The user may select a monetary value for at which their account will default to pay or reject payments when low cash mode activates. A confirm button 536 may be provided for a user to accept the and save the selected low cash mode threshold settings.

Figure 30:
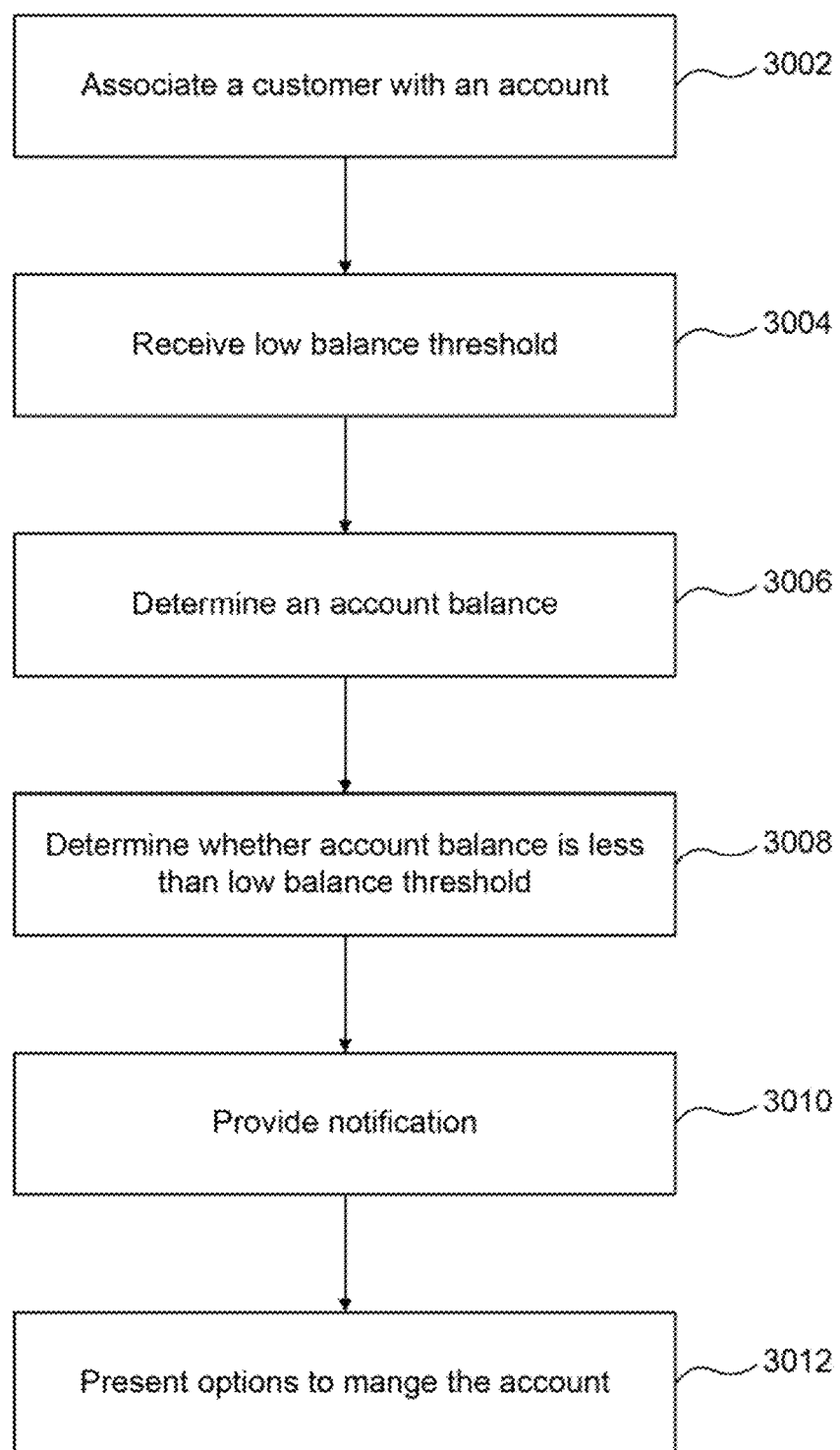
FIG. 30 illustrates an exemplary flow chart for managing a financial account, consistent with disclosed embodiments.

FIG. 30 illustrates an exemplary flow chart for managing a financial account. At step 3002, financial institution 106 may associate a customer with an account at financial institution 106. At step 3004, financial institution 106 may receive a low balance threshold as determined by financial institution 106 or from a customer. At step 3006, financial institution 106 may determine an account balance of the account.

At step 3008, financial institution 106 may determine, based on the account balance and low balance threshold, whether the account is less than the low balance threshold. At step 3010, financial institution 106 may provide a notification to the customer, as disclosed herein. At step 3012, financial institution 106 may present options to manage the account while the account balance is less than the low balance threshold.

System for Predictive Cash Flow

Consistent with disclosed embodiments, the financial institution may apply artificial intelligence or machine learning algorithms to historical data stored in a data platform and associated with a customer or account in order to learn and predict transactions and spending tendencies. The historical data may additionally include data available through the customer's social media account(s). Financial institution 106 may further provide notifications or recommendations based on the predicted transactions or spending tendencies.

In some embodiments, the financial institution may provide the customer with a predictive cash flow feature. The predictive cash flow feature may use one or more of the customer's financial history, the customer account history, and aggregated data from other customers and customer accounts to create one or more predictions. The one or more predictions may include time periods or amounts related to a customer's financial status, and may include time periods when a customer is more likely to enter low cash mode. The predictive cash flow feature may, by way of illustrative example, analyze a customer's financial history and determine patterns corresponding to when the customer's account receives deposits or when the customer makes expenditures. Through this analysis, the predictive cash flow feature may determine probabilities for a customer account entering low cash mode and, when a probability is within certain range, notify a customer of a prediction. The predictive cash flow feature may similarly provide the customer with a prediction corresponding to a high likelihood of a low customer account balance or negative balance.

In some embodiments, the predictive cash flow feature incorporates machine learning to create more accurate predictions. For example, the financial institution may apply machine learning or artificial intelligence algorithms to evaluate historical predictions and their accuracy in comparison to actual customer account status. The predictive cash flow feature may then adjust data inputs used for predictions that were historically less accurate and leave unmodified data inputs used for predictions that were historically accurate. In addition, the predictive cash flow feature may create predictions for the purpose of evaluating and enhancing future predictions without sending the predictions to a customer. This enables the predictive cash flow feature to continually improve the accuracy of predictions while providing a customer with the most accurate predictions.

In some embodiments the predictive cash flow feature incorporates data received and stored by the financial institution as well as data received from third parties. Data received from third parties may enable the financial institution to create more holistic and accurate predictions by incorporating more data into its analysis. Data included in the predictive cash flow feature may include non-financial data, such as calendar data, weather data, or other types of data associated with or correlating to financial behavior.

In some embodiments, the predictive cash flow feature allows a customer the ability to manually add payments to be analyzing or given greater weight in generating predicative cash flows.

Figures 7B, 7C:
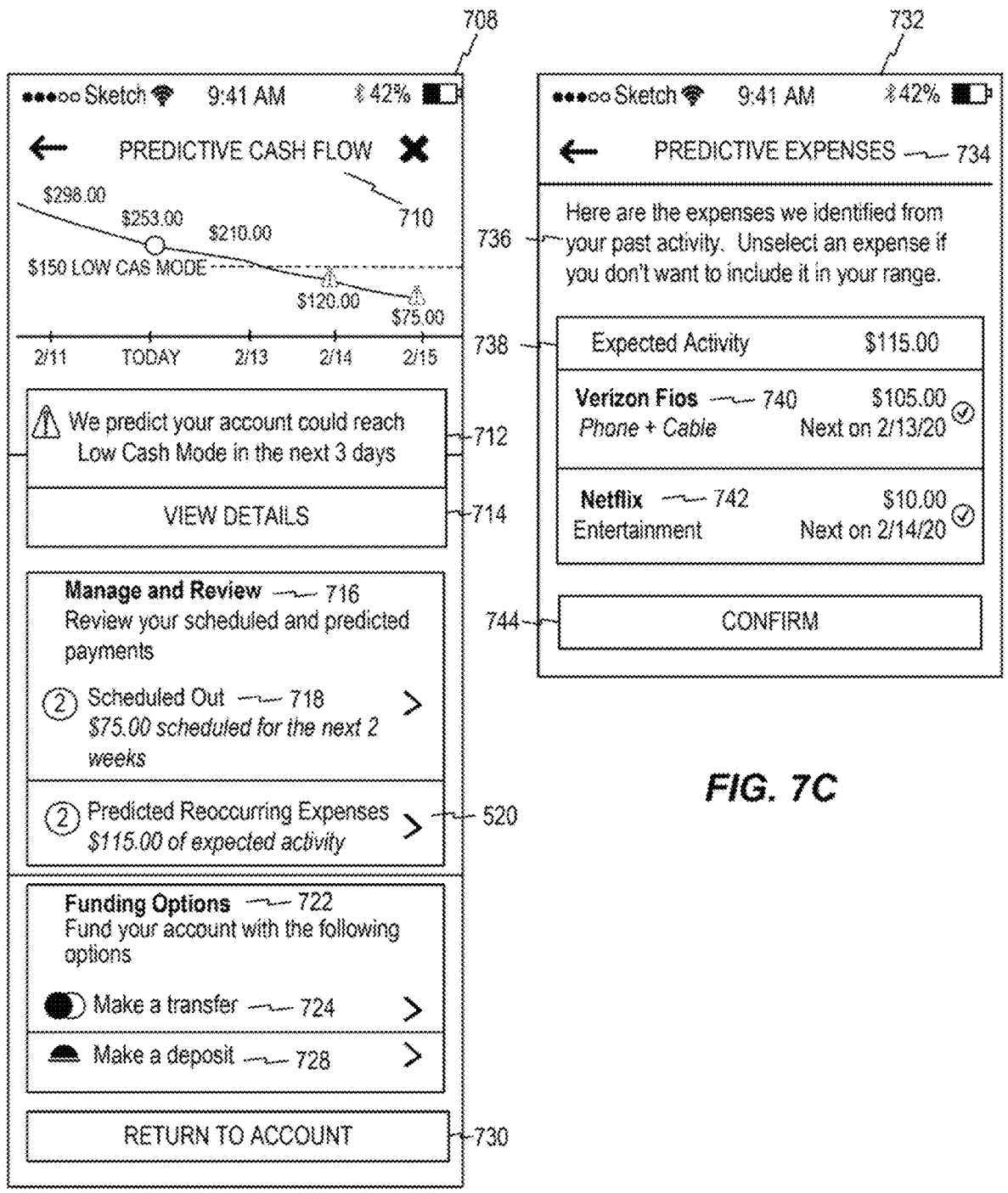

FIGS. 7A-7C illustrate exemplary graphical user interfaces for predicting a low cash mode and related expenses, consistent with disclosed embodiments. FIG. 7A illustrates an exemplary graphical user interface 702 for notifying a customer that an account associated with the customer may enter low cash mode in a future time period, consistent with disclosed embodiments. As shown in FIG. 7A, an intelligent alert 706 indicates "Low Cash Mode ahead" and "We predict your account x2958 could enter low cash mode in the next 3 days. Review your options." FIG. 7B illustrates an exemplary graphical user interface 708 for displaying a predicted cash flow forecast 710, consistent with disclosed embodiments. As shown in FIG. 7B, a predictive cash flow forecast 710 may display a line graph indicating a prediction of cash flow over a period of time. A message 712 may also be displayed with a details section 714 for the user's reference to explain the predicted cash flow. A user may be able to manage and review scheduled and predicted payments 716 and may also list scheduled out amounts 718 and predicted reoccurring expenses 720. Additionally, funding options 722 may allow for funding a user's account with the following options. The options may include making a transfer 724 and making a deposit 726. The user may then confirm and return to the account 730.

FIG. 7C illustrates an exemplary graphical user interface 732 for predicting expenses, consistent with disclosed embodiments. As shown in FIG. 7C, predictive expenses may be displayed to the user in graphical user interface 732. The graphical user interface 732 may include expenses identified from past user activity. The user may be able to unselect an expense if the user does not want to use the expected transaction to predict a future balance. As shown, expected activity 738 may list expected expenses 740, 742 which are shown as "Verizon Fios" and "Netflix" expenses. The user may then confirm and return to the account 744.

Figure 31:
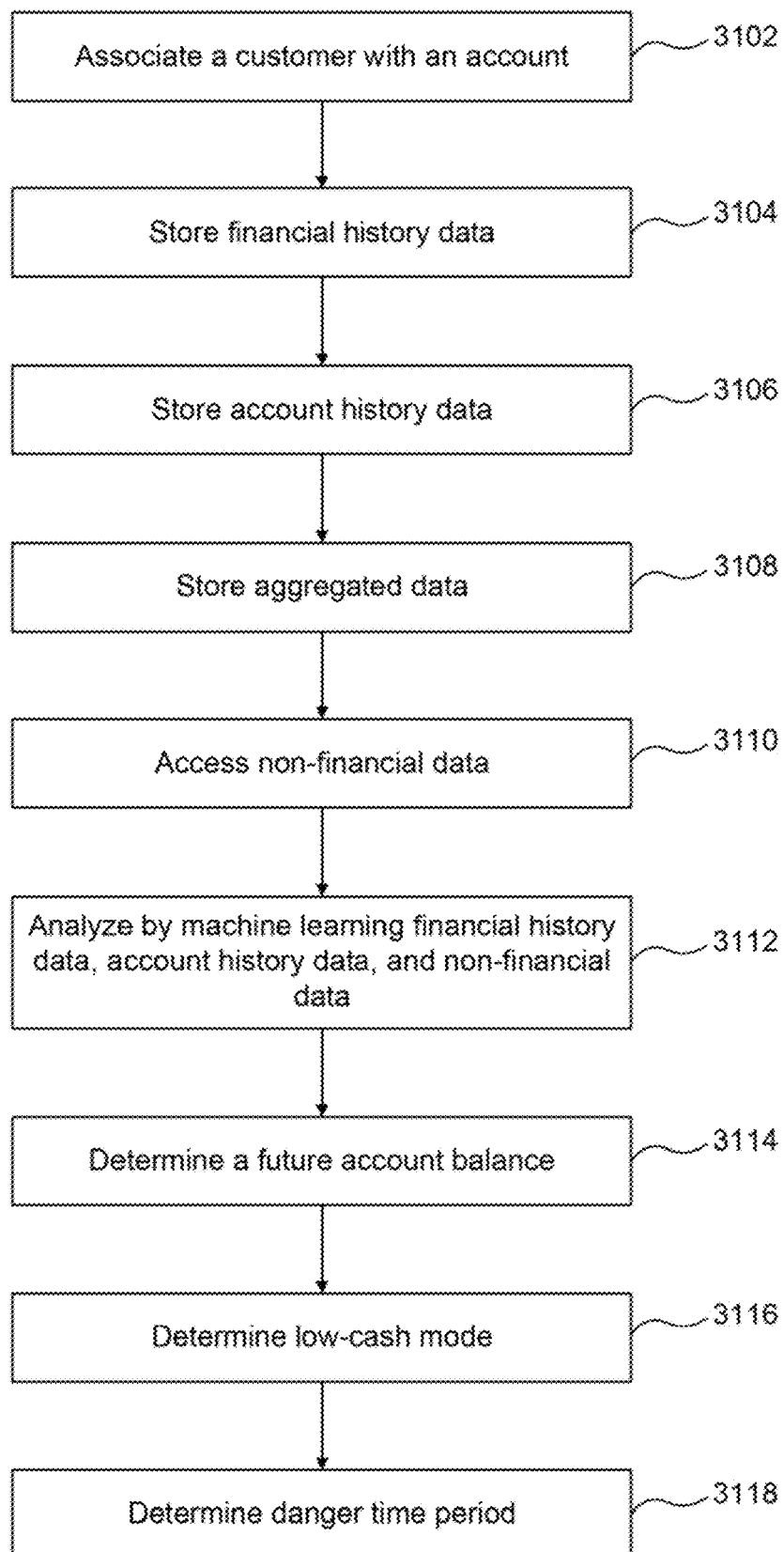
FIG. 31 illustrates an exemplary flow chart for predicting cash flow, consistent with disclosed embodiments.

FIG. 31 illustrates an exemplary process for predicting cash flow. At step 3102, financial institution 106 may associate a customer with an account at financial institution 106. At step 3104, financial institution 106 may store financial history data associated with the customer and/or the account. At step 3106, financial institution 106 may store account history data associated with the customer and/or the account. At step 3108, financial institution 106 may store aggregated data. At step 3110, financial institution 106 may access non-financial data.

At step 3112, financial institution 106 may analyze by machine learning the financial history data, the account history data, the non-financial data and the aggregated data. At step 3114, financial institution 106 may determine a future account balance of the account based on the analysis performed in step 3114. At step 3116, financial institution 106 may determine, based on the future account balance, whether the first account will enter a low-cash mode state, as disclosed herein. At step 3118, financial institution may determine a danger time period for the customer or the account, as disclosed herein.

System for Communication Through Social Media

In some embodiments, the financial institution may urge or permit customers to link financial accounts with social media accounts. The link between accounts may provide financial institution with access to information gathered by the social media account and associated applications. The link may also provide another channel for financial institution to send alerts or messages to a customer. For example, a customer could receive a message via a social network instant or direct message that the account has entered low cash mode.

Additionally or alternatively, the financial institution may provide a customer with the option to associate a social media account associated with the customer with a financial account. The financial institution may then interact with the customer using the notifications and infrastructure provided by the social media platform. For example, the financial institution may provide a notification that an account associated with a user has entered low cash mode using Facebook Messenger or Twitter Direct Message. The financial institution may also access or analyze data associated with a customer's social media profile, presence, usage, activity, connections, or other social media data.

Figure 22:
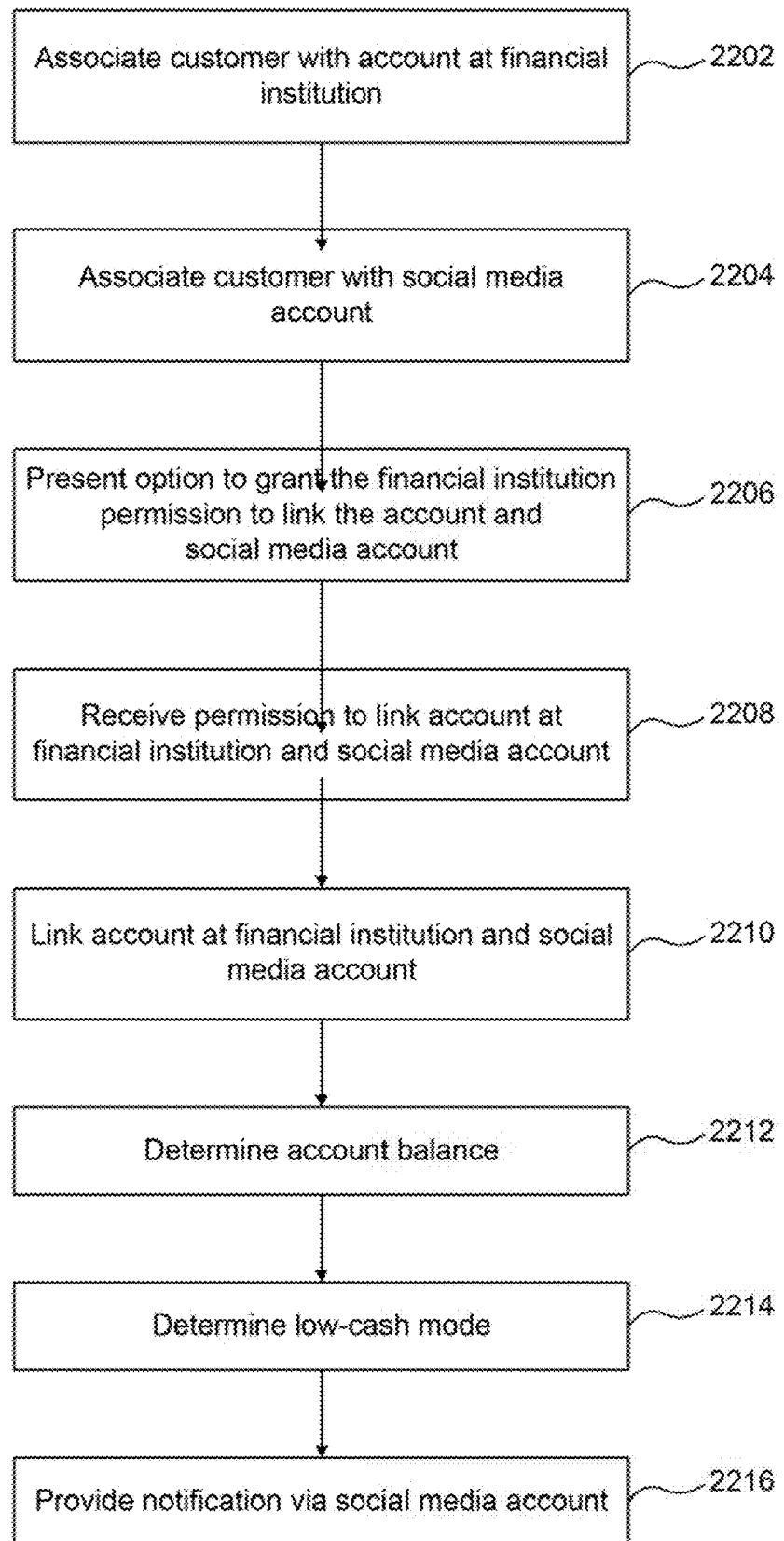
FIG. 22 illustrates an exemplary flow chart for providing notification to a customer, consistent with disclosed embodiments.

FIG. 22 illustrates an exemplary flow chart for providing notification to a customer. At step 2202, financial institution 106 may associate a customer with an account at the financial institution. At step 2204, financial institution 106 may associate the customer with a social media account. At step 2206, financial institution 106 may present an option via the customer interface with financial institution 106 or via the social media platform for the customer to grant financial institution 106 permission to link the account associated with the customer at financial institution 106 with the social media account associated with the customer.

At step 2208, financial institution 106 may receive permission to link the account at financial institution 106 associated with the customer with the social media account associated with the customer. At step 2210, financial institution may link the account at financial institution 106 associated with the customer with the social media account associated with the customer.

At step 2212, financial institution 106 may determine an account balance of the account. At step 2214, financial institution 106 may determine, based on the account balance, whether the account is deemed to be in a low-cash mode state, as disclosed herein. At step 2216, if the account is deemed to be in a low-cash mode state, financial institution 106 may provide a notification to the customer that the account is deemed to be in a low-cash mode state via the social media account associated with the customer.

System for Geolocation Based Alerts

In some embodiments, financial institution may offer customers the option to designate payments based on a user's location (as discussed herein). A customer may, for example, use a mobile device that is associated with a customer account. The mobile device may have a GPS or be otherwise configured with location services to determine the location of the mobile device. When the mobile device determines that the location of the mobile device is within a predetermined distance from a merchant while the customer's account is in low cash mode, the mobile device may provide a notification to the customer and provide the customer with the option of designating the merchant for payment processing during low cash mode.

In some embodiments, financial institution may offer a geolocation alert service. The geolocation alert service includes a customer carrying a mobile device with a global positioning system or other location services. The mobile device may determine a location of the mobile device and communicate the location to the financial institution or to a mobile application associated with the financial institution. The financial institution, either through its own servers or through the mobile application, may determine whether the location is associated with a merchant and whether the customer account associated with the mobile device is low cash mode. If the financial institution determines that the customer account is in low cash mode and the location is associated with a merchant, the financial institution may notify the customer that the customer account is in low cash mode. The financial institution may provide such notification by, for example, sending a text message to a phone number associated with the customer account, sending an email to an email address associated with the customer account, sending a push notification to the mobile device via the mobile application, and/or any other notification disclosed herein.

In some embodiments, the geolocation alert service may similarly notify the customer when the customer account is within a certain range of the threshold for entering low cash mode. For example, the financial institution may notify the customer that the customer's account is within a specified dollar amount of entering low cash mode when the customer carries their mobile device to a merchant.

In some embodiments, the financial institution may notify more than one customer associated with a customer account when the customer account is in low cash mode and the location is associated with a merchant. For example, when one of multiple customers associated with an account enters a location associated with a merchant, the financial institution may notify all associated customers that the customer account is in low cash mode and that one of the customers is entering a merchant. This is particularly useful in joint accounts where one joint account holder would otherwise be able to spend while the customer account is in low cash mode without the knowledge of the other joint account holder. In some embodiments, the financial institution may allow customers to set parental controls or designate one or more controlling agents so that notifications are sent to one or more parents or controlling agents.

In some embodiments, the geolocation alert service may be enabled based on predicted danger conditions. One or more customers, parents, or controlling agents may, for example, may determine a danger condition under which they will be notified through the geolocation alert service. The danger condition may be any condition that is predicted to result in a high financial risk or a high risk of a customer account entering low cash mode. For example, the danger condition may be the mobile device entering a location associated with a merchant known for selling high-value products. Under such a danger condition, the geolocation alert service would assist customers with taking informed and financially responsible actions by notifying them when they could end up spending a high amount of money and thereby cause a customer account to enter low cash mode.

Other examples of danger conditions include merchants determined to be disreputable, merchants with high interest rates, merchants at which the customer account has previously entered low cash mode, merchants at which other customer accounts have entered low cash mode, a time or time period associated with impulsive buying or other customer accounts entering low cash mode, and a time or time period associated with a customer's regular income receipt.

In some embodiments, the financial institution may request or require the consent of the customer to enable the geolocation alert service. The financial institution may, by way of example, request permission from a customer to enable the geolocation alert service when a customer installs the mobile application on a mobile device, or the financial institution may require the consent of the customer to enable the geolocation alert service and accept various terms upon installation of the mobile application.

Figure 15B:
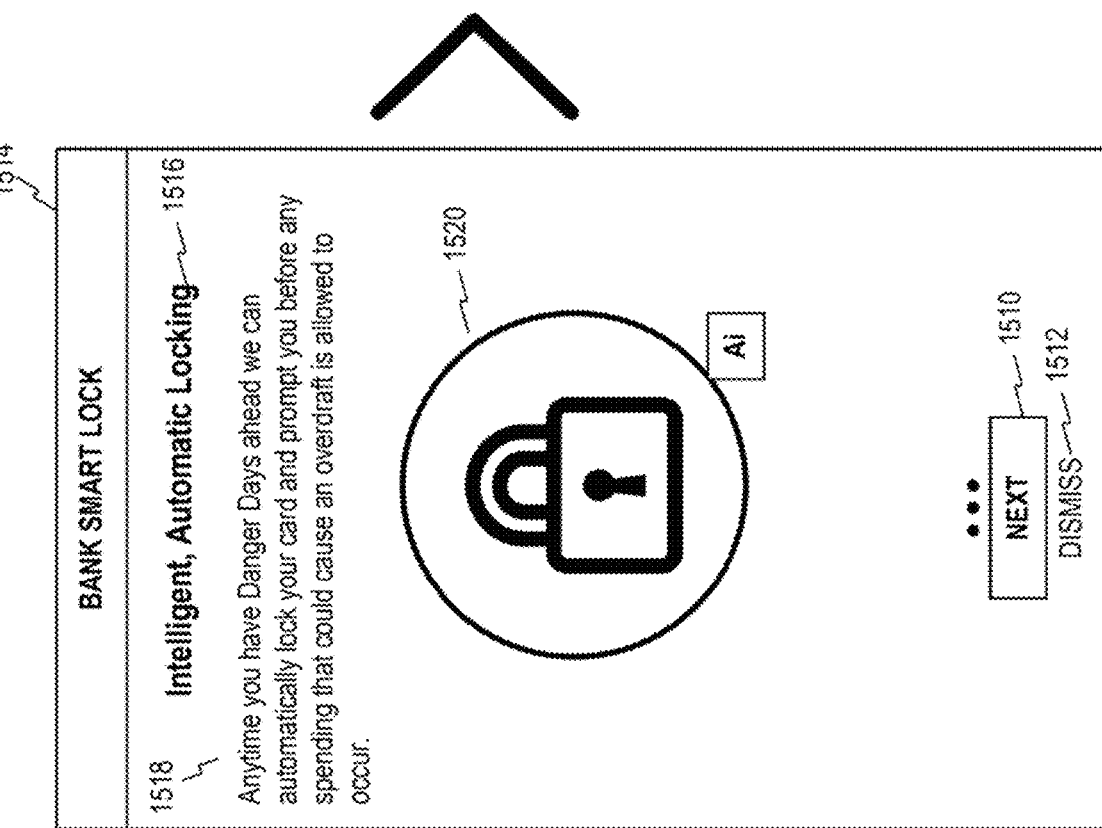
FIGS. 15A-15B illustrates exemplary graphical user interfaces for spending control and automatic locking, consistent with disclosed embodiments.
Figure 15A:
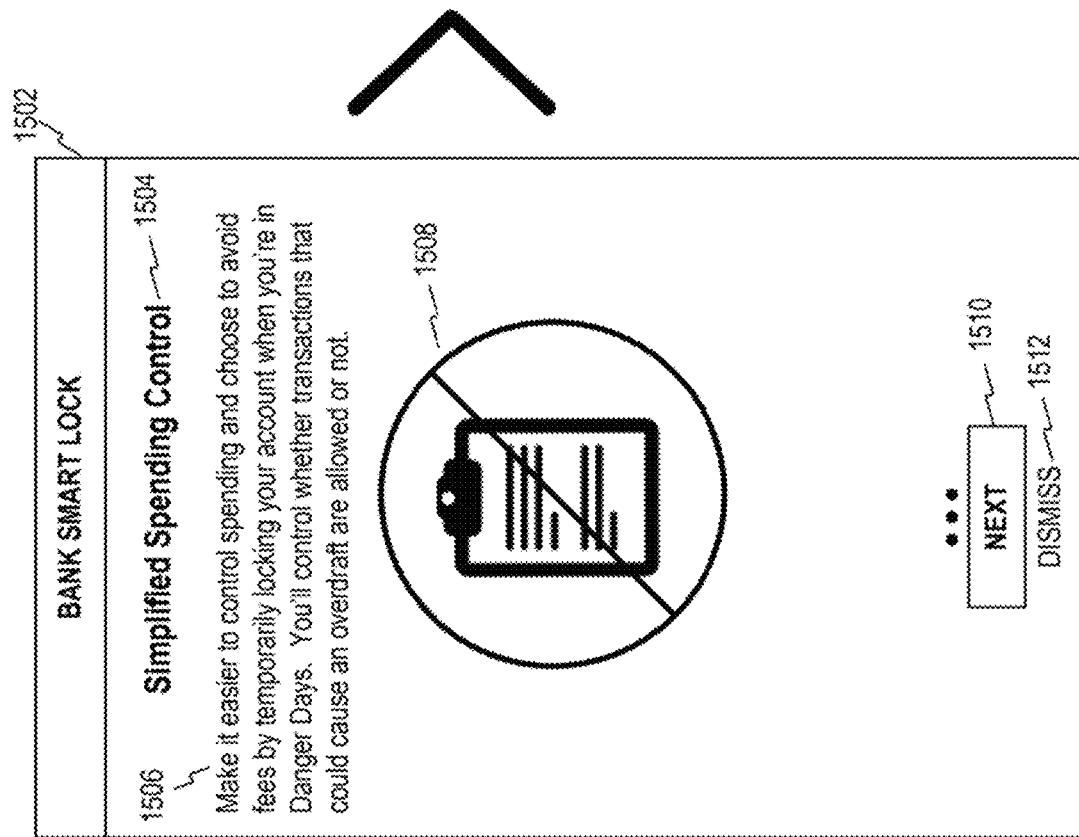

FIGS. 15A-15B illustrates exemplary graphical user interfaces for spending control and automatic locking, consistent with disclosed embodiments. User interface 1502 illustrates a bank smart lock user interface with simplified spending control 1504. At 1506, a message is presented explaining the available features of simplified spending control to a user. At 1510, there is a button to display the next screen or message. At 1512, there is a button to dismiss the message and return to a previous graphical user interface 1512. At user interface 1514 illustrated in FIG. 15B, there is intelligent, automatic locking 1516. At 1518, a message is presented explaining the available features of intelligent, automatic locking to a user. At 1520, an icon indicating the intelligent, automatic locking 1516.

FIGS. 14A-14B illustrates exemplary graphical user interfaces for a bank application enabling a smart geolocation feature, consistent with disclosed embodiments. At FIG. 14A, manage locations 1420 user interface, frequent locations 1422 may list locations frequently visited, such as a Giant Eagle in Cranberry, PA. At 1424, recommend locations may be present, for example, at grocery stores. At 1426, the user may manually add a location. At 1428, a map may be present to show locations of grocery stores. At 1430, the user may add a selected location. As shown in FIG. 14B, user interface 1432 may notify the user at 1434 that the user is near a frequent location and that the account is currently smart locked to prevent transactions from being processed and that the user must sign in to make changes.

Figure 15D:
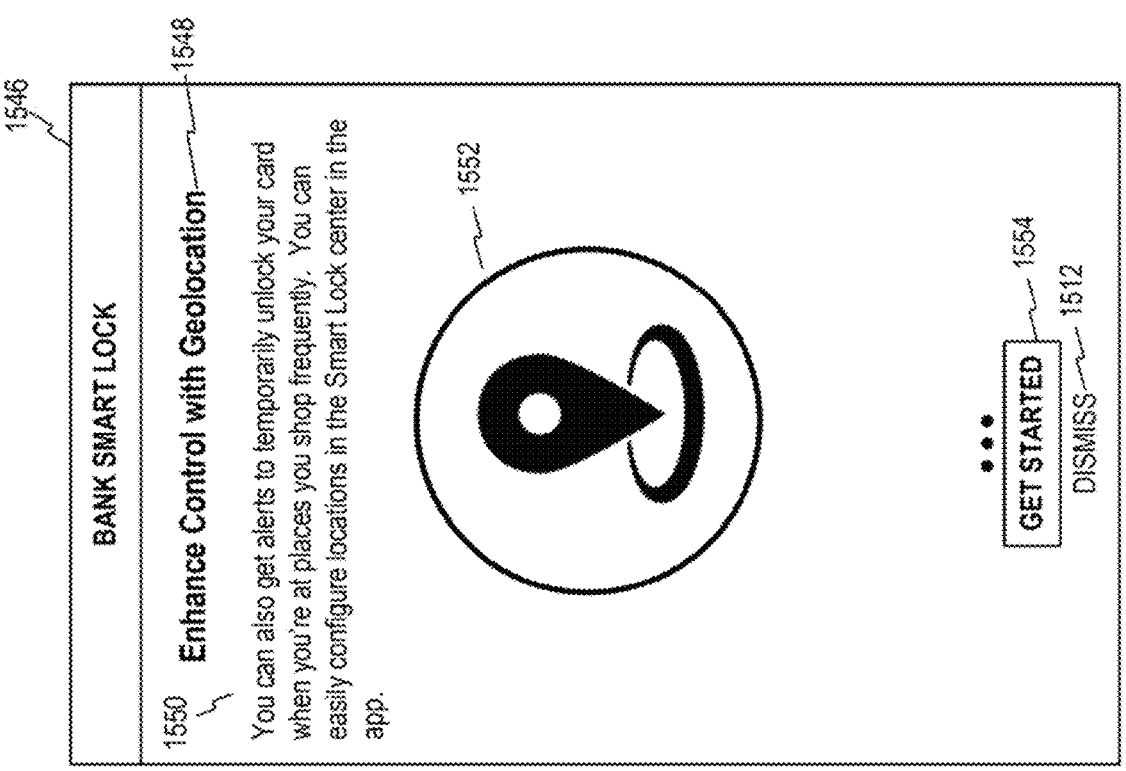
FIGS. 15C-15D illustrates exemplary graphical user interfaces for danger day feature setting and geolocation control features, consistent with disclosed embodiments.
Figure 15C:
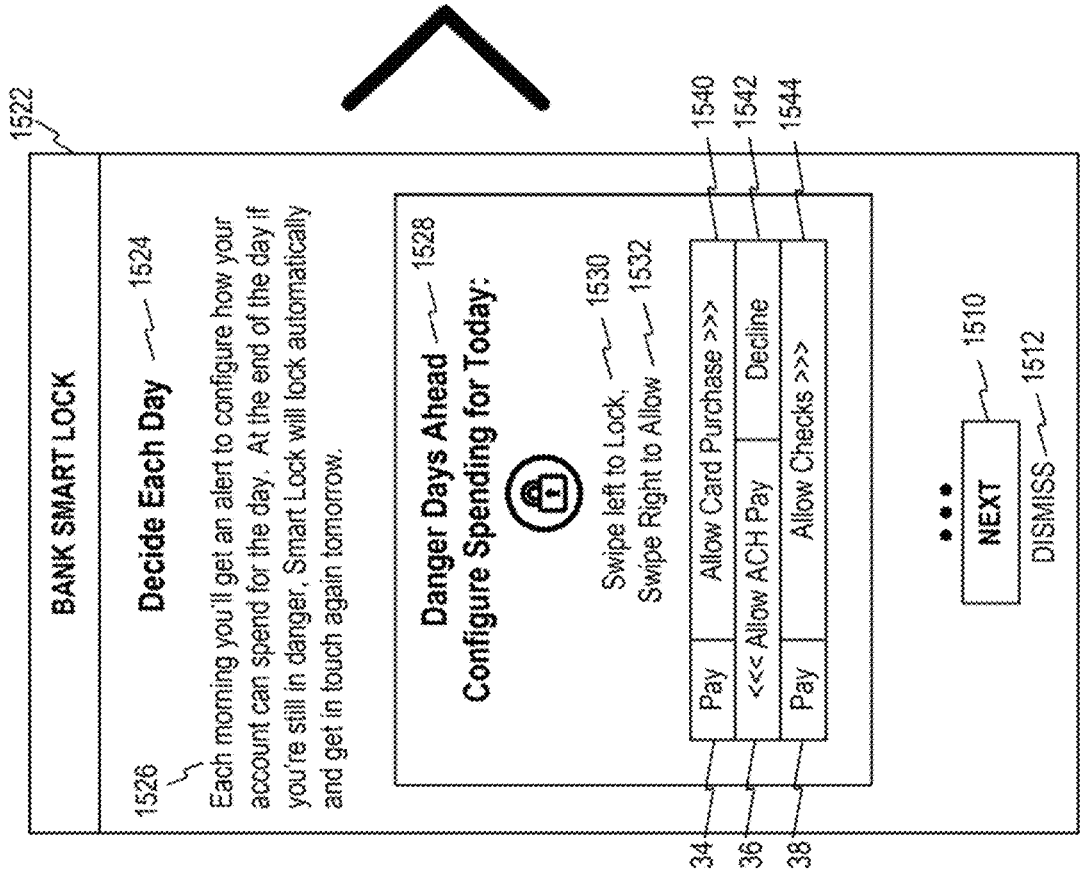

FIGS. 15C-15D illustrate exemplary graphical user interfaces for explaining danger day features and geolocation control features, consistent with disclosed embodiments.

Figure 32:
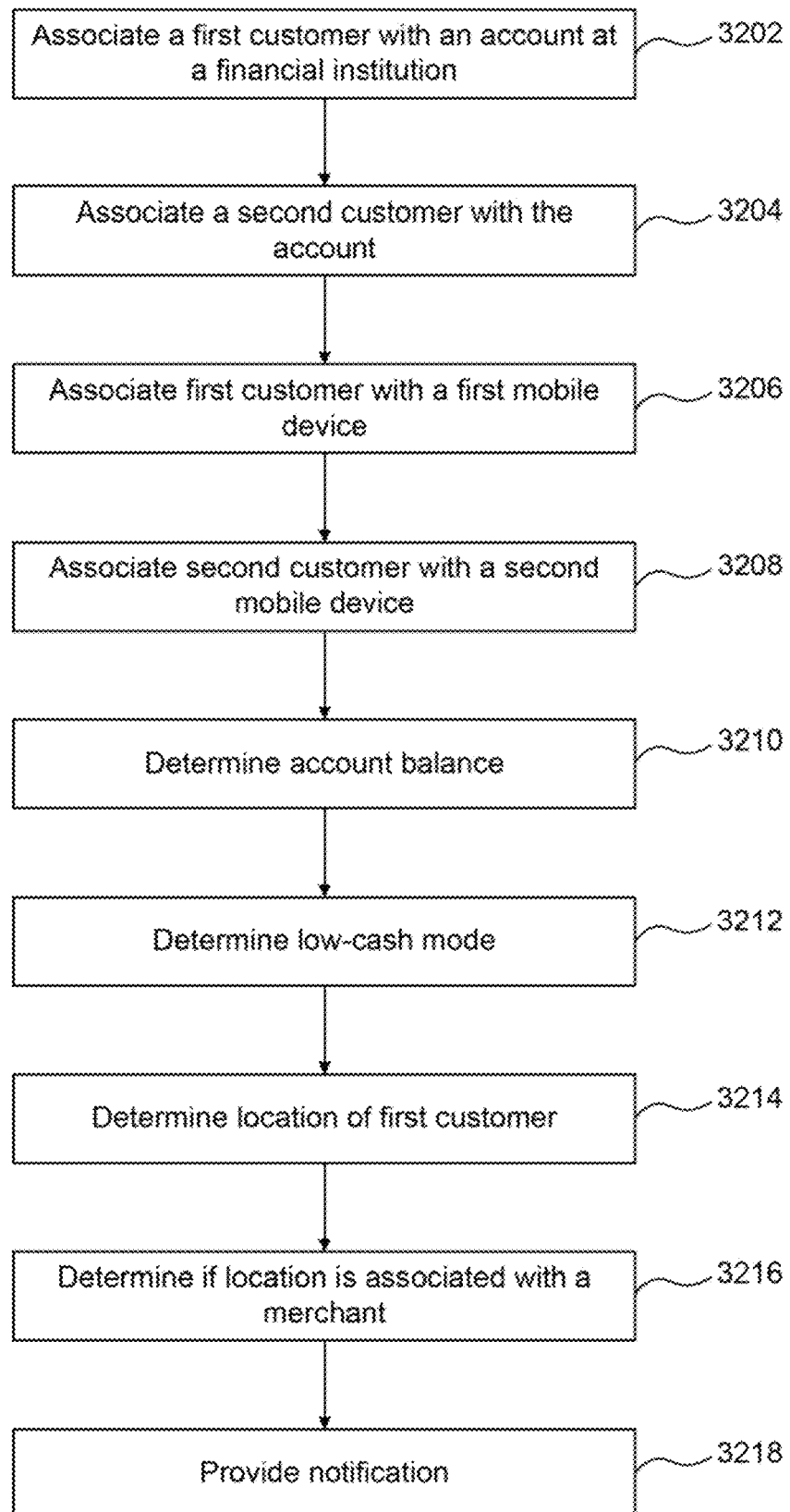
FIG. 32 illustrates an exemplary flow chart for preventing a negative account balance, consistent with disclosed embodiments.

FIG. 32 illustrates an exemplary flowchart for preventing a negative account balance. At step 3202, financial institution 106 may associate a first customer with an account at financial institution 106. At step 3204, financial institution 106 may associate a second customer with the account at financial institution 106. At step 3206, financial institution 106 may associate the first customer with a first mobile device. At step 3208, financial institution 106 may associate the second customer with a second mobile device.

At step 3210, financial institution 106 may determine an account balance of the account. At step 3212, financial institution 106 may determine, based on the account balance, whether the account is deemed to be in a low-cash mode state, as disclosed herein.

At step 3214, financial institution may determine the location of the first customer via the first device. At step 3216, financial institution may determine if the location of the first customer is associated with a merchant. At step 3218, financial institution may provide a notification to the first customer, the second customer, or both, as disclosed herein.

Figure 33:
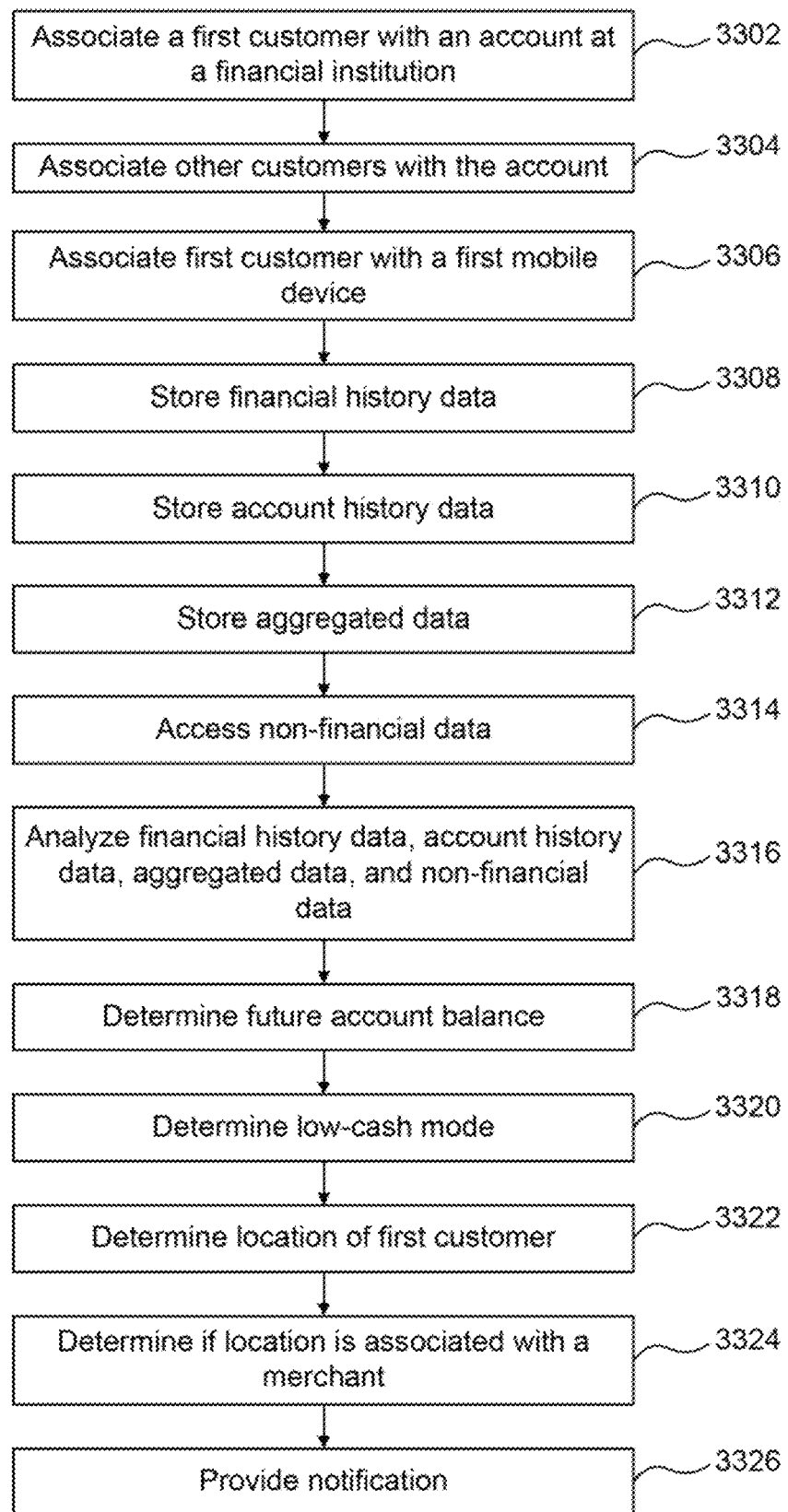
FIG. 33 illustrates an exemplary flow chart for preventing a negative account balance, consistent with disclosed embodiments.

FIG. 33 illustrates an exemplary process for preventing a negative balance. At step 3302, financial institution 106 may associate a first customer with an account at financial institution. At step 3304, financial institution 106 may associate multiple other customers with the account at financial institution 106. At step 3306, financial institution 106 may associated the first customer with a first mobile device. At step 3308, financial institution 106 may store financial history data associated with the customer and/or the account. At step 3310, financial institution 106 may store account history data associated with the customer, the multiple customers, and/or the account. At step 3312, financial institution 106 may store aggregated data. At step 3314, financial institution 106 may access non-financial data.

At step 3316, financial institution 106 may analyze by machine learning the financial history data, the account history data, the aggregated data and the non-financial data. At step 3318, financial institution 106 may determine a future account balance of the account based on the analysis performed in step 3316. At step 3320, financial institution 106 may determine, based on the future account balance, whether the first account will enter a low-cash mode state, as disclosed herein.

At step 3322, financial institution may determine the location of the first customer via the first device. At step 32163324 financial institution may determine if the location of the first customer is associated with a merchant. At step 3326, financial institution may provide a notification to the first customer, the multiple customers, or both, as disclosed herein.

Figure 34:
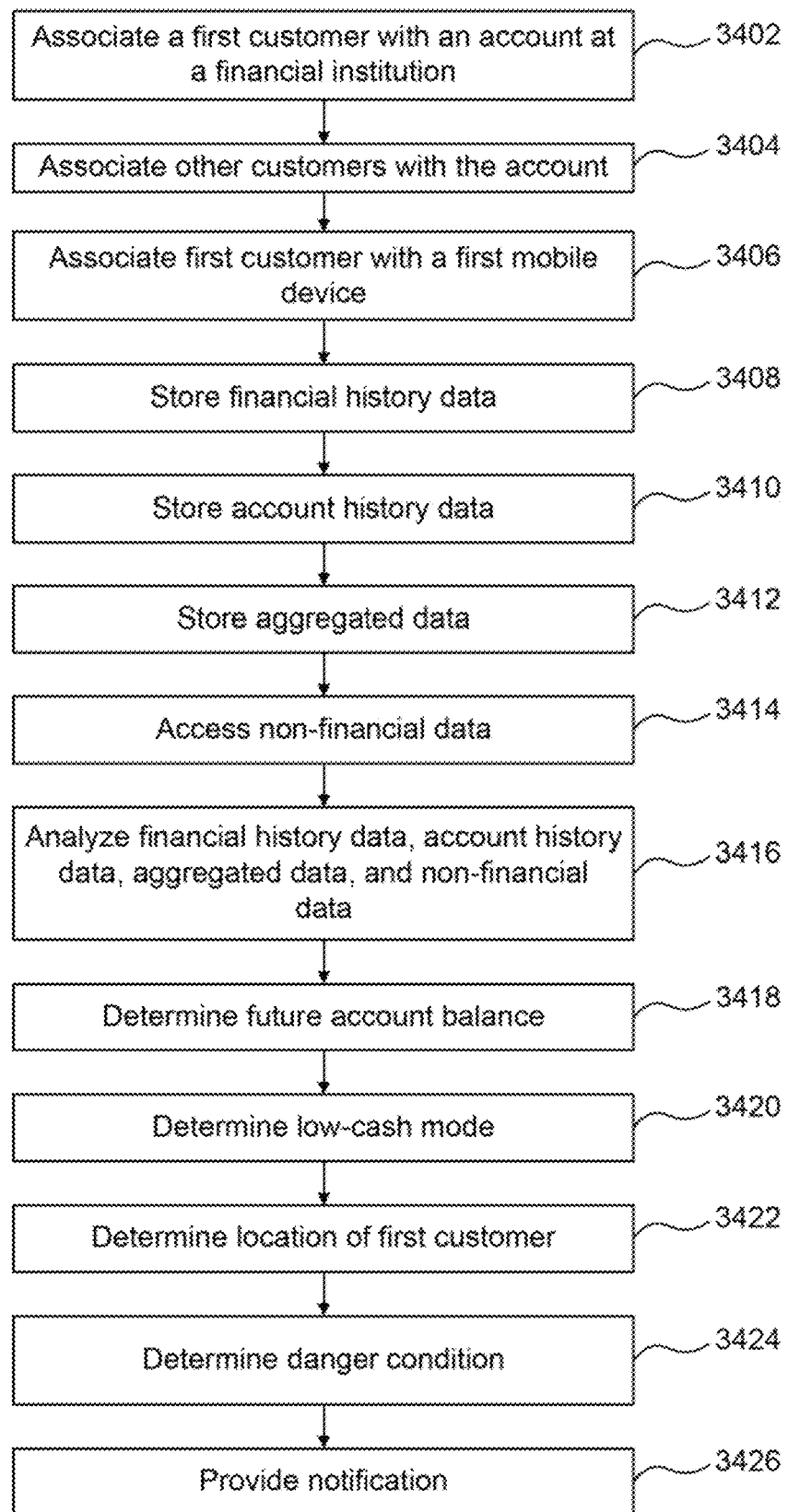
FIG. 34 illustrates an exemplary flow chart for preventing a negative account balance, consistent with disclosed embodiments.

FIG. 34 illustrates an exemplary process for preventing a negative balance. At step 3402, financial institution may associate a first customer with an account at financial institution 106. At step 3404, financial institution 106 may associate multiple other customers with the account at financial institution 106. At step 3406, financial institution 106 may associate the first customer with a first mobile device. At step 3408, financial institution 106 may store financial history data associated with the customer and/or the account. At step 3410, financial institution 106 may store account history data associated with the customer, the multiple customers, and/or the account. At step 3412, financial institution 106 may store aggregated data. At step 3414, financial institution 106 may access non-financial data.

At step 3416, financial institution 106 may analyze by machine learning the financial history data, the account history data, the aggregated data and the non-financial data. At step 3418, financial institution 106 may determine a future account balance of the account based on the analysis performed in step 3416. At step 3420, financial institution 106 may determine, based on the future account balance, whether the first account will enter a low-cash mode state, as disclosed herein.

At step 3422, financial institution may determine the location of the first customer via the first device. At step 3424, financial institution may determine a danger condition. At step 3326, financial institution may provide a notification to the first customer, the multiple customers, or both, as disclosed herein.

Systems for Exemptions from Low-Cash Mode

In some embodiments, financial institution may provide the customer with one or more low cash mode payment recommendations (such as grocery recommendations as discussed herein). When additional payments are made by a customer whose account is in low cash mode, financial institution may use customer data, customer account data, financial institution data, third party data, or a combination thereof to determine an optimal way for the customer to schedule payments. For example, the financial institution may analyze the scheduled payments for the customer account and a fee schedule associated with the customer account and recommend which scheduled payments the customer should pay in order to minimize incurring fees. Low cash mode payment recommendations benefit the financial institution by providing customers with advice that may mitigate their risk profile to the financial institution and by increasing customer satisfaction with the financial institution. Low cash mode payment recommendations benefits customers by empowering them with information and flexibility while aiding their financial decisions when funds are insufficient and financial advice is needed most.

In some embodiments, financial institution may offer customers various options to process designated transactions for processing even while in low cash mode. For example, financial institution may offer customers the option to designate payments for processing that are made at a grocery store (as discussed above) even while in low cash mode. The financial institution may offer customers options to designate particular merchants or types of payments prior to or upon the customer's account entering low cash mode. Financial institution may also offer customers the option to designate particular merchants or types of payment while the customer's account is in low cash mode.

In some embodiments, financial institution may provide the customer with a list of merchants and the customer may select one or more merchants from the list. The financial institution will then process transactions initiated by the selected merchants while the associated account is in low cash mode. In some embodiments, financial institution provides the user with a list of types of payments and the user selects one or more types of payment from the list. The financial institution will then process transactions corresponding to the selected payments while the associated account in in low cash mode. The types of payment may include, for example, payment categories. The financial institution may obtain payment categories from a third party or determine such payment categories using financial data and historical financial transaction data associated with a particular merchant, payment amount, or time of payment.

Systems Providing User Interface

In some embodiments, as used herein, micro-applications may be used to implement a low cash mode of operation as displayed on a graphical user interface or webpage (as discussed above) or on a mobile device (as discussed below). For example, a low cash mode may be used to refer to when an account balance in a financial account drops beneath a predetermined threshold value, and additionally, to options presented by financial service provider 110 (e.g. personal loan, transfer of fund, and the like) when financial service provider 110 determines that an account has insufficient funds to handle a transaction without resulting in a negative balance.

Figure 3A:
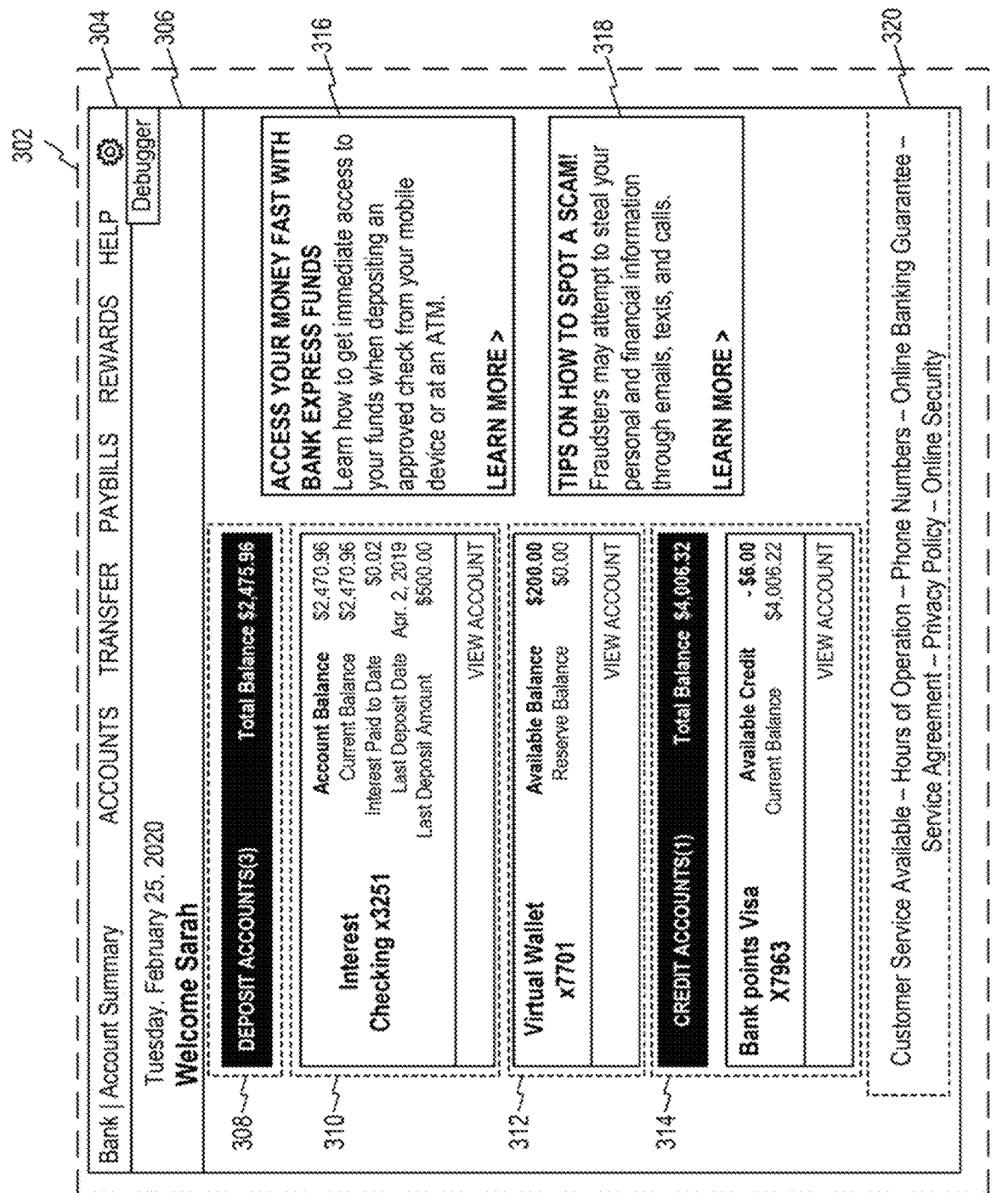
FIGS. 3A-3B illustrate exemplary bank account webpages for use with applications, consistent with disclosed embodiments.

FIGS. 6-7 illustrate exemplary bank account webpages for use with applications, consistent with disclosed embodiments. FIG. 3A illustrates a user interface that may exchange data to present a holistic and consistent user banking experience, such as a banking account summary webpage 302. Deposit accounts 308 and interest checking 310 and a virtual wallet 312 may be shown as part of a consistent user experience. Credit account 314 may also be shown as part of a consistent user experience. Information message boxes 316 and 318 may also be displayed on banking account summary webpage 302. Message 316 such as "access your money fast with bank express funds" and "learn how to get immediate access to your funds when depositing an approved check from your mobile device or at an ATM" may be part of the user banking experience. Other message 318 may include "Tips on how to spot a scam!Fraudsters may attempt to steal your personal and financial information through emails, texts, and call," and may be part of a user experience. Other links 320 may be presented at the bottom of account summary webpage 302.

Figure 3B:
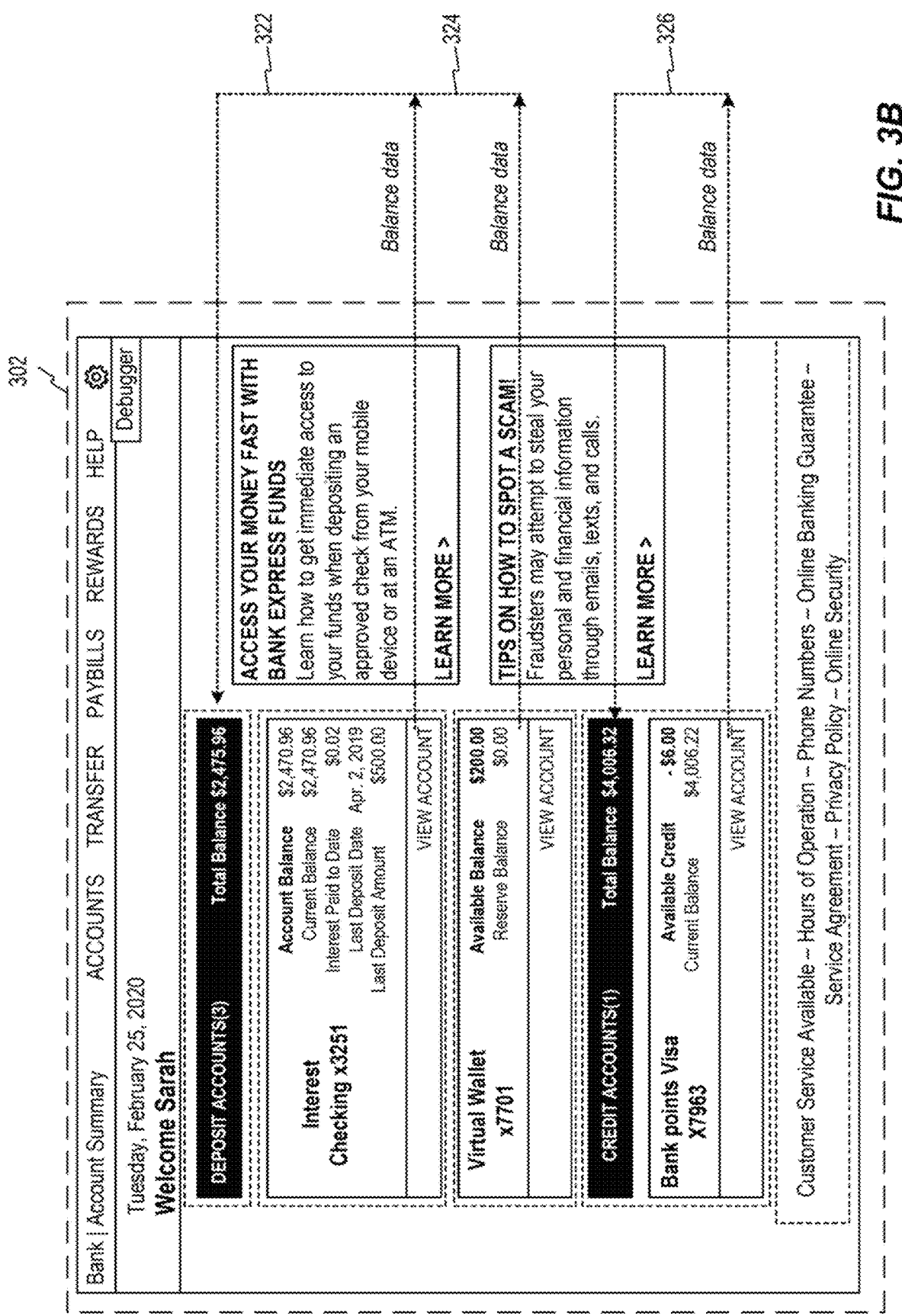

In some embodiments, balance data for each of the three deposit accounts 322, 324 and for the credit account 326 may also be shown as part of webpage 302 as shown in FIG. 3B.

In some embodiments, a customer may be provided with a user interface. The user interface may provide the customer with a variety of notifications, such as notifications triggered when the customer's account enters or exits low cash mode as well as notifications providing education as to the features an options available for accounts in low cash mode. The user interface may also be configured to display a variety of settings, including display settings, notification settings, customer account settings, and low cash mode settings. In addition to displaying these settings, the user interface allows a user, which may or may not be the customer, to adjust these settings. By displaying the settings in an aesthetically pleasing and intuitive manner, a user may feel more informed and empowered to control their customer account and the functionality of low cash mode. In some embodiments, the user interface is customizable such that portions of the user interface may be rearranged according to the needs or preferences of the user. In some embodiments, the customizability of the user interface is reduced to promote uniformity of user experience across a variety of users.

The user interface may be provided on a variety of devices, such as mobile devices, tablets, laptops, desktop computers, Automated Teller Machines (ATMs), or other devices. Furthermore, the user interface may be provided for use by a single user or may be configured for use by more than one user, such as a user interface configured to provide access to many users at a publicly accessible device.

In some embodiments, the user interface comprises one or more panels. Each panel may include text or images to provide a user with account information, or provide a user with notifications regarding such account information. The account information may include low cash mode information associated with a customer account, such as a balance available to the user, current settings of low cash mode, funding options, fund transfer information, fund deposit information, time remaining until overdraft or other fees are incurred, overdraft or other fees being avoided by the user's actions or settings over various periods of time, current payment control settings, and payments available for viewing by a user. In some embodiments, the account information includes payment control information, such as protected balance, available balance, returned payments, payment schedules, and payment decision deadlines.

When a user interacts with one or more panels (for example by tapping, swiping, clicking with a cursor, or otherwise performing an action indicative of a user's choice), the user interface may change to include new or additional information displayed through the interface or provide a user with new or additional settings. For example, one panel may include information regarding a balance available through low cash mode. When the user interacts with the panel, the user interface may change to display more detailed information regarding the available balance, such as a transaction history or a detailed time stamp for when low cash mode was enabled. In some embodiments, one panel may include payment control notifications. When the user interacts with the panel, the user interface may change to display payment control information, settings, and/or choices. Such payment control choices may include, for example, buttons enabling the user to select payments the user does not want paid using the customer account.

FIGS. 10A-10E illustrate exemplary graphical user interfaces for managing a financial account in a low cash mode, consistent with disclosed embodiments. FIG. 4A illustrates an exemplary graphical user interface 402 for managing a financial account in low cash mode, consistent with disclosed embodiments. As shown in FIG. 4A, graphical user interface 402 may include a home page that provides an overview of options available to a user at user device 108, educating the user about low cash mode. Graphical user interface 402 may include options including opting-into intelligent alerts 406, receiving automatic extensions of time 408, managing payment controls 410, and activating a debit cart smart lock 412. In present embodiments, intelligent alerts 406 may communicate to a user when an account associated with the user enters low cash mode and when the user needs to take action related to the account or a transaction. Automatic extra time 408 may allow a user to avoid overdraft fees and may provide a length of time (for example, 48 hours) for a user to cure the negative account balance before incurring a negative balance fee. Payment controls 410 may allow a user to decide if individual checks as automatic payments are paid or rejected when in low cash mode. Debit card smart lock 412 may allow a user to choose to automatically lock their debit card to avoid spending when their balance is low. Additionally or alternatively, a user may activate debit card smart lock 412 manually at any time. Other features may be contemplated and included in a home page in order to allow a user to manager his or her financial account in low cash mode.

While some features relating services, technologies, and features offered by a financial services provider have been described with respect to the above embodiments, it should be understood that they are not limited thereto, and that various other features may be included or featured. The accompanying figures are intended to provide exemplary views for purposes of explaining systems and methods described herein, and they are not intended to limit the scope of those features or interfaces.

In some embodiments, some or all of the logic for the above-described techniques may be implemented as a computer program, as an application, or as a plug-in module or sub-component of another application. The described techniques may be varied and are not limited to the examples or descriptions provided. In some examples applications may be developed for download to mobile communications and computing systems, e.g., laptops, mobile computers, tablet computers, smartphones, etc., being made available for download by the customer either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified or combined, and/or steps may be added or deleted.

Thus, the foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, while a financial institution may have been described herein as the entity managing and/or maintaining the financial accounts 130 and providing the graphical user interface 118 for user device 108, it is to be understood that, consistent with disclosed embodiments, another entity may provide such services in conjunction with or separate from a financial institution. For example, third-party service provider 110 may provide some or all of the above-described functions.

The claims are to be interpreted broadly based on the language employed in the claims and not limited to examples described in the present specification. Accordingly, the examples presented herein are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples but, instead, are defined by the appended claims in light of their full scope of equivalents.

What is claimed is:

1. A system comprising:
a memory storing instructions;
a database, in electronic communication with the memory, configured to store information comprising:
account information associated with an account at an institution;
user information for a user associated with the account; and
an account balance associated with the account; and
a processor, in electronic communication with the database, configured to execute the instructions to perform operations associated with a first mode or a second mode, comprising:
associating a mobile device of a user with the account based on the account information;
determining the account is in the first mode;
providing a user interface accessible via the mobile device, the user interface comprising a setup dashboard configuration including a setup graphical user interface for receiving a setting for a second mode threshold, wherein the setup interface includes an interactive selectable control that allows the user to select the second mode threshold;
replacing the setup dashboard configuration with a first set of selectable controls associated with processing a plurality of electronic transactions, including one or more account funding controls;
determining, based on the account balance and the second mode threshold, whether the account is in the second mode, wherein the the second mode threshold is a positive number;
responsive to the determination that the account is in the second mode:
transmitting a first notification for display through the user interface, the first notification indicating that the account is in the second mode;
disabling the first set of selectable controls of the first mode;
enabling a second set of selectable controls for display in the user interface, wherein
the processor permits the user to navigate only within the second set of selectable controls;
the second set of selectable controls includes a set of electronic transaction controls restricted to the one or more account funding controls, and one or more default payment controls for processing a previously scheduled automatic payment or a check,
the second set of selectable controls is different from the first set of selectable controls but has at least one control in common with the first set of selectable controls, the at least one control in common comprises the one or more account funding controls, and the second set of selectable controls is enabled until the account is removed from the second mode;

receiving, from the mobile device and through the user interface, a request to manage the one or more default payment controls associated with the account;

responsive to the request, providing a dashboard configuration for display in the user interface, the dashboard configuration includes at least one toggle control for rejecting the automatic payment; and responsive to a determination that the account balance is raised above the predetermined threshold:
removing the account from the second mode via the request; and
in response to the account exiting the second mode: disabling the second set of selectable controls;

transmitting a second notification for display through the user interface, the second notification indicating that the account is in the first mode; and enabling the first set of selectable controls.

2. The system of claim 1, wherein the dashboard further includes at least one toggle control for cancelling a transaction.

3. The system of claim 2, wherein the transaction is a scheduled transaction.

4. The system of claim 3, wherein the scheduled transaction is an Automated Clearing House transaction.

5. The system of claim 2, wherein the transaction is a predicted reoccurring expense.

6. The system of claim 2, wherein the transaction is an uncashed check.

7. The system of claim 1, wherein the database further comprises a second account associated with the user; and
the dashboard further includes at least one toggle control for transferring funds from the second account into the account.

8. The system of claim 1, wherein the database further comprises a second account associated with the user; and
the dashboard further includes at least one toggle control for paying a transaction using the second account.

9. The system of claim 1, wherein the dashboard further includes at least one toggle control for accelerating a deposit.

10. The system of claim 9, wherein the deposit is an Automated Clearing House deposit.

11. The system of claim 9, wherein the deposit is a payroll deposit.

12. The system of claim 1, wherein the dashboard further includes at least one toggle control for obtaining a personal loan from the institution, the personal loan comprising:
a preapproved amount for deposit, in real-time, into the account; and
a preapproved interest rate associated with the user.

13. A system comprising:
a database configured to store information comprising:
account information associated with an account at an institution;
information for a user associated with the account; and
an account balance associated with the account;

a first processor, in electronic communication with the database, configured to operate in a first mode or a second mode and perform the steps comprising:
receive the account balance from the database;
receive a future transaction;
receive a second mode threshold from a mobile device;
predict a future account balance based on the account balance and the future transaction; and
determine, based on the account balance, the second mode threshold, and the future account balance, whether the account is in the second mode, wherein the second mode threshold is a positive number;

an application configured for use on a mobile device, the application configured to:
provide a user interface accessible via the mobile device, the user interface comprising a setup graphical user interface for receiving a setting for the second mode threshold, wherein the setup interface includes an interactive selectable control that allows the user to select the second mode threshold;
replace the interactive selectable control with a first set of selectable controls associated with processing a plurality of electronic transactions, including one or more account funding controls;
responsive to the determination that the account is in the second mode:
display a first notification indicating that the account is in the second mode;
disable the first set of selectable controls; and
enable a second set of selectable controls for display in the user interface, wherein
the first processor permits the user to navigate only within the second set of selectable controls;
the second set of selectable controls includes a set of electronic transaction controls restricted to the one or more account funding controls, and one or more default payment controls for processing the future transaction,
the second set of selectable controls is different from the first set of selectable controls but has at least one control in common with the first set of selectable controls, the at least one control in common comprises the one or more account funding controls, and
the second set of selectable controls is enabled until the account is removed from the second mode; and
receive a request to manage the one or more default payment controls associated with the account; and a second processor, in electronic communication with the database and the application, configured to:
provide the setup dashboard configuration for display in the user interface;
responsive to a selection of the second mode threshold, provide a dashboard configuration for display in the user interface, the dashboard configuration including at least one toggle control for rejecting the future transaction;
responsive to a determination that the account balance is raised above the predetermined threshold, remove the account from the second mode; and in response to the account exiting the second mode:
  disabling the second set of selectable controls;
  transmit a second notification to the mobile device, the second notification indicating that the account is not in the second mode; and
  enable the first set of selectable controls.

14. The system of claim 13, wherein the future transaction is an Automated Clearing House transaction.

15. The system of claim 13, wherein the future transaction is an uncashed check.

16. The system of claim 13, wherein the database further comprises a second account associated with the user; and
  the dashboard further includes at least one toggle control for transferring funds from the second account into the account.

17. The system of claim 13, wherein the database further comprises a second account associated with the user; and
  the dashboard further includes at least one toggle control for paying the future transaction using the second account.

18. The system of claim 13, wherein the dashboard further includes at least one toggle control for accelerating a deposit.

19. The system of claim 13, wherein the dashboard further includes at least one toggle control for obtaining a personal loan from the institution, the personal loan comprising:
  a preapproved amount for deposit, in real-time, into the account; and
  a preapproved interest rate associated with the user.

20. The system of claim 13, wherein the future transaction is a debit card transaction.

\* \* \* \* \*